(12) United States Patent
Thiesson et al.

(10) Patent No.: US 6,807,537 B1
(45) Date of Patent: Oct. 19, 2004

(54) MIXTURES OF BAYESIAN NETWORKS

(75) Inventors: Bo Thiesson, Kirkland, WA (US); Christopher A. Meek, Kirkland, WA (US); David Maxwell Chickering, Redmond, WA (US); David Earl Heckerman, Bellevue, WA (US)

(73) Assignee: Microsoft Corporation, Redmond, WA (US)

(*) Notice: Subject to any disclaimer, the term of this patent is extended or adjusted under 35 U.S.C. 154(b) by 0 days.

(21) Appl. No.: 08/985,114

(22) Filed: Dec. 4, 1997

(51) Int. Cl.[7] ............................................. G06N 3/02
(52) U.S. Cl. ................................... 706/52; 706/45
(58) Field of Search ............................ 706/52, 45, 46, 706/47

(56) References Cited

PUBLICATIONS

Wong, S.K.M.; Butz, C.J., Probabilistic reasoning in a distributed multi–agent environment, Multi Agent Systems, 1998. Proceedings. International Conference on , Jan. 1998 , pp.: 341 –348.*
Geng, H.; Xiang, Y., Implementation of Fully Distributed Inference in Multiagent MSBN Systems, Electrical and Computer Engineering, 1999 IEEE Canadian Conference on vol.: 3 , Jan. 1999 , pp.: 1698–1703.*
Luttrell, S.P., An adaptive Bayesian network for texture modelling Texture analysis in radar and sonar, IEE Seminar on , Jan. 1993, pp.: 6/1 –610.*
Luttrell, S.P.; An adaptive Bayesian network for low–level image processing Artificial Neural Networks, 1993., Third International Conference on , Jan. 1993 , pp.:61 –65.*
Luttrell, S.P., Partitioned mixture distribution: an adaptive Bayesian network for low–energy image processing, Vision, Image and Signal Processing, IEE Proceedings– vol.: 141 4 , Aug. 1994 , pp.: 251–260.*

Taniguchi, M.; Haft, M.; Hollmen, J.; Tresp, V., Fraud detection in communication networks using neural and probabilistic methods, Acoustics, Speech and Signal Processing, 1998. Proceedings of the 1998 IEEE International Conference on, vol.: 2, Jan. 1998 , P.*
Yamanishi, Kenji, Distributed cooperative Bayesian learning strategies, Proceedings of the tenth annual conference on Computational learning theory , Jan. 1997, pp. 250–262.*
Larranaga, P.; Poza, M.; Yurramendi, Y.; Murga, R.H.; Kuijpers, C.M.H., Structure learning of Bayesian networks by genetic algorithms: a performance analysis of control parameters, Pattern Analysis and Machine Intelligence, IEEE Transactions on, vol.:1, Sep. 1996.*

(List continued on next page.)

*Primary Examiner*—Mark R. Powell
*Assistant Examiner*—Wilbert L. Starks, Jr.
(74) *Attorney, Agent, or Firm*—Michaelson & Wallace; Peter L. Michaelson; Robert M. Wallace

(57) ABSTRACT

One aspect of the invention is the construction of mixtures of Bayesian networks. Another aspect of the invention is the use of such mixtures of Bayesian networks to perform inferencing. A mixture of Bayesian networks (MBN) consists of plural hypothesis-specific Bayesian networks (HSBNs) having possibly hidden and observed variables. A common external hidden variable is associated with the MBN, but is not included in any of the HSBNs. The number of HSBNs in the MBN corresponds to the number of states of the common external hidden variable, and each HSBN is based upon the hypothesis that the common external hidden variable is in a corresponding one of those states. In one mode of the invention, the MBN having the highest MBN score is selected for use in performing inferencing. In another mode of the invention, some or all of the MBNs are retained as a collection of MBNs which perform inferencing in parallel, their outputs being weighted in accordance with the corresponding MBN scores and the MBN collection output being the weighted sum of all the MBN outputs. In one application of the invention, collaborative filtering may be performed by defining the observed variables to be choices made among a sample of users and the hidden variables to be the preferences of those users.

82 Claims, 24 Drawing Sheets

OTHER PUBLICATIONS

Heckerman, David, *Probabilistic Similarity Networks*, MIT Press, Cambridge, Massachusetts, 1990, pp. 53–103.

Jeffrey D. Banfield and Adrian E. Raferty, *Model–Based Gaussian and Non–Gaussian Clustering*, pp. 803–821, Sep. (1993).

P. Cheeseman and J. Stutz, *Bavesian Classification Auto-Class: Theory and Results*, pp. 153–180, AAAI Press (1995).

David Maxwell Chickering and David Heckerman, *Efficient Approximations for the Marginal Likelihood of Bayesian Networks With Hidden Variables*, pp. 1–33, Netherlands (1997).

Nir Friedman, *Learning Belief Networks in the Presence of Missing Values and Hidden Variables*, Morgan Kaufman (1997).

* cited by examiner

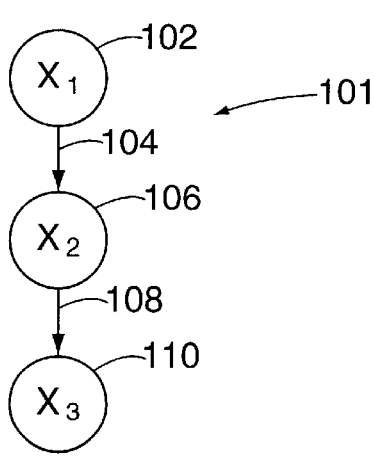
FIG. 1
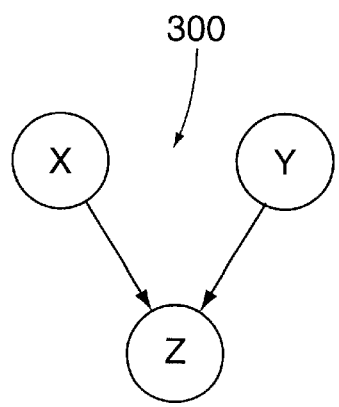
FIG. 3A
320 →
| $p(Z=0 \mid X=0, Y=0)$ | .35 |
| --- | --- |
| $p(Z=0 \mid X=0, Y=1)$ | .6 |
| $p(Z=0 \mid X=1, Y=0)$ | .6 |
| $p(Z=0 \mid X=1, Y=1)$ | .53 |
FIG. 3B
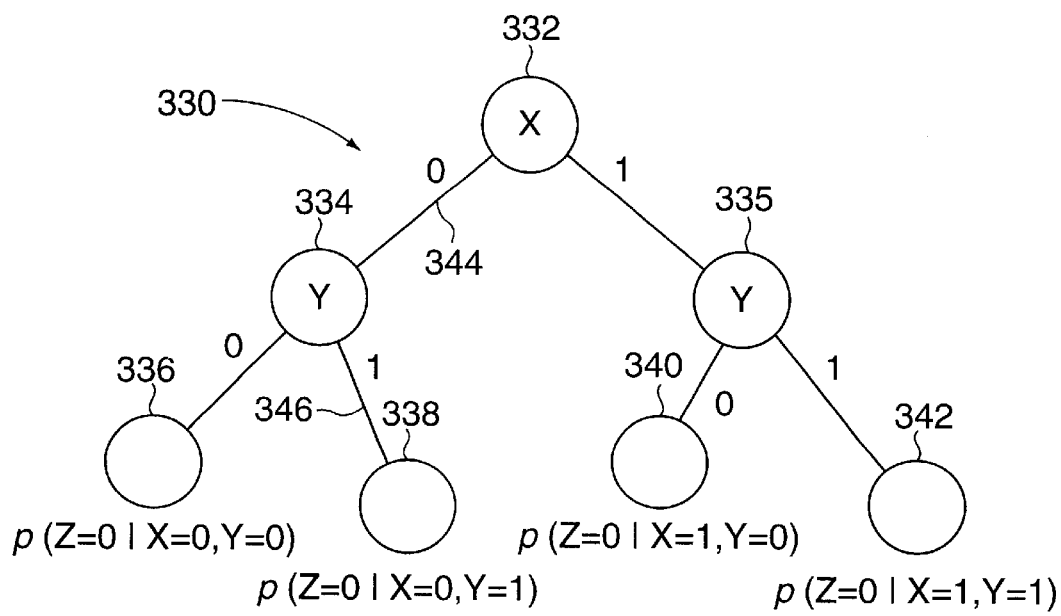
FIG. 3C

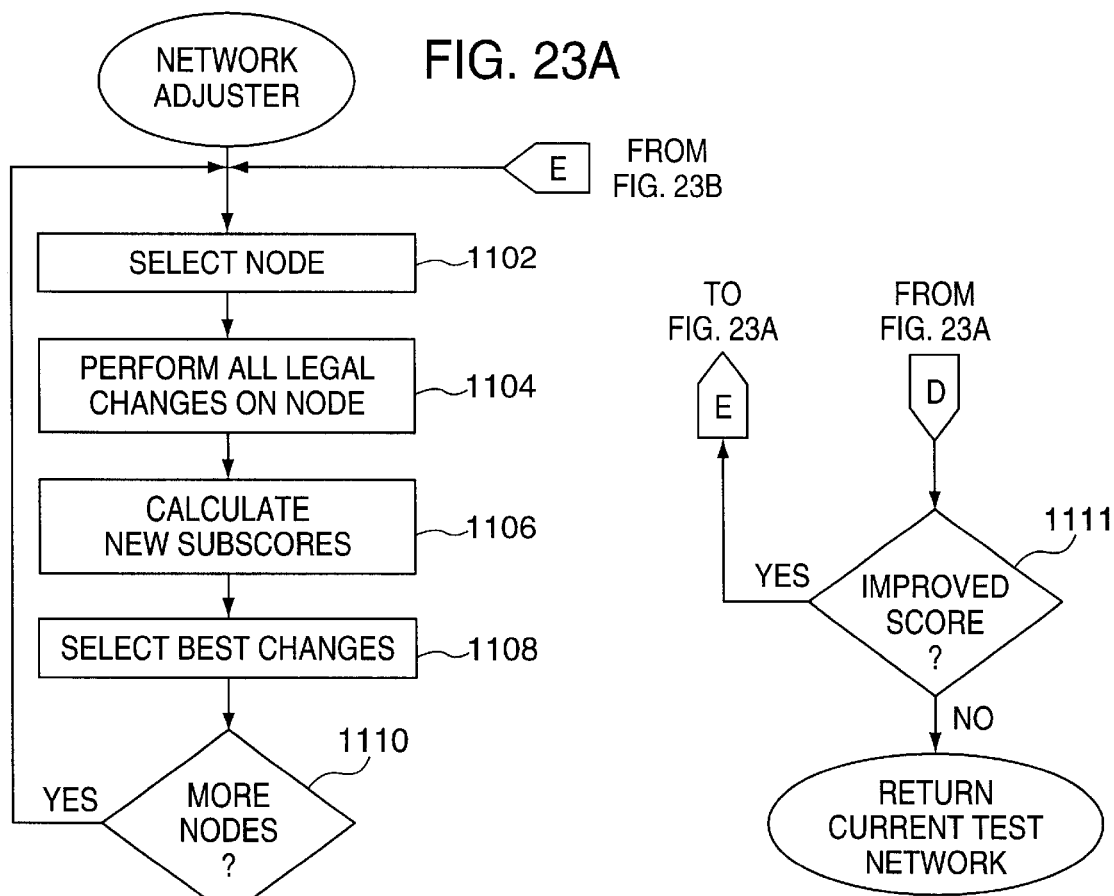
FIG. 23A
FIG. 23B
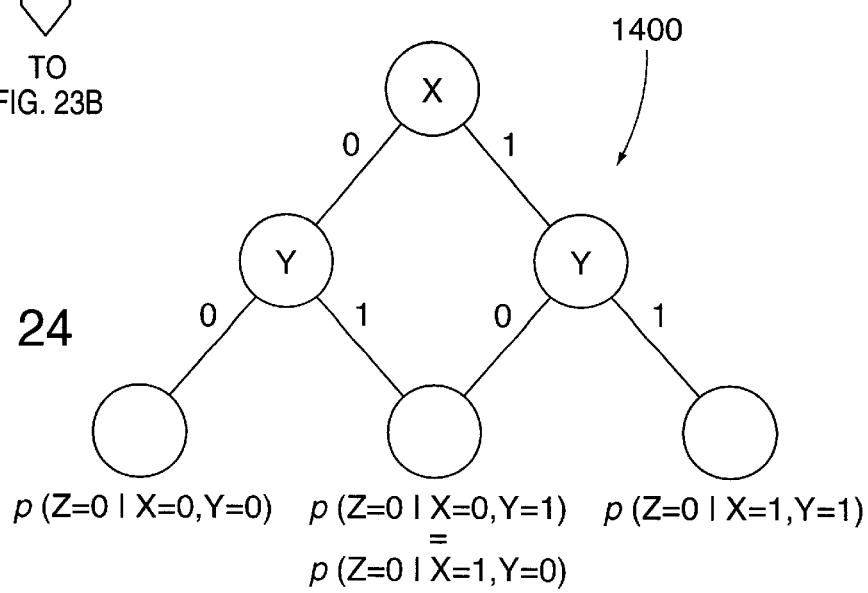
FIG. 24

MIXTURES OF BAYESIAN NETWORKS

FIELD OF THE INVENTION

The present invention relates generally to data processing systems and, more particularly, to the generation of Bayesian networks.

BACKGROUND OF THE INVENTION

The advent of artificial intelligence within computer science has brought an abundance of decision-support systems. Decision-support systems are computer systems in which decisions, typically rendered by humans, are recommended and sometimes made. In creating decision-support systems, computer scientists seek to provide decisions with the greatest possible accuracy. Thus, computer scientists strive to create decision-support systems that are equivalent to or more accurate than a human expert. Applications of decision-support systems include medical diagnosis, troubleshooting computer networks, or other systems wherein a decision is based upon identifiable criteria.

One of the most promising new areas for research in decision-support systems is Bayesian networks. A Bayesian network is a representation of the probabilistic relationships among distinctions about the world. Each distinction, sometimes called a variable, can take on one of a mutually exclusive and exhaustive set of possible states. A Bayesian network is expressed as an acyclic-directed graph where the variables correspond to nodes and the relationships between the nodes correspond to arcs. FIG. 1 depicts an examplary Bayesian network 101. In FIG. 1 there are three variables, $X_1$, $X_2$, and $X_3$, which are represented by nodes 102, 106 and 110, respectively. This Bayesian network contains two arcs 104 and 108. Associated with each variable in a Bayesian network is a set of probability distributions. Using conditional probability notation, the set of probability distributions for a variable can be denoted by $p(x_i|\Pi_i, \xi)$, where "p" refers to the probability distribution, where "$\Pi_i$" denotes the parents of variable $X_i$ and where "$\xi$" denotes the knowledge of the expert. The Greek letter "$\xi$" indicates that the Bayesian network reflects the knowledge of an expert in a given field. Thus, this expression reads as follows: the probability distribution for variable $X_i$ given the parents of $X_i$ and the knowledge of the expert. For example, $X_1$ is the parent of $X_2$. The probability distributions specify the strength of the relationships between variables. For instance, if $X_1$ has two states (true and false), then associated with $X_1$ is a single probability distribution $p(x_1|\xi)$ and associated with $X_2$ are two probability distributions $p(x_2|x_1=t, \xi)$ and $p(x_2|x_1=f, \xi)$. In the remainder of this specification, $\xi$ is not specifically mentioned.

The arcs in a Bayesian network convey dependence between nodes. When there is an arc between two nodes, the probability distribution of the first node depends upon the value of the second node when the direction of the arc points from the second node to the first node. For example, node 106 depends upon node 102. Therefore, nodes 102 and 106 are said to be conditionally dependent. Missing arcs in a Bayesian network convey conditional independencies. For example, node 102 and node 110 are conditionally independent given node 106. However, two variables indirectly connected through intermediate variables are conditionally dependent given lack of knowledge of the values ("states") of the intermediate variables. Therefore, if the value for node 106 is known, node 102 and node 110 are conditionally dependent.

In other words, sets of variables X and Y are said to be conditionally independent, given a set of variables Z, if the probability distribution for X given Z does not depend on Y. If Z is empty, however, X and Y are said to be "independent" as opposed to conditionally independent. If X and Y are not conditionally independent, given Z, then X and Y are said to be conditionally dependent given Z.

The variables used for each node may be of different types. Specifically, variables may be of two types: discrete or continuous. A discrete variable is a variable that has a finite or countable number of states, whereas a continuous variable is a variable that has an uncountably infinite number of states. All discrete variables considered in this specification have a finite number of states. An example of a discrete variable is a Boolean variable. Such a variable can assume only one of two states: "true" or "false." An example of a continuous variable is a variable that may assume any real value between −1 and 1. Discrete variables have an associated probability distribution. Continuous variables, however, have an associated probability density function ("density"). Where an event is a set of possible outcomes, the density p(x) for a variable "x" and events "a" and "b" is defined as:

$$p(x) = \lim_{a \to b}\left[\frac{p(a \le x \le b)}{|(a-b)|}\right]$$

where $p(a \le x \le b)$ is the probability that x lies between a and b. Conventional systems for generating Bayesian networks cannot use continuous variables in their nodes.

FIG. 2 depicts an example Bayesian network for troubleshooting automobile problems. The Bayesian network of FIG. 2 contains many variables 202, 204, 206, 208, 210, 212, 214, 216, 218, 220, 222, 224, 226, 228, 230, 232, and 234, relating to whether an automobile will work properly, and arcs 236, 238, 240, 242, 244, 246, 248, 250, 252, 254, 256, 258, 260, 262, 264, 268. A few examples of the relationships between the variables follow. For the radio 214 to work properly, there must be battery power 212 (arc 246). Battery power 212, in turn, depends upon the battery working properly 208 and a charge 210 (arcs 242 and 244). The battery working properly 208 depends upon the battery age 202 (arc 236). The charge 210 of the battery depends upon the alternator 204 working properly (arc 238) and the fan belt 206 being intact (arc 240). The battery age variable 202, whose values lie from zero to infinity, is an example of a continuous variable that can contain an infinite number of values. However, the battery variable 208 reflecting the correct operations of the battery is a discrete variable being either true or false.

The automobile troubleshooting Bayesian network also provides a number of examples of conditional independence and conditional dependence. The nodes operation of the lights 216 and battery power 212 are dependent, and the nodes operation of the lights 216 and operation of the radio 214 are conditionally independent given battery power 212. However, the operation of the radio 214 and the operation of the lights 216 are conditionally dependent. The concept of conditional dependence and conditional independence can be expressed using conditional probability notation. For example, the operation of the lights 216 is conditionally dependent on battery power 212 and conditionally independent of the radio 214 given the battery power 212. Therefore, the probability of the lights working properly 216 given both the battery power 212 and the radio 214 is equivalent to the probability of the lights working properly given the battery power alone, P(Lights|Battery Power, Radio)=P (Lights|Battery Power). An example of a conditional dependence relationship is the probability of the lights working properly 216 given the battery power 212 which is not equivalent to the probability of the lights working properly given no information. That is, p(Lights|Battery Power)≠p (Lights).

There are two conventional approaches for constructing Bayesian networks. Using the first approach ("the knowledge-based approach"), a person known as a knowledge engineer interviews an expert in a given field to obtain the knowledge of the expert about the field of expertise of the expert. The knowledge engineer and expert first determine the distinctions of the world that are important for decision making in the field of the expert. These distinctions correspond to the variables of the domain of the Bayesian network. The "domain" of a Bayesian network is the set of all variables in the Bayesian network. The knowledge engineer and the expert next determine the dependencies among the variables (the arcs) and the probability distributions that quantify the strengths of the dependencies.

In the second approach ("called the data-based approach"), the knowledge engineer and the expert first determine the variables of the domain. Next, data is accumulated for those variables, and an algorithm is applied that creates a Bayesian network from this data. The accumulated data comes from real world instances of the domain. That is, real world instances of decision making in a given field. Conventionally, this second approach exists for domains containing only discrete variables.

After the Bayesian network has been created, the Bayesian network becomes the engine for a decision-support system. The Bayesian network is converted into a computer-readable form, such as a file and input into a computer system. Then, the computer system uses the Bayesian network to determine the probabilities of variable states given observations, determine the benefits of performing tests, and ultimately recommend or render a decision. Consider an example where a decision-support system uses the Bayesian network of FIG. 2 to troubleshoot automobile problems. If the engine for an automobile did not start, the decision-based system could request an observation of whether there was gas 224, whether the fuel pump 226 was in working order by possibly performing a test, whether the fuel line 228 was obstructed, whether the distributor 230 was working, and whether the spark plugs 232 were working. While the observations and tests are being performed, the Bayesian network assists in determining which variable should be observed next.

U.S. application Ser. No. 08/240,019 filed May 9, 1994 entitled "Generating Improved Belief Networks" describes an improved system and method for generating Bayesian networks (also known as "belief networks") that utilize both expert data received from an expert ("expert knowledge") and data received from real world instances of decisions made ("empirical data"). By utilizing both expert knowledge and empirical data, the network generator provides an improved Bayesian network that is more accurate than conventional Bayesian networks. In addition, the exemplary embodiment facilitates the use of continuous variables in Bayesian networks and handles missing data in the empirical data that is used to construct Bayesian networks.

Expert knowledge consists of two components: an equivalent sample size or sizes ("sample size"), and the prior probabilities of all possible Bayesian-network structures ("priors on structures"). The effective sample size is the effective number of times that the expert has rendered a specific decision. For example, a doctor with 20 years of experience diagnosing a specific illness may have an effective sample size in the hundreds. The priors on structures refers to the confidence of the expert that there is a relationship between variables (e.g., the expert is 70 percent sure that two variables are related). The priors on structures can be decomposed for each variable-parent pair known as the "prior probability" of the variable-parent pair.

Empirical data is typically stored in a database. An example of acquiring empirical data can be given relative to the Bayesian network of FIG. 2. If, at a service station, a log is maintained for all automobiles brought in for repair, the log constitutes empirical data. The log entry for each automobile may contain a list of the observed state of some or all of the variables in the Bayesian network. Each log entry constitutes a case. When one or more variables are unobserved in a case, the case containing the unobserved variable is said to have "missing data." Thus, missing data refers to when there are cases in the empirical data database that contain no observed value for one or more of the variables in the domain. An assignment of one state to each variable in a set of variables is called an "instance" of that set of variables. Thus, a "case" is an instance of the domain. The "database" is the collection of all cases.

An example of a case can more clearly be described relative to the Bayesian network of FIG. 2. A case may consist of the battery age 202 being 2.132 years old, the battery working properly 208 being true, the alternator working properly 204 being true, the fan belt being intact 206 being true, the charge 210 being sufficient, the battery power 212 being sufficient, the starter working properly 220 being true, the engine turning over 218 being true, the amount of gas 224 being equal to 5.3 gallons, the fuel pump working properly 226 being true, the fuel line working properly 228 being true, the distributor working properly 230 being false, the spark plugs working properly 232 being true and the engine starting 234 being false. In addition, the variables for the gas gauge 222, the radio working properly 214 and the lights working properly 216 may be unobserved. Thus, the above-described case contains missing data.

Background Relative to Decision Graphs

Although Bayesian networks are quite useful in decision-support systems, Bayesian networks require a significant amount of storage. For example, in the Bayesian network 300 of FIG. 3A, the value of nodes X and Y causally influences the value of node Z. In this example, nodes X, Y, and Z have binary values of either 0 or 1. As such, node Z maintains a set of four probabilities, one probability for each combination of the values of X and Y, and stores these probabilities into a table 320 as shown in FIG. 3B. When performing probabilistic inference, it is the probabilities in table 320 that are accessed. As can be seen from table 320, only the probabilities for Z equaling 0 are stored; the probabilities for Z equaling 1 need not be stored as they are easily derived by subtracting the probability of when Z equals 0 from 1. As the number of parents of a node increases, the table in the node that stores the probabilities becomes multiplicatively large and requires a significant amount of storage. For example, a node having binary values with 10 parents that also have binary values requires a table consisting of 1,024 entries. And, if either the node or one of its parents has more values than a binary variable, the number of probabilities in the table increases multiplicatively.

To improve the storage of probabilities in a Bayesian network node, some conventional systems use a tree data structure. A tree data structure is an acyclic, undirected graph where each vertex is connected to each other vertex via a single path. The graph is acyclic in that there is no path that both emanates from a vertex and returns to the same vertex, where each edge in the path is traversed only once. FIG. 3C depicts an example tree data structure 330 that stores into its leaf vertices 336–342 the probabilities shown in table 320 of FIG. 3B. Assuming that a decision-support system performs probabilistic inference with X's value being 0 and Y's value being 1, the following steps occur to access the appropriate probability in the tree data structure 330: First, the root vertex 332, vertex X, is accessed, and its value determines the edge or branch to be traversed. In this example, X's value is 0, so edge 344 is traversed to vertex 334, which is vertex Y. Second, after reaching vertex Y, the value for this vertex determines which edge is traversed to the next vertex. In this example, the value for vertex Y is 1, so edge 346 is traversed to vertex 338, which is a leaf vertex. Finally, after reaching the leaf vertex 338, which stores the probability for Z equaling 0 when X=0 and Y=1, the appropriate probability can be accessed.

As compared to a table, a tree is a more efficient way of storing probabilities in a node of a Bayesian network, because it requires less space. However, tree data structures are inflexible in the sense that they can not adequately represent relationships between probabilities. For example, because of the acyclic nature of tree data structures, a tree cannot be used to indicate some types of equality relationships where multiple combinations of the values of the parent vertices have the same probability (i.e., refer to the same leaf vertex). This inflexibility requires that multiple vertices must sometimes store the same probabilities, which is wasteful. It is thus desirable to improve Bayesian networks with tree distributions.

Background Relative to Collaborative Filtering

Collaborative filtering systems have been developed that predict the preferences of a user. The term "collaborative filtering" refers to predicting the preferences of a user based on known attributes of the user, as well as known attributes of other users. For example, a preference of a user may be whether they would like to watch the television show "I Love Lucy" and the attributes of the user may include their age, gender, and income. In addition, the attributes may contain one or more of the user's known preferences, such as their dislike of another television show. A user's preference can be predicted based on the similarity of that user's attributes to other users. For example, if all users over the age of 50 with a known preference happen to like "I Love Lucy" and if that user is also over 50, then that user may be predicted to also like "I Love Lucy" with a high degree of confidence. One conventional collaborative filtering system has been developed that receives a database as input. The database contains attribute-value pairs for a number of users. An attribute is a variable or distinction, such as a user's age, gender or income, for predicting user preferences. A value is an instance of the variable. For example, the attribute age may have a value of 23. Each preference contains a numeric value indicating whether the user likes or dislikes the preference (e.g., 0 for dislike and 1 for like). The data in the database is obtained by collecting attributes of the users and their preferences.

It should be noted that conventional collaborative filtering systems can typically only utilize numerical attributes. As such, the values for non-numerical attributes, such as gender, are transposed into a numerical value, which sometimes reduces the accuracy of the system. For example, when a variable has three non-numerical states, such as vanilla, chocolate and strawberry, transposing these states into a numerical value will unintentionally indicate dissimilarity between the states. That is, if vanilla were assigned a value of 1, chocolate 2 and strawberry 3, the difference between each value indicates to the system how similar each state is to each other. Therefore, the system may make predictions based on chocolate being more similar to both vanilla and strawberry than vanilla is similar to strawberry. Such predictions may be based on a misinterpretation of the data and lead to a reduction in the accuracy of the system.

In performing collaborative filtering, the conventional system first computes the correlation of attributes between a given user "v" and each other user "u" (except v) in the database. The computation of the "correlation" is a well-known computation in the field of statistics. After computing the correlation, the conventional system computes, for example, the preference of a user "v" for a title of a television show "t" as follows:

$$pref(t, v) = <pref(t)> + \frac{\sum_u (pref(t, u) - <pref(t)>)corr(u, v)}{\sum_u corr(u, v)}$$

where "pref(t, v)" is the preference of user "v" for title "t," where "<pref(t)>" is the average preference of title "t" by all users, where "pref(t, u)" is the preference of user "u" for title "t," where "corr(u, v)" is the correlation of users "u" and "v," and the sums run over the users "u" that have expressed a preference for title "t." One drawback to this conventional system is that the entire database must be examined when predicting preferences, which requires a significant amount of processing time.

One way to improve upon this conventional system is to utilize a clustering algorithm. Using this approach, a collaborative filtering system uses any of a number of well-known clustering algorithms to divide the database into a number of clusters. For example, the algorithms described in KoJain, *Algorithms for Clustering Data* (1988) can be used. Each cluster contains the data of users whose preferences tend to be similar. As such, when predicting the preferences of one user in a cluster, only the preferences of the other users in the cluster need to be examined and not the preferences of all other users in the database. A collaborative filtering system that utilizes a clustering algorithm receives as input a database, as described above, a guess of the number of clusters and a distance metric. The guess of the number of clusters is provided by an administrator of the collaborative filtering system based on their own knowledge of how many clusters the database can probably be divided into. The distance metric is a metric provided by the administrator for each user in the database that estimates how similar one user is to each other in the database based on user's preferences and attributes. The distance metric is a range between 0 and 1 with 0 indicating that two users are least similar and 1 indicating that two users are most similar. This similarity is expressed as a numerical value. Each user will have a distance metric for every other user. Thus, the distance metrics are conveniently represented by an N-by-N matrix, where "N" is the number of users. After receiving the number of clusters and the distance metric, the clustering algorithm identifies the clusters.

The clustering algorithm outputs a list of the users in the database and a cluster number assigned to each user. To determine the preferences of a user, the other users within that user's cluster are examined. For example, if the system is attempting to determine whether a user would like the television show "I Love Lucy," the other users within that cluster are examined. If there are six other users within the cluster and five out of the six like "I Love Lucy," then it is likely that so will the user.

Although utilizing a clustering algorithm may be an improvement over the previously-described conventional system, it has limitations. One such limitation is that the exact number of clusters is determined manually, which renders the algorithm prone to human error. Another limitation is that all attributes are numerical and as such, the values of non-numerical attributes must be transposed into numerical values. Based upon the above-described limitations of conventional collaborative filtering systems, it is desirable to improve collaborative filtering systems.

SUMMARY OF THE INVENTION

One aspect of the invention is the construction of mixtures of Bayesian networks. Another aspect of the invention is the use of such mixtures of Bayesian networks to perform inferencing. A mixture of Bayesian networks (MBN) consists of plural hypothesis-specific Bayesian networks (HSBNs) having possibly hidden and observed variables. A common external hidden variable is associated with the MBN, but is not included in any of the HSBNs. The number of HSBNs in the MBN corresponds to the number of states of the common external hidden variable, and each HSBN models the world under the hypothesis that the common external hidden variable is in a corresponding one of those states.

The MBN structure is initialized as a collection of identical HSBNs whose discrete hidden variables are connected to all observed variables and whose continuous hidden variables are connected only to each of the continuous observed variables, the directionality being from hidden variable to observed variable.

In constructing the MBN, the parameters of the current HSBNs are improved using an expectation-maximization process applied for training data. The expectation-maximization process is iterated to improve the network performance in predicting the training data, until some criteria has been met. Early in the process, this criteria may be a fix number of iterations which may itself be a function of the number of times the overall learning process has iterated. Later in the process, this criteria may be convergence of the parameters to a near optimum network performance level.

Then, expected complete-model sufficient statistics are generated from the training data. The expected complete-model sufficient statistics are generated as follows. first, a vector is formed for each observed case in the training data. Each entry in the vector corresponds to a configuration of the discrete variables. Each entry is itself a vector with subentries. The subentries for a given case are (1) the probability that, given the data of the particular case, the discrete variables are in the configuration corresponding to the entry's position within the vector, and (2) information defining the state of the continuous variables in that case multiplied by the probability in (1). These probabilities are computed by conventional techniques using the MBN in its current form. In this computation, conditional probabilities derived from the individual HSBNs are weighted and then summed together. The individual weights correspond to the current probabilities of the common external hidden variable being in a corresponding one of its states. These weights are computed from the MBN in its current form using conventional techniques. Once such vectors are formed for all the cases represented by the training data, the expected complete-model sufficient statistics are then generated by summing the vectors together, i.e., summing the vectors over all cases.

After computation of the expected complete-model sufficient statistics for the MBN, the structures of the HSBNs are searched for changes which improve the HSBN's score or performance in predicting the training data given the current parameters. The MBN score preferably is determined by the HSBN scores, the score for the common hidden external variable, and a correction factor. If the structure of any HSBN changes as a result of this fast search, the prior steps beginning with the expectation-maximization process are repeated. The foregoing is iteratively repeated until the network structure stabilizes. At this point the current forms of the HSBNs are saved as the MBN. An MBN is thus generated for each possible combination of number of states of the hidden discrete variables including the common external hidden variable, so that a number of MBNs is produced in accordance with the number of combinations of numbers of states of the hidden discrete variables.

In one mode of the invention, the MBN having the highest MBN score is selected for use in performing inferencing. In another mode of the invention, some or all of the MBNs are retained as a collection of MBNs which perform inferencing in parallel, their outputs being weighted in accordance with the corresponding MBN scores and the MBN collection output being the weighted sum of all the MBN outputs.

Collaborative filtering may be performed by defining the observed variables to be the preferences of those users. The common hidden discrete variable then may be an unknown class variable, which is never discovered in the network generation process nor during the use of the MBN to perform inferencing.

BRIEF DESCRIPTION OF THE DRAWINGS

FIG. 1 depicts an example of a conventional Bayesian network.

FIG. 3A depicts a conventional Bayesian network.

FIG. 3B depicts a table containing the probabilities for one of the nodes of the conventional Bayesian network of FIG. 3A.

FIG. 3C depicts a tree data structure containing the probabilities for one of the nodes of the Bayesian network of FIG. 3A.

FIGS. 21 and 21B depict a flow chart of the steps performed by the calculate continuous score process of FIG. 19.

FIGS. 23A and 23B depict a flow chart of the steps performed by the network adjuster of FIG. 18.

FIG. 24 depicts a decision graph data structure as used by the Bayesian network of an exemplary embodiment of the present invention.

DETAILED DESCRIPTION OF THE INVENTION

Exemplary Operating Environment

Figure 2:
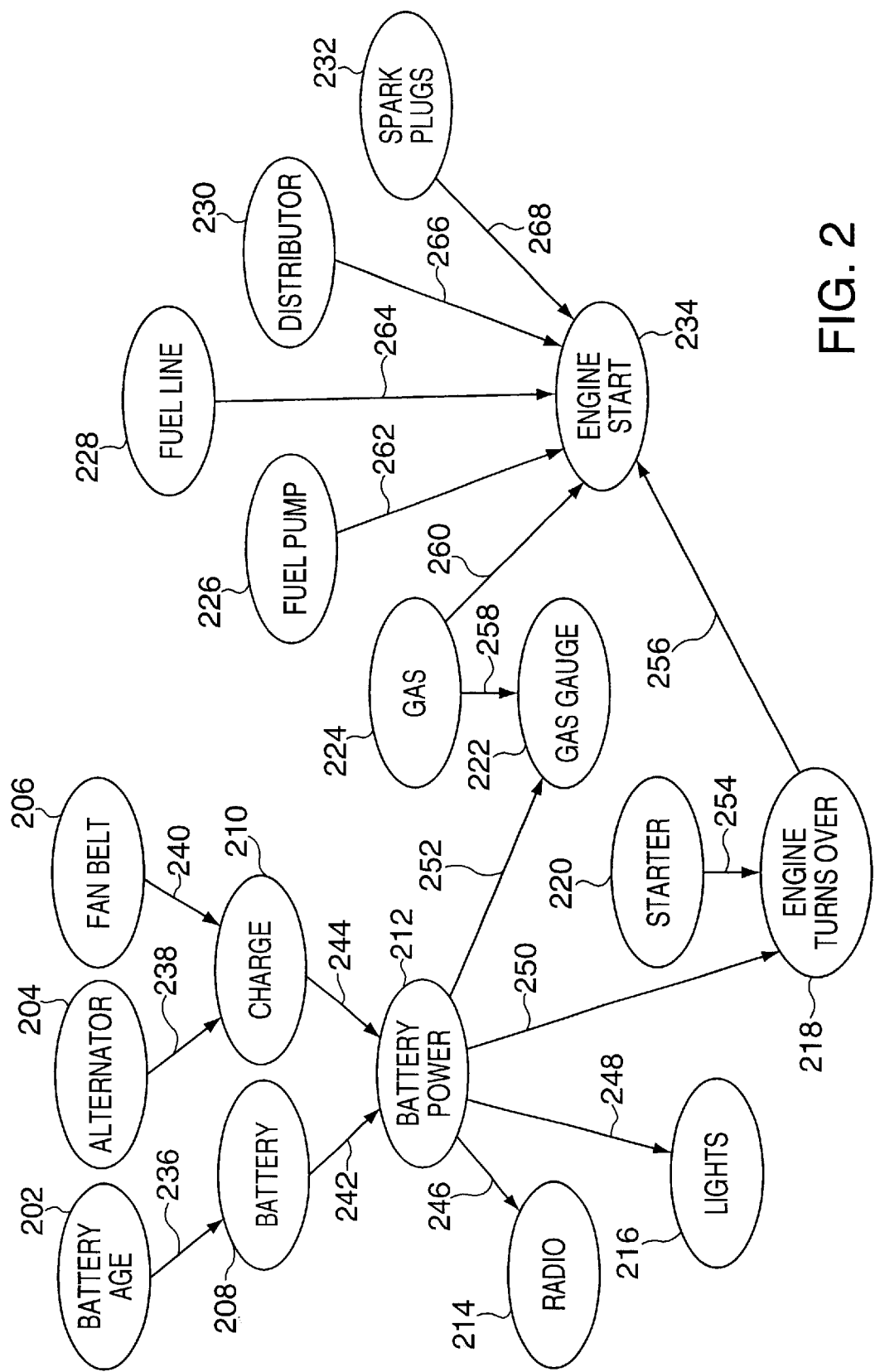
FIG. 2 depicts an example conventional Bayesian network for troubleshooting automobile problems.
Figure 4:
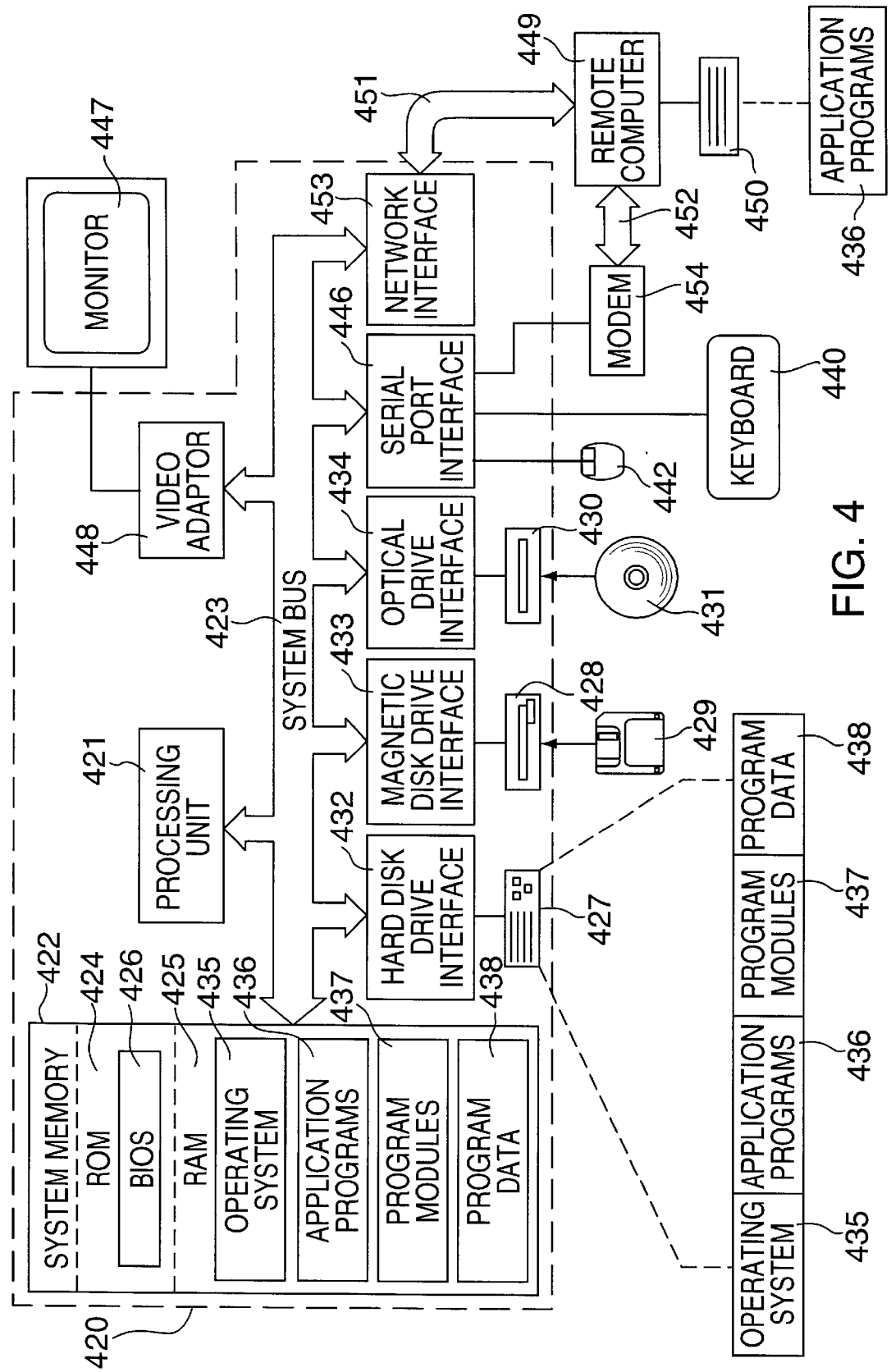
FIG. 4 depicts a computer system suitable for practicing an exemplary embodiment of the present invention.

FIG. 4 and the following discussion are intended to provide a brief, general description of a suitable computing environment in which the invention may be implemented. Although not required, the invention will be described in the general context of computer-executable instructions, such as program modules, being executed by a personal computer. Generally, program modules include processes, programs, objects, components, data structures, etc. that perform particular tasks or implement particular abstract data types. Moreover, those skilled in the art will appreciate that the invention may be practiced with other computer system configurations, including hand-held devices, multiprocessor systems, microprocessor-based or programmable consumer electronics, network PCs, minicomputers, mainframe computers, and the like. The invention may also be practiced in distributed computing environments where tasks are performed by remote processing devices that are linked through a communications network. In a distributed computing environment, program modules may be located both local and remote memory storage devices.

With reference to FIG. 4, an exemplary system for implementing the invention includes a general purpose computing device in the form of a conventional personal computer 420, including a processing unit 421, a system memory 422, and a system bus 423 that couples various system components including the system memory to the processing unit 421. The system bus 423 may be any of several types of bus structures including a memory bus or memory controller, a peripheral bus, and a local bus using any of a variety of bus architectures. The system memory includes read only memory (ROM) 424 and random access memory (RAM) 425. A basic input/output system 426 (BIOS), containing the basic process that helps to transfer information between elements within the personal computer 420, such as during start-up, is stored in ROM 424. The personal computer 420 further includes a hard disk drive 427 for reading from and writing to a hard disk, not shown, a magnetic disk drive 428 for reading from or writing to a removable magnetic disk 429, and an optical disk drive 430 for reading from or writing to a removable optical disk 431 such as a CD ROM or other optical media. The hard disk drive 427, magnetic disk drive 428, and optical disk drive 430 are connected to the system bus 423 by a hard disk drive interface 432, a magnetic disk drive interface 433, and an optical drive interface 434, respectively. The drives and their associated computer-readable media provide nonvolatile storage of computer readable instructions, data structures, program modules and other data for the personal computer 420. Although the exemplary environment described herein employs a hard disk, a removable magnetic disk 429 and a removable optical disk 431, it should be appreciated by those skilled in the art that other types of computer readable media which can store data that is accessible by a computer, such as magnetic cassettes, flash memory cards, digital video disks, Bernoulli cartridges, random access memories (RAMs), read only memories (ROM), and the like, may also be used in the exemplary operating environment.

A number of program modules may be stored on the hard disk, magnetic disk 429, optical disk 431, ROM 424 or RAM 425, including an operating system 435, one or more application programs 436, other program modules 437, and program data 438. A user may enter commands and information into the personal computer 420 through input devices such as a keyboard 440 and pointing device 442. Other input devices (not shown) may include a microphone, joystick, game pad, satellite dish, scanner, or the like. These and other input devices are often connected to the processing unit 421 through a serial port interface 446 that is coupled to the system bus, but may be connected by other interfaces, such as a parallel port, game port or a universal serial bus (USB). A monitor 447 or other type of display device is also connected to the system bus 423 via an interface, such as a video adapter 448. In addition to the monitor, personal computers typically include other peripheral output devices (not shown), such as speakers and printers.

The personal computer 420 may operate in a networked environment using logical connections to one or more remote computers, such as a remote computer 449. The remote computer 449 may be another personal computer, a server, a router, a network PC, a peer device or other common network node, and typically includes many or all of the elements described above relative to the personal computer 420, although only a memory storage device 450 has been illustrated in FIG. 4. The logical connections depicted in FIG. 4 include a local area network (LAN) 451 and a wide area network (WAN) 452. Such networking environments are commonplace in offices, enterprise-wide computer networks, intranets and Internet.

When used in a LAN networking environment, the personal computer 420 is connected to the local network 451 through a network interface or adapter 453. When used in a WAN networking environment, the personal computer 420 typically includes a modem 454 or other means for establishing communications over the wide area network 452, such as the Internet. The modem 454, which may be internal or external, is connected to the system bus 423 via the serial port interface 446. In a networked environment, program modules depicted relative to the personal computer 420, or portions thereof, may be stored in the remote memory storage device. It will be appreciated that the network connections shown are exemplary and other means of establishing a communications link between the computers may be used.

Introduction to Mixtures of Bayesian Networks

Figure 5:
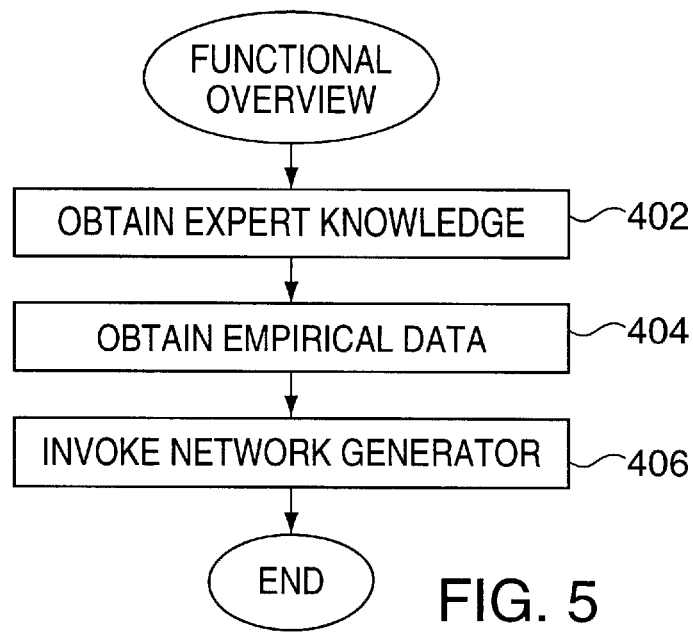
FIG. 5 depicts a functional overview of the Bayesian network generator of the exemplary embodiment.

FIG. 5 depicts a functional overview of the MBN generator of an exemplary embodiment. In order to use the MBN generator of the exemplary embodiment, a knowledge engineer first obtains expert knowledge from an expert in a given field (step 402). This expert knowledge includes one or more sample sizes and structure priors which includes the expert's prior probability that C has |C| states, p(|C|) and the expert's prior probability for each HSBN structure given c and p($B_s^e$||C|). The knowledge engineer then obtains empirical data from real world invocations of decision making in the given field (step 404). After obtaining the expert knowledge and the empirical data, the knowledge engineer invokes the network generator of the exemplary embodiment to create an improved MBN that can then be used as the basis for a decision-support system (step 406). Although step 402 has been described as occurring before step 404, one skilled in the art will appreciate that step 404 may occur before step 402.

Figure 6:
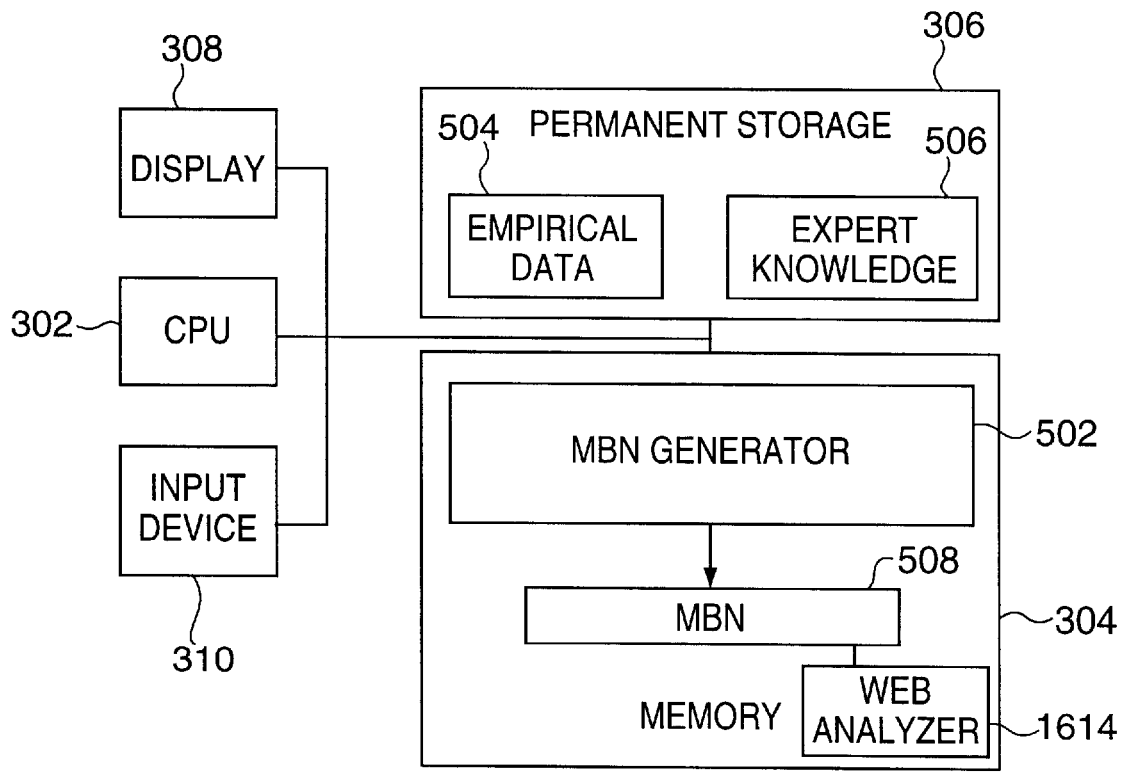
FIG. 6 depicts the Bayesian network generator of an exemplary embodiment in a computer system suitable for practicing the present invention.

FIG. 6 depicts the MBN generator of an exemplary embodiment in a computer system of the type depicted in FIG. 4 suitable for practicing the exemplary embodiment of the present invention. The MBN generator of the exemplary embodiment 502 resides within a memory 304 and receives empirical data 504 and expert knowledge 506 as input. The expert knowledge 506 typically comprises a sample size, and the priors on structures. Both the empirical data 504 and the expert knowledge 506 reside in a permanent storage device 306. The empirical data 504 is typically comprised of cases stored in a database ("the empirical data database"). In response to receiving both the empirical data 504 and the expert knowledge 506, the MBN generator 502 of the exemplary embodiment generates an MBN 508. The memory 304 and permanent storage 306 are connected to a central processing unit 302, a display 308 which may be a video display, and an input device 310.

Two types of problems that are addressed by the present invention are prediction tasks and clustering tasks.

A database of observed cases over a set of variables is given. The prediction problem is to learn the statistical relationships among those variables for prediction. The clustering problem is to group the rows of the database into groups so that groups of similar users can be discovered and properties of the groups can be presented. The invention provides a flexible and rich class of models (for both of these problems) and provide algorithms to learn which model from this class of models best fits the data. The class of models employed by the invention is called a mixture of Bayesian networks (MBN). The processes for learning MBNs include several advantageous features including: (a) interleaving parameter and structural search, (b) expected complete model sufficient statistics, and (c) an outer loop for determining the number of states of the discrete hidden variables.

Figure 7:
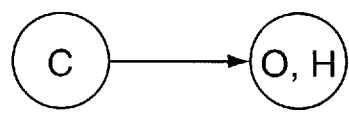
FIG. 7 depicts an exemplary Bayesian network consisting of a mixture of Bayesian networks in accordance with the invention.
Figure 8:
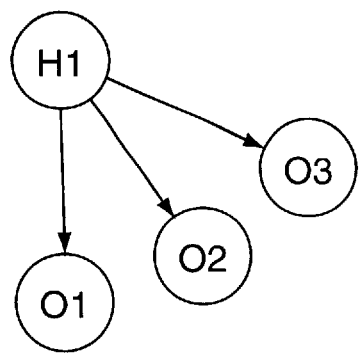
FIG. 8 depicts one exemplary hypothesis-specific Bayesian network in the mixture of Bayesian networks of FIG. 7.
Figure 9:
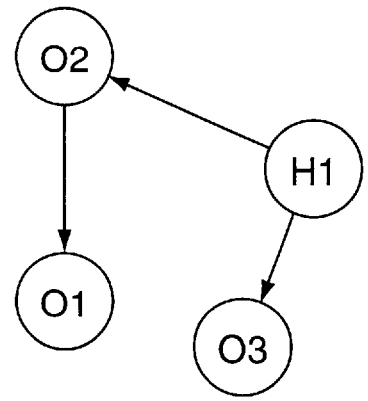
FIG. 9 depicts another exemplary hypothesis-specific Bayesian network in the mixture of Bayesian networks of FIG. 7.

The present invention is embodied in a mixture of Bayesian networks, which corresponds to a graphical model as shown in FIG. 7. C, the class variable, is a discrete variable, that is not observed, O is a set of observed variables and H is a set of unobserved (hidden) variables. As one example, C can have two possible values. In this case, the conditional distribution of sets of variables O and H given C=0 might be represented by the Bayesian network in FIG. 8 and the conditional distribution of sets of variables O and H given C=1 in FIG. 9. Both sets of variables O and H may contain a combination of discrete and continuous variables. The only restriction is that no continuous variable can point at a discrete variable in any of the Bayesian networks. Given a database of observations for the variables in O, the goal is to select the number of values for the class C (i.e. |C|), the parameters θc (that describe the percentage of the database attributed to the c'th Bayesian network), and the |C| Bayesian network structures and their parameters. A naive method for learning a single Bayesian network with hidden variables is to (1) fix the structure of the Bayesian network (2), use the expectation maximization (EM) algorithm to find good (e.g. ML or MAP) parameter values for the Bayesian network and (3) use the parameters obtained from step 2 to compute a score for the model using the Cheeseman-Stutz, BIC or other approximation of the posterior probability for the model. There are two difficulties with this approach. First, the EM algorithm is an iterative algorithm that is too computationally expensive to run on many models. Second, the approximate scores for models with hidden variables (C and H in the case of a mixture of Bayesian networks) do not factor into scores for individual nodes. If it did factor one could use previously calculated scores to make search more efficient. Both problems are solved in the present invention by interleaving the EM algorithm's search for parameters with a search for the structure of the Bayesian networks. By interleaving the search for Bayesian networks and the search for parameters, the invention (in essence) creates scores that factor according to the model and thus allows for efficient search of model structure. In addition, the method of the invention independently searches for each of the Bayesian networks in the mixture of Bayesian networks.

Let Hc and Oc be continuous variables (denoted by $\Gamma\_1$ to $\Gamma\_nc$ and use $\gamma\_1$ to $\gamma\_nc$ to denote values for these variables) and let C, Hd and Od be discrete variables (denoted by $\Delta\_1$ to $\Delta\_nd$ and use $\delta\_1$ to $\delta\_nd$ to denote values for these variables) where nc is the number of continuous variables and nd is the number of discrete variables. Let $\Gamma$ denote the set of all of the continuous variables and $\Delta$ denote the set of all of the discrete variables. We use $\gamma$ to denote a vector of values for the variables in $\Gamma$ and $\delta$ is an index to a configuration of the discrete variables $\Delta$. Let $y_{case}$ be the configuration of the observed variables O in a particular case, and let $x_{case}$ be a complete configuration of C, H and O. The key idea to our solution is a concept called complete model sufficient statistics. The complete model sufficient statistics for a complete case is a vector $T(x_{case})$. This vector is defined as follows:

$$T(x_{case}) = <<N\_1, R\_1, S\_1>, \ldots, <N\_m, R\_m, S\_m>>$$

From the foregoing definition, the vector $T(x_{case})$ consists of m triples, where m is the number of possible discrete configurations for the discrete variables $\Delta$. Suppose the discrete variables in $x_{case}$ takes on the $i^{th}$ configuration. The entries $N\_j$ ($j<>i$) are zero. The $R\_j$ are vectors of length nc and the $S\_j$ are square matrices of size nc×nc. The $R\_j=0$ if $j<>i$ and $R\_i=\gamma$ otherwise. The $S\_j=0$ if $j<>i$ and $S\_i=\gamma'*\gamma$ otherwise (where $\gamma'$ is the transpose of $\gamma$). (Note that a boldface zero, e.g. 0 denotes either a zero vector or matrix.)

Example Involving Complete Data

The following is a working example in which a complete database with 2 cases is given as:

| O1 | O2 | O3 | H1 | C |
|---|---|---|---|---|
| 5.1 | 10 | 0 | 1 | 1 |
| 2.7 | 9 | 0 | 0 | 0 |

The variables O1 and O2 are continuous. The remaining variables are discrete.

In the invention, all possible configurations of the discrete variables are indexed in some fixed way, an example of which is given in the table below:

| $\Delta$ | C | H1 | O3 |
|---|---|---|---|
| 1 | 0 | 0 | 0 |
| 2 | 0 | 0 | 1 |
| 3 | 0 | 1 | 0 |
| 4 | 0 | 1 | 1 |
| 5 | 1 | 0 | 0 |
| 6 | 1 | 0 | 1 |
| 7 | 1 | 1 | 0 |
| 8 | 1 | 1 | 1 |

From the foregoing tables, the complete model statistics vector for case 1 is:

$$T(case1) = \langle\langle 0, 0, 0\rangle, \langle 0, 0, 0\rangle, \langle 0, 0, 0\rangle, \langle 0, 0, 0\rangle,$$

$$\langle 0, 0, 0\rangle, \langle 0, 0, 0\rangle, \left\langle 1, \begin{bmatrix}5.1\\10\end{bmatrix}, \begin{bmatrix}26.01 & 51\\51 & 100\end{bmatrix}\right\rangle, \langle 0, 0, 0\rangle\rangle$$

The complete model statistics vector for case 2 is:

$$T(case2) = \left\langle\left\langle 1, \begin{bmatrix}2.7\\9\end{bmatrix}, \begin{bmatrix}7.29 & 24.3\\24.3 & 81\end{bmatrix}\right\rangle, \langle 0, 0, 0\rangle, \langle 0, 0, 0\rangle,$$

$$\langle 0, 0, 0\rangle, \langle 0, 0, 0\rangle, \langle 0, 0, 0\rangle, \langle 0, 0, 0\rangle, , \langle 0, 0, 0\rangle\rangle$$

The expected complete model sufficient statistics is a vector ECMSS where $$ECMSS = \sum_{case=1}^{l} E(T(x_{case})|y_{case}, \theta, S)$$

The expectation of $T(x_{case})$ is computed by performing inference in a Bayesian network using conventional techniques well-known to those skilled in the art. The sum of $T(x_1)$ and $T(x_2)$ is simply scalar, vector, or matrix addition (as appropriate) in each coordinate of the vector.

Example Involving Incomplete Data

The following is a working example in which an incomplete data base is given. The incomplete data base is given in the following table, in which the variables O1 and O2 are continuous and O3, H1, and C are binary discrete and the symbol "?" denotes unknown data:

| O1 | O2 | O3 | H1 | C |
|---|---|---|---|---|
| 5.1 | 10 | 0 | ? | ? |
| 2.7 | 9 | 0 | ? | ? |

The vectors $T(x_{case})$ for each case are readily inferred from the foregoing table in accordance with the definition of $T(x_{case})$ as follows:

$$T(case1) = \left\langle\left\langle P(\Delta=1|y_1), P(\Delta=1|y_1)\begin{bmatrix}5.1\\10\end{bmatrix},\right.\right.$$

$$P(\Delta=1|y_1)\begin{bmatrix}26.01 & 51\\51 & 100\end{bmatrix}\right\rangle, \ldots,$$

$$\left\langle P(\Delta=m|y_1), P(\Delta=m|y_1)\begin{bmatrix}5.1\\10\end{bmatrix},\right.$$

$$\left.\left.P(\Delta=m|y_1)\begin{bmatrix}26.01 & 51\\51 & 100\end{bmatrix}\right\rangle\right\rangle$$

$$T(case2) = \left\langle\left\langle P(\Delta=1|y_2), P(\Delta=1|y_2)\begin{bmatrix}2.7\\9\end{bmatrix},\right.\right.$$

$$P(\Delta=1|y_2)\begin{pmatrix}7.29 & 24.3\\24.3 & 81\end{pmatrix}\right\rangle, \ldots,$$

$$\left\langle P(\Delta=m|y_2), P(\Delta=m|y_2)\begin{bmatrix}2.7\\9\end{bmatrix},\right.$$

$$\left.\left.P(\Delta=m|y_2)\begin{bmatrix}7.29 & 24.3\\24.3 & 81\end{bmatrix}\right\rangle\right\rangle$$

Having the expected complete model sufficient statistics, the invention uses these as complete model sufficient statistics to perform search among alternative Bayesian networks using the methods described below. The way to do this it to form the expected complete model sufficient statistics for each value of C.

Hence, for each value of C, the expected complete model sufficient statistics for O and H is formed, which is denoted ECMSS_c. The expected complete model sufficient statistics for O and H can then be used for searching for Bayesian networks. Since the expected complete model sufficient statistics for each value of C are distinct (and we have assumed parameter independence) we can use the statistics for each value of C to search for the respective Bayesian network independently of other Bayesian networks. By creating the complete model sufficient statistics we have (in essence) created new scores that factor according to the Bayesian networks, as discussed below in this specification. For instance, let the indexing of the discrete configurations be as described in the table below.

| Δ | C | H1 | O3 |
|---|---|----|----|
| 1 | 0 | 0  | 0  |
| 2 | 0 | 0  | 1  |
| 3 | 0 | 1  | 0  |
| 4 | 0 | 1  | 1  |
| 5 | 1 | 0  | 0  |
| 6 | 1 | 0  | 1  |
| 7 | 1 | 1  | 0  |
| 8 | 1 | 1  | 1  |

Using the index Δ, ECMSS_j is derived from ECMSS by selecting the appropriate triples from ECMSS. For this index we would have ECMSS_0=<triple_1, triple_2, triple_3, triple_4>

ECMSS_1=<triple_5, triple_6, triple_7, triple_8>

In this case, the triple_j is the triple <□_j, R_j, S_j> from ECMSS. Specifically, for example, triple-1 is:

$$\langle P(\Delta=1|y_2) + P(\Delta=1|y_1), P(\Delta=1|y_2)\begin{bmatrix}2.7\\9\end{bmatrix} + P(\Delta=1|y_1)\begin{bmatrix}5.1\\10\end{bmatrix},$$

$$P(\Delta=1|y_2)\begin{bmatrix}7.29 & 24.3\\24.3 & 81\end{bmatrix} + P(\Delta=1|y_1)\begin{bmatrix}26.01 & 51\\51 & 100\end{bmatrix}\rangle$$

$$= \langle P(\Delta=1|y_2) + P(\Delta=1|y_1), \begin{bmatrix}2.7 \times P(\Delta=1|y_2) + 5.1 \times P(\Delta=1|y_1)\\9 \times P(\Delta=1|y_2) + 10 \times P(\Delta=1|y_1)\end{bmatrix},$$

$$\begin{bmatrix}7.29 \times P(\Delta=1|y_2) + 26.01 \times P(\Delta=1|y_1) & 24.3 \times P(\Delta=1|y_2) + 51 \times P(\Delta=1|y_1)\\24.3 \times P(\Delta=1|y_2) + 51 \times P(\Delta=1|y_1) & 7.29 \times P(\Delta=1|y_2) + 26.01 \times P(\Delta=1|y_1)\end{bmatrix}\rangle$$

From the foregoing, a general process for learning a mixture of Bayesian networks (MBN) in accordance with a exemplary embodiment of the invention is as follows:

1. Choose the number of possible states for the variables C and Hd.
2. Initialize a hypothesis-specific Bayesian-network structure for each hypothetical value of C to be a graph in which each variable in H points to each variable in O—except for the restriction that no continuous variable may point to a discrete variable—and in which there are no additional arcs. Choose initial values for the parameters in each of these hypothesis-specific Bayesian networks. The parameter values can be set at random, with agglomerative methods, marginal+noise, or other methods. Choose values for the parameters θc, e.g. choose them to be uniform. The marginal+noise initialization method is as follows: Take the initial MBNs, which is a Bayesian network with discrete hidden variables. Remove all hidden nodes and adjacent arcs and adjust the local distributions, creating model $s_i$ (a submodel induced by the non-hidden variables). Data is complete with respect to $s_i$. Compute MAP parameter values for $s_i$ (or a model that encodes more independencies than $s_i$). Those practiced in the art will recognize that this step can be performed in closed form assuming conjugate priors are used. Create a conjugate distribution for the parameters of $s_i$, $\theta_i$, whose MAP parameters agree with the MAP parameters just computed and whose equivalent sample size is specified by the user. This sample size may be different than the one(s) used to determine the parameter priors. Next, for each non-hidden node X in s and for each configuration of X's hidden parents, initialize the parameters of the local distributions $p(x|\Pi_x,\theta_s,s)$ by drawing from the distribution for $\theta_i$ just described. For each hidden node H in s and for each configuration of H's (possible) parents, initialize H's multinomial parameters to be some fixed distribution (e.g., uniform). In an alternative embodiment, initialize by sampling from a Dirichlet distribution specified by the user. Those practiced in the art will recognize that this initialization method can be applied to any parameter optimization algorithm that requires an initial seed (e.g, MCMC, simulated annealing, EM, gradient ascent, conjugate gradient, Newton—Raphson, and quasi-Newton).
3. Use the EM algorithm to do one E step and one M step to improve the parameter estimates for the current model.
4. If some convergence criterion is not satisfied then go to step 3.
5. Using the current MBN, create the expected complete-model sufficient statistics ECMSS and ECMSS_c for each hypothesis-specific Bayes net corresponding to C=c. For every C=c, translate ECMSS_c to expected sufficient statistics $N_{ijk}$, sample mean, scatter matrix, and sample size (for use in the structure search step that follows). Those practiced in the art will recognize that this step can be performed with standard techniques.
6. Using the expected complete model sufficient statistics for each value of C, search for structures that improve the score. The result is a new network structure s with new parameter values.
7. If some Convergence criterion is not satisfied then go to step 3.
8. Save the model that is selected. Choose another number of possible states for the variable C and Hd. Go to step 2. Repeat this step and compare the models that are selected. Use the corrected version of the Cheeseman-Stutz score.

The choice in step 4 of whether to go to step 3 or step 5 can be decided in a variety of ways, e.g. by checking the convergence of the likelihood, by limiting the number of iterations allowed, and so forth. There are various modifications of this process that we have found to be useful including having the process adaptively prune out hypothesis-specific Bayesian networks for which θc (the support for the HSBN corresponding to C=c) falls below some threshold (e.g., 1/N).

The following is a description of different modes of the foregoing process.

$((EM)\#ES^*M)^*$:

In this mode of the process, the EM step is iteratively repeated (steps 3 and 4) a limited number (#) of times while the remainder of the process including the search for optimum structure is carried out to convergence.

$((EM)^*ES^*M)^*$:

In this mode of the process, the EM steps are iterated until convergence before performing the remainder of the algorithm and the structure search is also carried to convergence.

$((EM)^{\#(iteration)}ES^*M)^*$

In this version of the process, the iteration of the EM step (steps 3 and 4) is carried out over a limited number (#) of iterations which is a function of the number of iterations of the structure search step (step 6).

$((EM)^\#ES^\#M)^*$:

In this version of the process, the number of iterations of the EM step is a fixed number, the number of iterations of the structure search step is a fixed (possibly different) number.

$((EM)^*ES^\#M)^*$

In this version of the process, the EM steps are always iterated to convergence, while the structure search is iterated a limited number of times.

$((EM)^{\#(iteration)}ES^\#M)^*$

In this version of the process, the number of iterations of the EM step is a function of the number of iterations of the structure search step performed thus far, while the number of iterations of the structure search is a fixed number.

The foregoing example uses discrete variables in the Bayesian network where all of the conditional probability in the Bayesian network are represented as full tables. In an embodiment of the invention described below in this specification, there are decision graphs instead of the tables.

Implementations of Mixtures of Bayesian Networks

Figure 10:
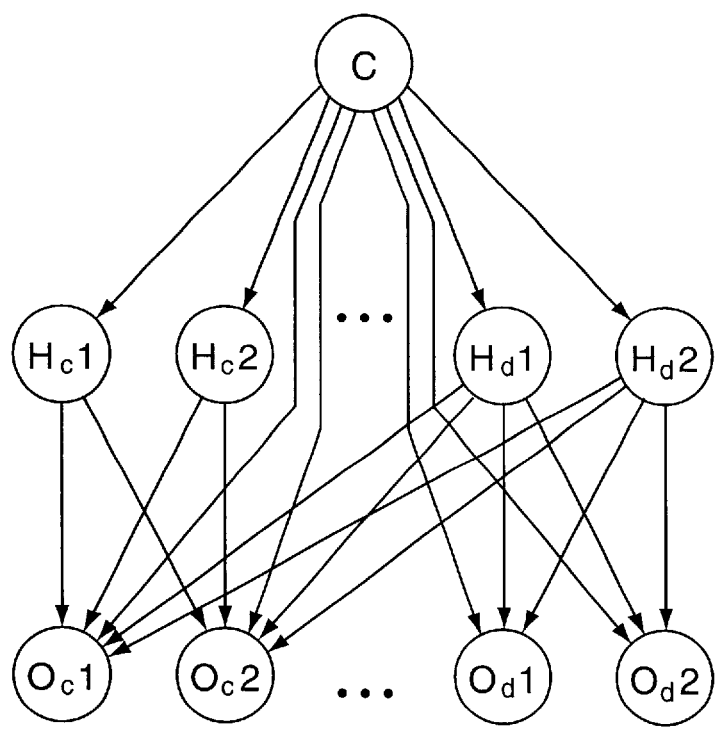
FIG. 10 depicts an initial Bayesian network.
Figure 11:
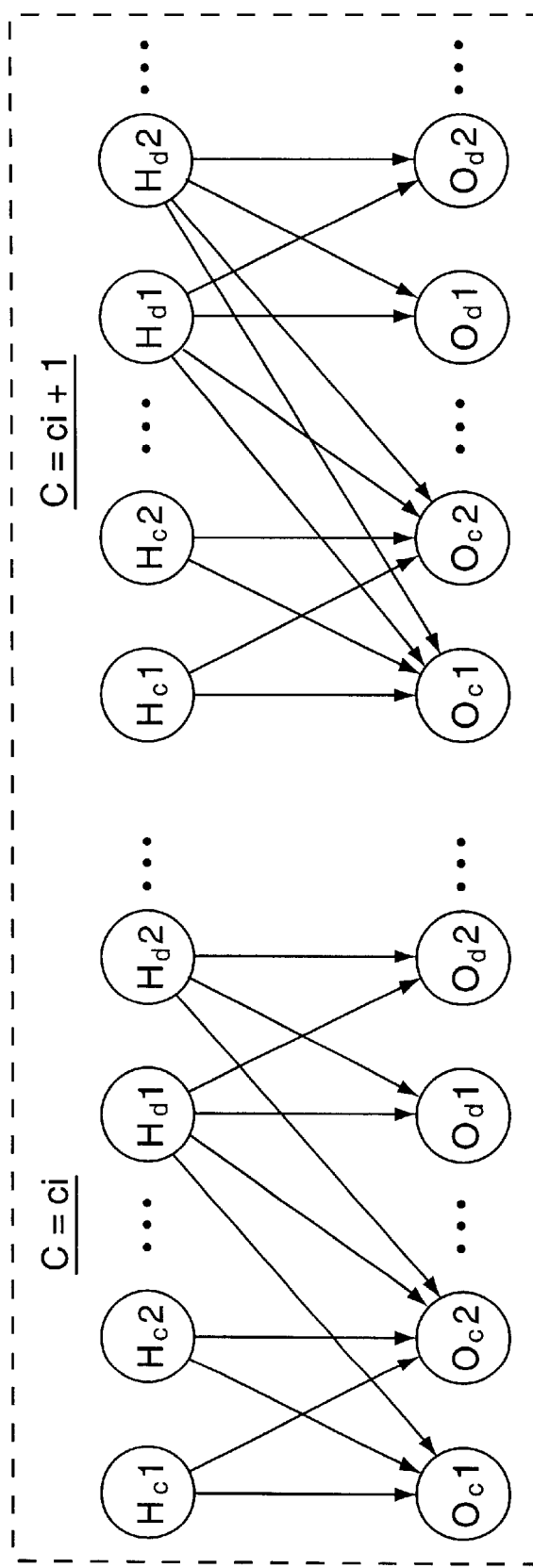
FIG. 11 depicts a mixture of hypothesis specific networks corresponding to the network of FIG. 10.

FIG. 10 illustrates a Bayesian network consisting of the class variable C connected to every other variable, the continuous hidden variables H, connected to all continuous observed variables, the discrete hidden variables Hd connected to all observed variables, the continuous observed variables $O_c$ and the discrete observed variables $O_d$. The present invention represents the model depicted in FIG. 10 as a mixture of individual Bayesian networks, each individual network corresponding to the hypothesis that the class variable C is in a particular one of its states (i.e., C=$c_i$). Each individual network in the mixture is therefore referred to as a hypothesis-specific Bayesian network (HSBN). The corresponding mixture of Bayesian networks (MBNs) consisting of plural HSBNs is illustrated in FIG. 11. As indicated in the drawing of FIG. 11, one HSBN corresponds to the hypothesis that C=$c_i$ while another HSBN corresponds to the hypothesis that C=$c_{i+1}$, and so forth. In each HSBN of FIG. 11, the class variable C is not included because its state is hypothetically known, and is therefore not a variable. The other variables of the network of FIG. 10, namely the hidden variables H and the observed variables O are included in each HSBN of FIG. 8. However, after the individual HSBN structures and parameters have been learned, different HSBNs will tend to have different structures, as indicated in FIG. 11.

Figure 12:
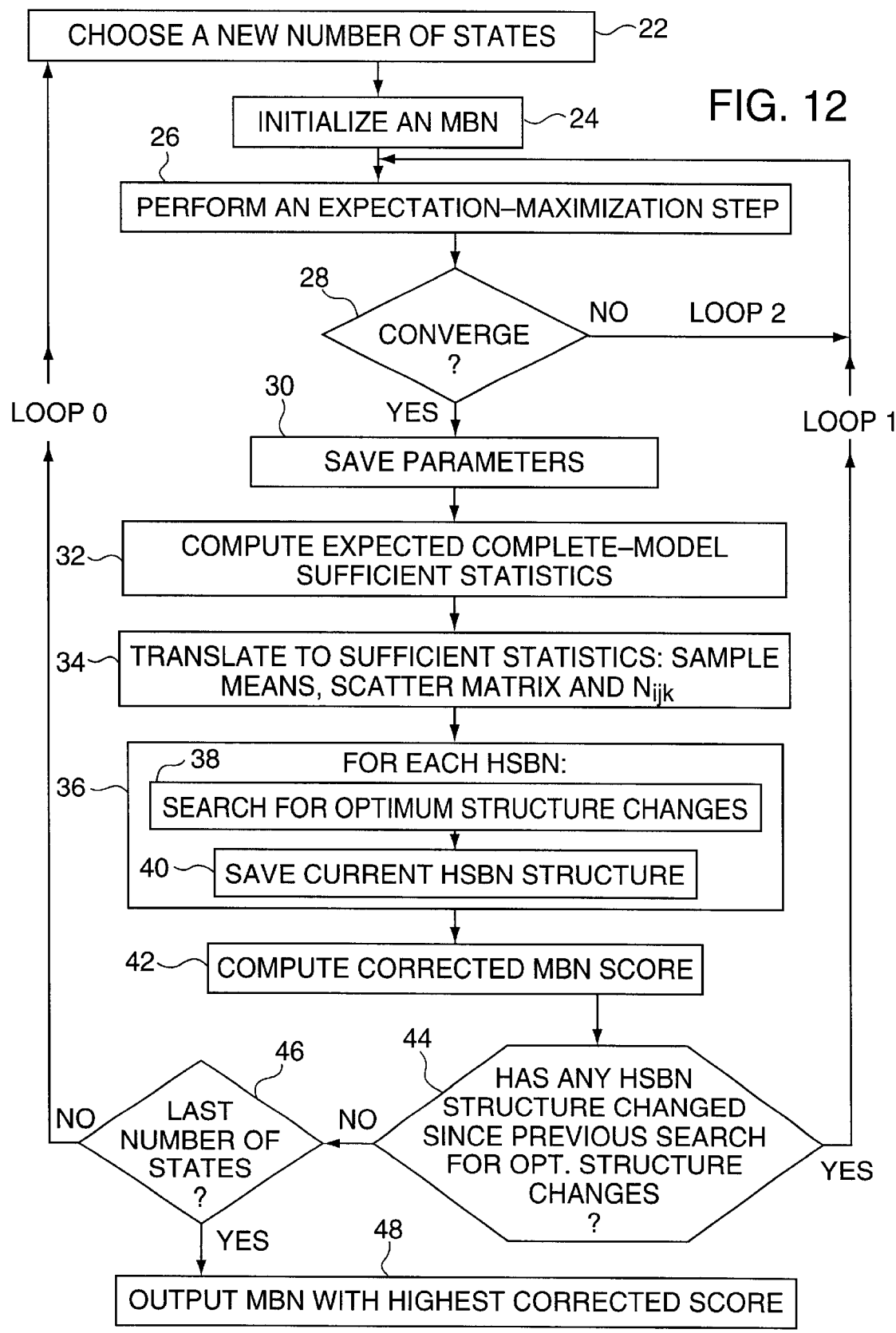
FIG. 12 illustrates a method of generating mixtures of Bayesian networks in accordance with a first exemplary embodiment of the invention.

FIG. 12 illustrates a first exemplary embodiment of the process for generating mixtures of Bayesian networks (MBNs) discussed above. The first step (block 22 of FIG. 12) is to choose the number of states of the external class variable C and of each discrete hidden variables $H_d$. The number of states of C determines the number of HSBNs in the MBN to be generated. Preferably, when this step is initially performed, the number of states of C and the number of states of each discrete hidden variable H are set to their smallest values. For example, if the possible number of states of C lies in a range of 5 and 10, the number of states of $H_{d1}$ lies in a range of 3 and 6 and the number of states of $H_{d2}$ lies in a range of 11 and 14, then the lowest number in each range is chosen initially. In subsequent repetitions of this step by an outer loop (which will be discussed below), all combinations of the numbers of states are eventually chosen.

The next step (block 24 of FIG. 12) is to initialize an MBN. Preferably, this is done by forming an MBN consisting of identical HSBNs with an arc from each hidden variable to each observed variable with the proviso that continuous hidden are connected only to continuous observed variables as shown in FIG. 11. Also, in this step the HSBN parameters are initialized using the marginal+noise method. The expectation-maximization step (block 26 of FIG. 12) is then performed on all HSBNs in the MBN. The expectation-maximization step is described in Dempster et.al., "Maximum Likelihood From Incomplete Data Via the EM Algorithm", *Journal of the Royal Statistical Society* B, Volume 39 (1977). This step produces a more optimal version of the parameters of the individual HSBNs. A test for convergence is then performed (block 28 of FIG. 12). If the expectation-maximization step has not converged (NO branch of block 28), then the process loops back to the expectation-maximization step of block 26 in an inner loop (loop 2 of FIG. 12). Otherwise (YES branch of block 28), the network parameters are saved (block 30).

The expected complete-model sufficient statistics (ECMSS) are then computed (block 32). The computation of each of the probabilities p(Δ) in T($x_{case}$) is performed by conventional inference techniques using the current version of the MBN. How inferencing is performed with an MBN is described below herein with reference to FIG. 16. The computation of T($x_{case}$) has been described above in this specification. The ECMSS are then translated (block 34 of FIG. 12) using conventional techniques into expected sufficient statistics $N_{ijk}$, sample means, scatter matrix, and sample size for each HSBN, all of which are defined below in this specification with reference to a structure search process. Next, an optimum structure is found for each HSBN (block 36) by treating the expected sufficient statistics as sufficient statistics for complete data. The step of block 36 includes searching for the optimum structure of the HSBN (block 38) and saving the optimum structure HSBN (block 40). The search of block 38 is described below in this specification, and employs the expected sufficient statistics, sample means, scatter matrix and sample size computed from the ECMSS in the step of block 34. The search is based upon scoring each candidate structure of the HSBN, the score being the marginal likelihood of the expected complete data D given the candidate network structure s, namely p(D|s). With each selection of optimal structures for the HSBNs of the MBNs, an overall MBN score is as follows (block 42):

$$\text{score}(s) = p(s)p(D_c|s)\frac{p(D|\bar{\theta}, s)}{p(D_c|\bar{\theta}, s)} \quad (1)$$

where $\bar{\theta}$ denotes the MAP parameters given D, $D_c$ is a complete data set whose sufficient statistics are equal to the expected complete-model sufficient statistics, and p(s) is the prior probability of MBN structure s (prior on structure). The prior on structure p(s) is given by:

$$p(s) = p(|C|)\Pi_{B_s^e \in MBN} p(B_s^t || C)$$

where |C| is the number of states of the hidden variable C. The exemplary embodiment uses the log of the score in order to reduce numerical instability:

$$\log \text{score}(s) = \log p(|C|) + \left( \sum_{B_s^e \in MBN} \log p(B_s^t || C) \right) +$$
$$\log p(D_c|s) + \log p(D|\bar{\theta}, s) - \log p(D_c|\bar{\theta}, s)$$

This MBN score is the Cheeseman-Stutz score. (See P. Cheeseman and J. Stutz, "Bayesian Classification Auto-Class: Theory and Results", *Advances in Knowledge Discovery and Data Mining*, AAAI Press [1995]).

Next, a test for convergence of the structure search of step 38 is performed (block 44). The test for convergence in this embodiment consists of inquiring whether any HSBN structure within the present MBN has changed since the performance of this convergence test or since the HSBNs were initialized. If there have been any structural changes (YES branch of block 44), the structure search has not converged and the process loops back to the expectation-maximization step of block 26 in loop 1 of FIG. 12. Otherwise (NO branch of block 44), with no structural changes since the previous iteration of loop 1, the structure search has converged and the next step is to determine whether the various combinations of the number of states of the discrete class variable and discrete hidden variables has been exhausted (block 46 of FIG. 12). If not (NO branch of block 46), the process loops back in an outer loop (loop 0 of FIG. 12) to the step of block 22 in which the next combination of number of states is selected. Otherwise (YES branch of block 46), the MBN having the highest score is selected and output for use in performing inferencing (block 48). Alternatively, some or all of the MBNs are output as a collection of MBNs along with their respective MBN scores. In this alternative mode (described below herein), inferencing from a given input is performed by all of the MBNs in the collection in parallel, their outputs being weighted in accordance with their respective MBN scores, and the weighted sum of the MBN outputs being the output of the collection of MBNs.

Figure 13:
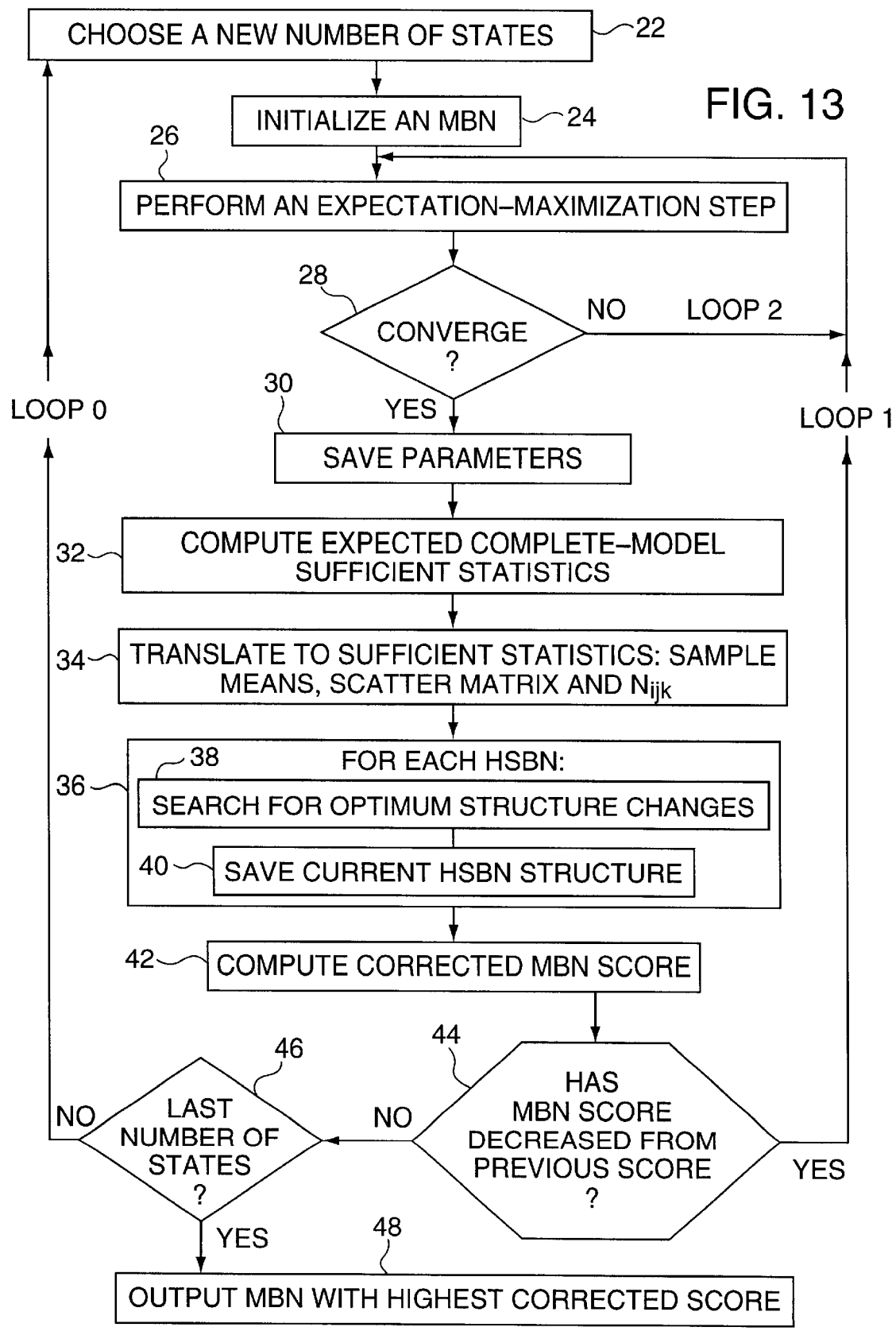
FIG. 13 illustrates a method of generating mixtures of Bayesian networks in accordance with a second exemplary embodiment of the invention.

FIG. 13 illustrates an alternative embodiment in which the test for convergence of block 44 consists of determining whether the MBN score has decreased since the previous iteration of the middle loop. If the MBN score has not increased, then loop 1 of FIG. 13 has converged. Otherwise, if the score has increased then loop 1 has not converged.

Figure 14:
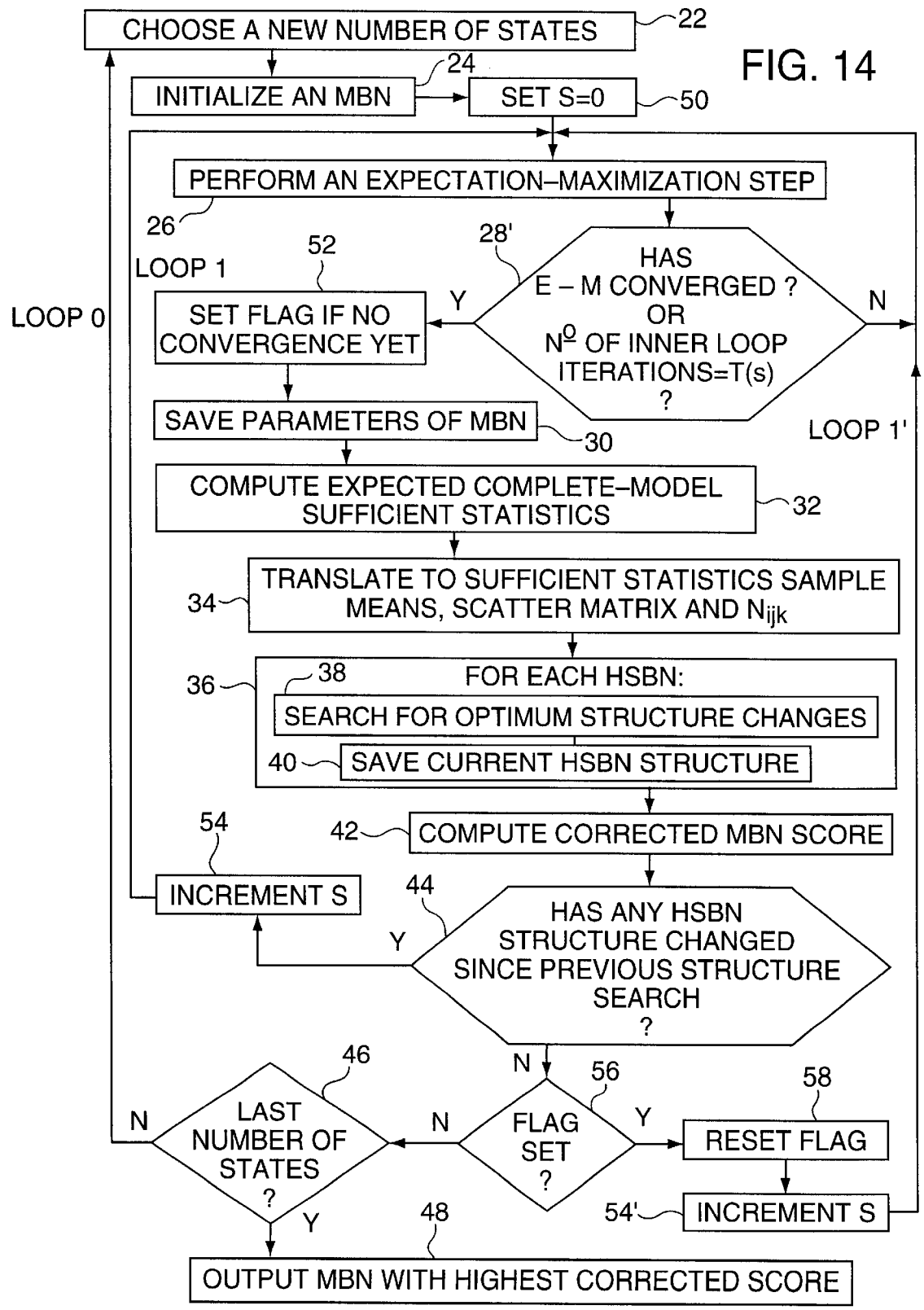
FIG. 14 illustrates a method of generating mixtures of Bayesian networks in accordance with a third exemplary embodiment of the invention.

FIG. 14 illustrates a variation of the embodiment of FIG. 12 in which the number of iterations T of the inner loop is a function T(S) of the number of iterations S of the outer loop. The first step (block 22 of FIG. 14) is to choose the number of states of the external class variable C and of each discrete hidden variables $H_d$. The next step (block 24 of FIG. 14) is to initialize an MBN. Then, the number of iterations of the outer loop, S, is initialized to zero (block 50). The expectation-maximization step (block 26 of FIG. 14) is then performed on all HSBNs in the MBN. A determination is then made (block 28' of FIG. 14) of whether the expectation-maximization process has converged, or, if not, whether loop 2 of FIG. 14 (the "inner loop") has iterated T(S) times. If niether condition holds (NO branch of block 28'), then the process loops back to the expectation-maximization step of block 26 in the inner loop. Otherwise (YES branch of block 28), a flag is set if the expectation-maximization process has not converged after T(S) iterations of the inner loop (block 52). The network parameters are then saved (block 30).

The expected complete model sufficient statistics (ECMSS) are then computed (block 32). The ECMSS are then translated (block 34 of FIG. 14) using conventional techniques into expected sufficient statistics $N_{ijk}$, sample means, scatter matrix and sample size, all of which are defined below in this specification with reference to a structure search process.

Next, an optimum structure is found for each HSBN (block 36). The step of block 36 includes searching for the optimum structure of the HSBN (block 38) and saving the optimum structure HSBN (block 40). The search of block 38 is described below in this specification, and employs the expected sufficient statistics, sample means, scatter matrix and sample size computed from the ECMSS in the step of block 34. The search is based upon scoring each candidate structure of the HSBN, the score being the marginal likelihood of the expected complete data $D_c$ given the candidate network structure $B_s^e$, namely $P(D_c|B_s^e)$. ). With each selection of optimal structures for the HSBNs of the MBN, an overall MBN score is computed as described with reference to FIG. 12 (block 42). This MBN score is the corrected version of the MBN score in accordance with the Cheeseman-Stutz score (see P. Cheeseman and J. Stutz, "Bayesian Classification AutoClass: Theory and Results", *Advances in Knowledge Discovery and Data Mining*, AAAI Press [1995]).

Next, a test for convergence of the structure search of step 38 is performed (block 44). The test for convergence in this embodiment consists of inquiring whether any HSBN structure within the present MBN has changed since the performance of this convergence test. If there have been any structural changes (YES branch of block 44), the structure search has not converged, in which case S is incremented (block 54) while the process loops back to the expectation-maximization step of block 26 through loop 1 of FIG. 14. Otherwise (NO branch of block 44), with no structural changes since the previous iteration of loop 1 or 1', the structure search has converged and the next step is to determine whether the flag is set (block 56). If so (YES branch of block 56), the flag is reset (block 58), S is incremented (block 54') and the process loops back to the expectation maximization step of block 26 through loop 1' of FIG. 14. Otherwise, if the flag is not currently set (NO branch of block 56), a determination is made of whether the various combinations of the number of states of the discrete class variable and discrete hidden variables has been exhausted (block 46 of FIG. 14). If not (NO branch of block 46), the process loops back in the outer loop (loop 0 of FIG. 14) to the step of block 22 in which the next combination of number of states is selected.

Otherwise (YES branch of block 46), the MBN having the highest score is selected and output for use in performing inferencing (block 48).

Figure 15:
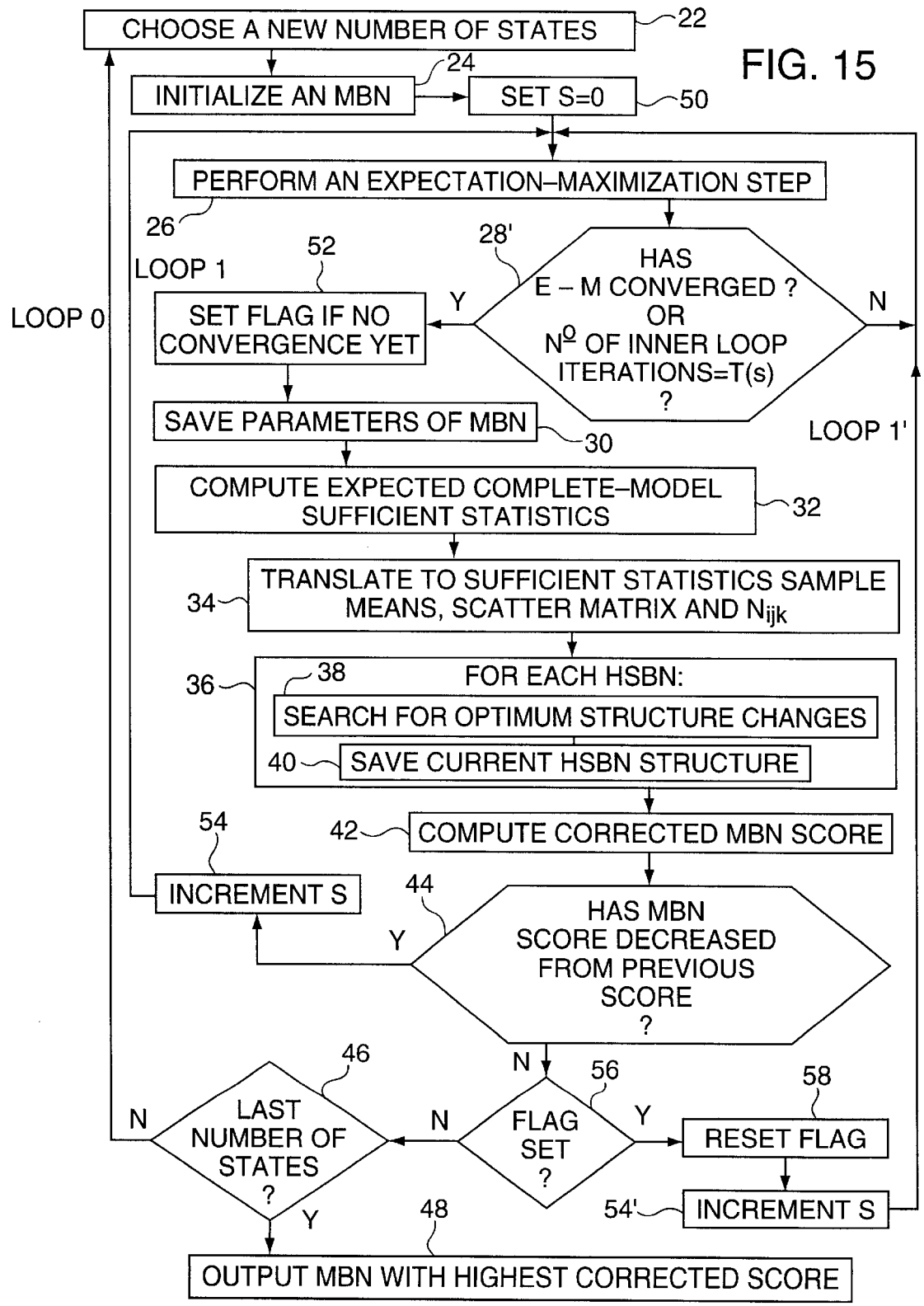
FIG. 15 illustrates a method of generating mixtures of Bayesian networks in accordance with a fourth exemplary embodiment of the invention.

FIG. 15 illustrates a modification of the embodiment of FIG. 14 in which the test for convergence of block 44 consists of determining whether the MBN score has decreased since the previous iteration of the middle loop. If the MBN score has decreased, the loop 1 of FIG. 12 has converged. Otherwise, if the score has not decreased loop 1 has not converged.

Figure 16:
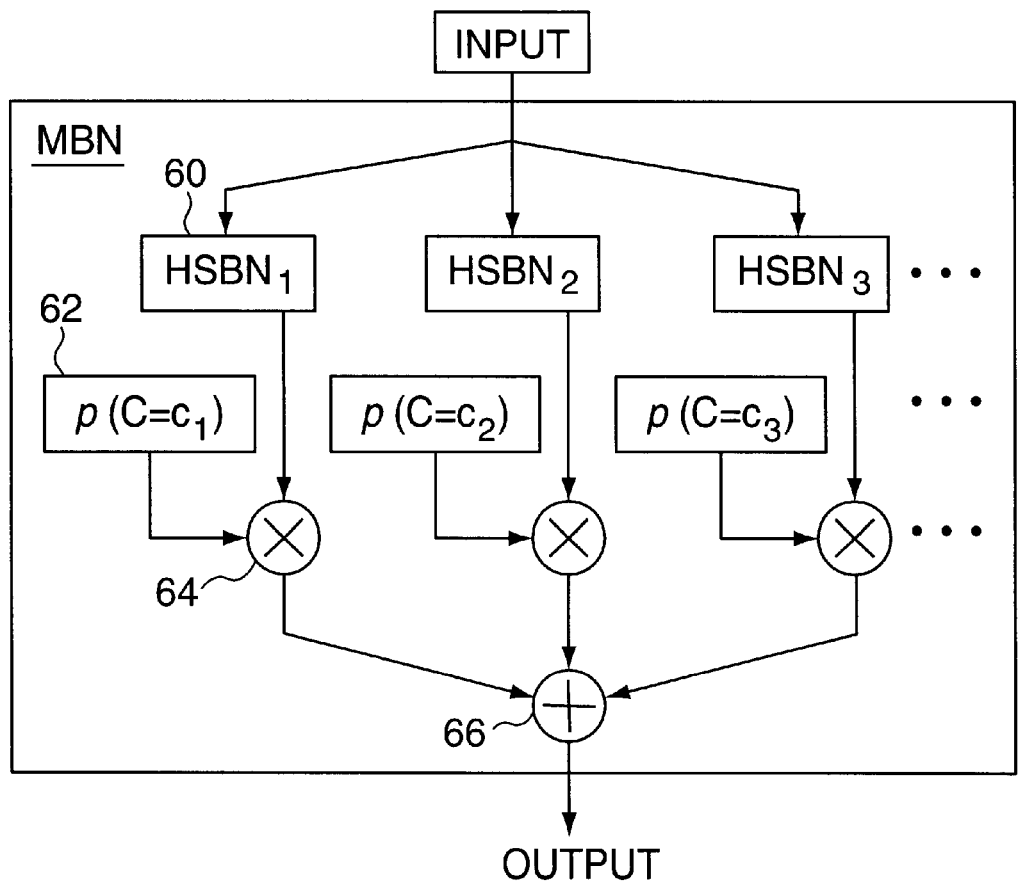
FIG. 16 illustrates an inferencing apparatus including a mixture of Bayesian networks in accordance with one aspect of the invention.

FIG. 16 illustrates an inferencing apparatus including an MBN. The MBN includes a set of HSBNs 60, each of which is associated with a weight 62 equal to the probability of the class variable C being in the corresponding state. Multipliers 64 combine the output of each HSBN with the corresponding weight 62 and an adder 66 computes the sum of the products. An input is applied to all the HSBNs 60 simultaneously, resulting in a single inference output from the MBN.

Figure 17:
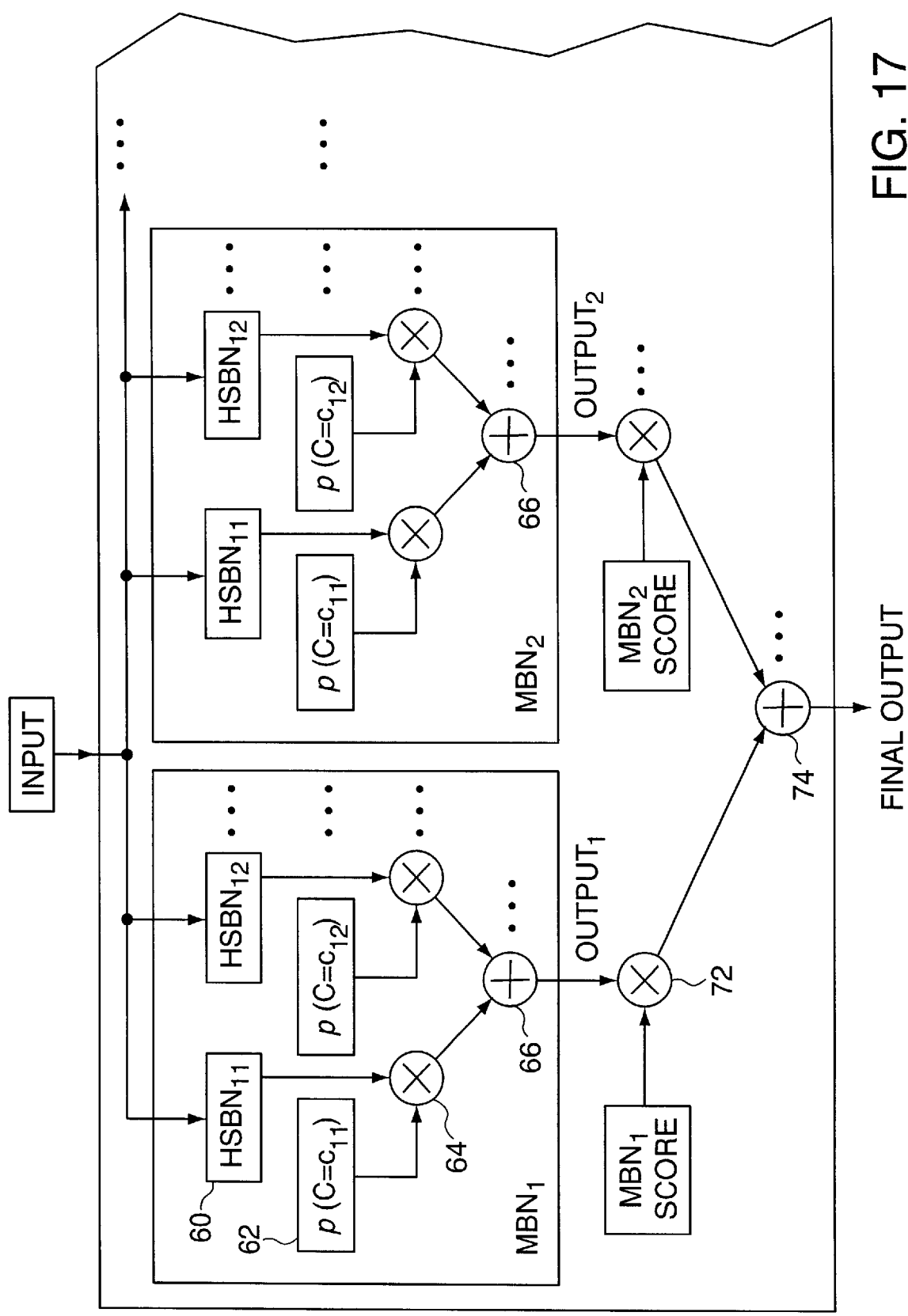
FIG. 17 illustrates an inferencing apparatus including a collection of mixtures of Bayesian networks in accordance with another aspect of the invention.

FIG. 17 illustrates an inferencing apparatus including a collection of MBN's. Each MBN is of the type described in FIG. 16. Of course, the scores have been previously computed as described above at the time each MBN is generated before inferencing is performed. each MBN output is weighted by the corresponding MBN score by a multiplier 72, and an adder 74 combines the wieghted MBN outputs into a single output of the collection of MBNs.

Figure 18:
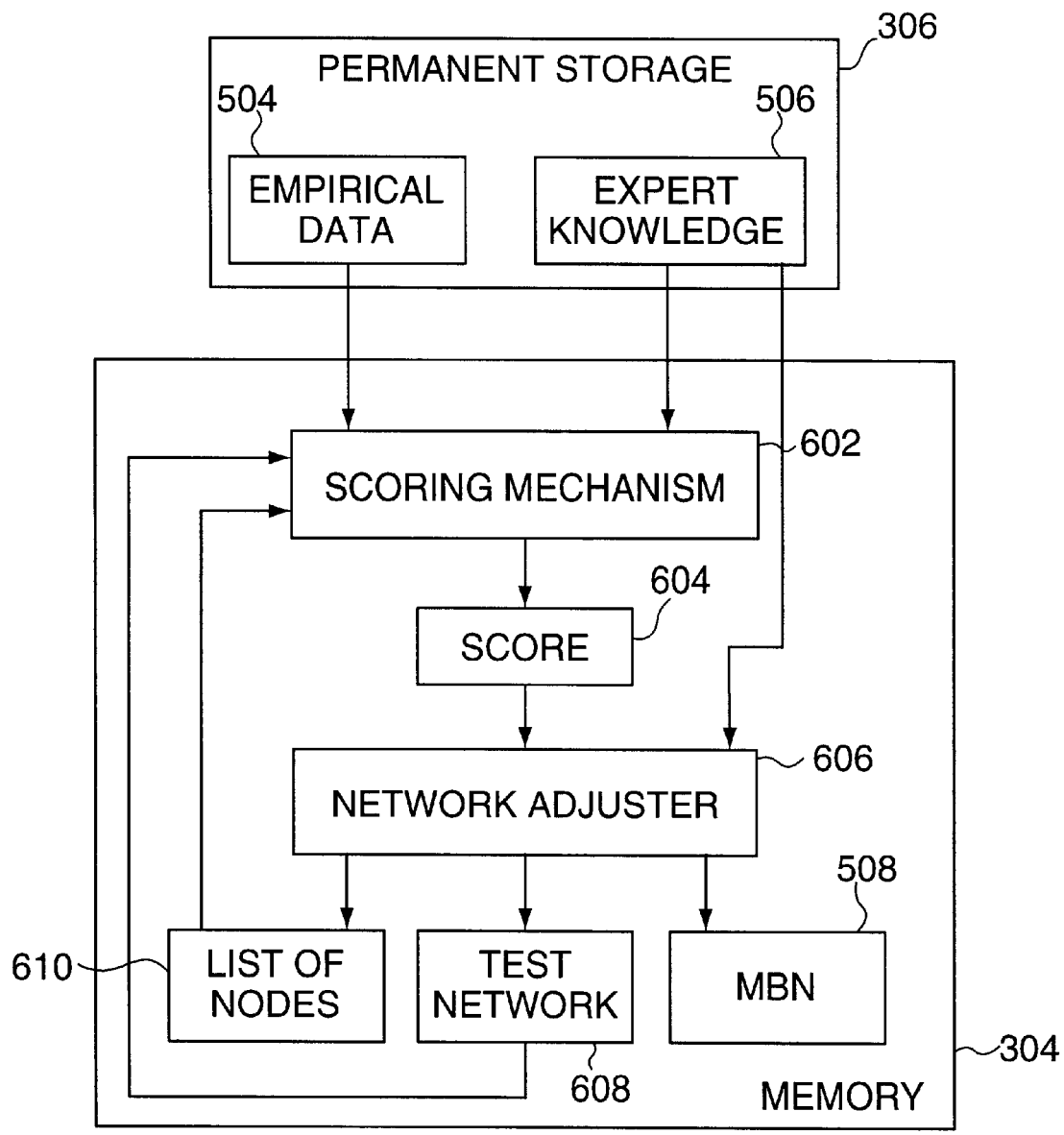
FIG. 18 depicts a more detailed diagram of the Bayesian network generator of FIG. 6.

How to Perform the structure Search Step of Block
38—Searching for Optimum Structure and Scoring
the Hypothesis-Specific Network Structure FIG. 18 depicts a diagram of the MBN generator 502 of the exemplary embodiment of FIG. 6. The MBN generator 502 of the exemplary embodiment contains a scoring mechanism 602 and a network adjuster 606. The scoring mechanism 602 receives the expert knowledge 506, the empirical data 504, the test network 608 and a list of nodes 610 as input. After receiving this information, the scoring mechanism 608 generates a score 604 that ranks the nodes of test network 608 as indicated by the list of nodes 610 for goodness. Thus, the score 604 contains a subscore for each node scored. Each subscore indicates how well the portion of the test network involving the node corresponding to the subscore and the parents of the node is at rendering inferences based on the empirical data 504 and the expert knowledge 506. The test network 608 received as input is either the prior network or a test network 608 generated by the network adjuster 606 depending on the circumstances. That is, the scoring mechanism 602 of the exemplary embodiment uses the initial network as the test network for the first invocation of the scoring mechanism. After the first invocation of the scoring mechanism 602, the test network received by the scoring mechanism is the test network 608 generated by the network adjuster. In the exemplary embodiment, a Bayesian network (i.e., the initial network or the test network 608) is stored in memory as a tree data structure where each node in the tree data structure corresponds to a node in the Bayesian network. The arcs of the Bayesian network are implemented as pointers from one node in the tree data structure to another node. In addition, the probabilities for each node in the Bayesian network are stored in the corresponding node in the tree data structure.

The network adjuster 606 receives as input the score 604 and the initial network and generates a new test network 608 in response thereto, which is then passed back to the scoring mechanism 602 with a list of nodes 610 which need to be rescored. After iterating many times between the scoring mechanism 602 and the network adjuster 606, the network adjuster eventually generates an improved MBN 508 (hereinafter referred to as a Bayesian network). The network adjuster 606 generates the improved Bayesian network 508 when the scores 604 generated do not improve. That is, the network adjuster 606 retains the test network 608 that the network adjuster last generated, modifies the test network based on the score 604, and if the network adjuster cannot generate a test network with a better score than the retained test network, the network adjuster generates the retained test network as the improved Bayesian network 508. Although the exemplary embodiment has been described as iterating many times between the scoring mechanism 602 and the network adjuster 606, one skilled in the art will appreciate that only one iteration may be performed. The initial network used by the scoring mechanism 602 of the exemplary embodiment can consist of all discrete variables, all continuous variables, or a combination of discrete and continuous variables.

Figure 19:
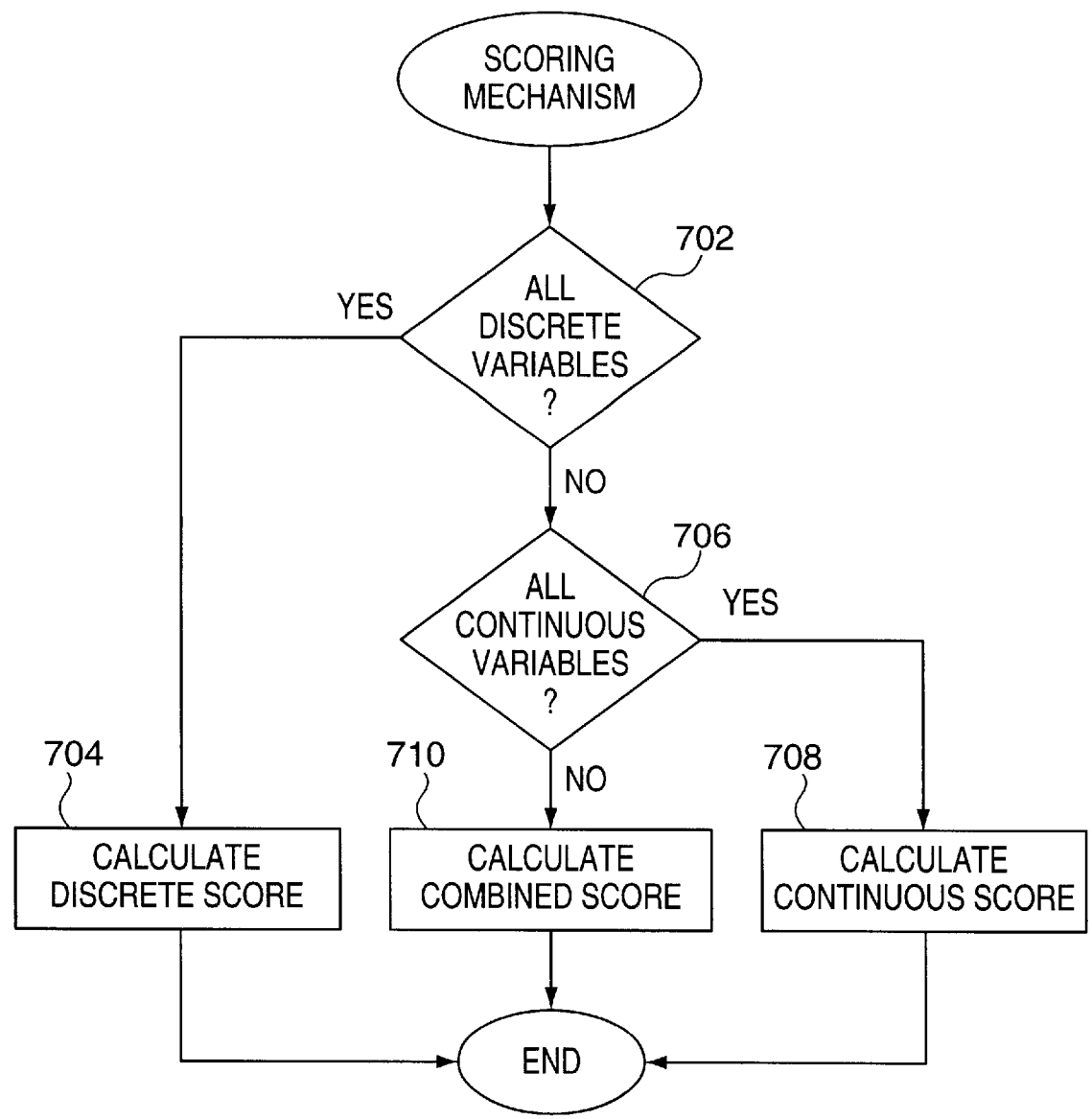
FIG. 19 depicts a high-level flow chart of the steps performed by the scoring mechanism of FIG. 18.

FIG. 19 depicts a high level flow chart of the steps performed by the scoring mechanism 602 of the exemplary embodiment. The scoring mechanism 602 of the exemplary embodiment determines the types of variables used in the test network 608 and generates a score for the test network. First, the scoring mechanism of the exemplary embodiment determines if the test network 608 contains all discrete variables (step 702). If the test network 608 contains all discrete variables, the scoring mechanism 602 generates a score for the nodes in the list of nodes 610 of the test network by invoking the calculate discrete score process (step 704). However, if the test network 608 does not contain all discrete variables, the scoring mechanism 602 determines if the test network contains all continuous variables (step 706). If the test network 608 contains all continuous variables, the scoring mechanism 602 generates a score for the nodes indicated in the list of nodes 610 of the test network by invoking the calculate continuous score process (step 708). However, if the test network 608 does not contain all continuous variables, the test network contains a combination of discrete and continuous variables ("a mixed network"), and the scoring mechanism generates a score for the nodes indicated by the list of nodes 610 of the test network by invoking the calculate mixed score process (step 710).

The calculate discrete score process, the calculate continuous score process and the calculate mixed score process are based upon a common concept, Bayes' theorem. The score that each scoring process produces is proportional to the posterior probability of the test network. That is, probability distributions and densities can be of two types: prior and posterior. The prior probability distribution or density is the probability distribution or density before data is observed. The posterior probability distribution or density is the probability distribution or density after data is observed. Bayes' theorem states that the posterior probability of a test network is proportional to the prior probability of a test network multiplied by the probability of the empirical data database given the test network and the expert knowledge.

Calculate Discrete Score Process

The calculate discrete score process scores a test network containing all discrete variables. The calculate discrete score process takes advantage of the fact that the probability of the empirical data database given a test network and expert knowledge is the product over all cases of the probability of a particular case given a test network, expert knowledge, and previous cases (i.e., cases observed prior to the particular case). The computation of the probability of a case given a test network, expert knowledge, and previous cases is based on the assumption that the empirical data database represents a multinomial sample from the test network. That is, the empirical data database contains a sequence of observations that form a multinomial distribution as described in DeGroot, *Optimal Statistical Decisions*, at 48–49 (1970). Thus, each variable given each instance of the parents of the variable is associated with a set of parameters $\{\theta_{ij1}, \ldots, \theta_{ijr_i}\}$, where:

i is the variable index, "i=1 . . . n," where "n" is the number of variables in the test network;

j is the parent-instance index; "j=1 . . . $q_i$,", where $q_i$ is the number of instances of the parents;

k is the variable state index; "k=1 . . . $r_i$", where "$r_i$" is the number of states of the variable i.

The parameter $\theta_{ijk}$ is the long run fraction for $x_i$=k, when $\Pi_i$=j. That is, for all values of i,j, and k, $p(x_i=k|\Pi_i=j,\theta_{ijk},B_S^e,\xi)=\theta_{ijk}$, where $B_S^e$ is the hypothesis-specific test network.

In addition, the exemplary embodiment assumes that the density of each parameter set $\{\theta_{ij1}, \ldots, \theta_{ijr_i}\}$ has a Dirichlet distribution as defined by:

$$\rho(\theta_{ij1}, \ldots, \theta_{ijr_i}|B_S^e) = \frac{\Gamma\left(\sum_{k=1}^{r_i}(e_i)\right)}{\prod_{k=1}^{r_i}\Gamma(e_i)}\prod_{k=1}^{r_i}\theta_{ijk}^{e_i-1}, e_i > 0$$

where "$\Gamma(\ )$" is the Gamma function defined as $$\Gamma(x) = \int_0^\infty e^{-y}y^x\,dy.$$

The exponents $e_i$ are given by $K/(r_i q_i)$ where K is the sample size specified by the user. Alternatively, one may use $e_i=1$.

Figure 20:
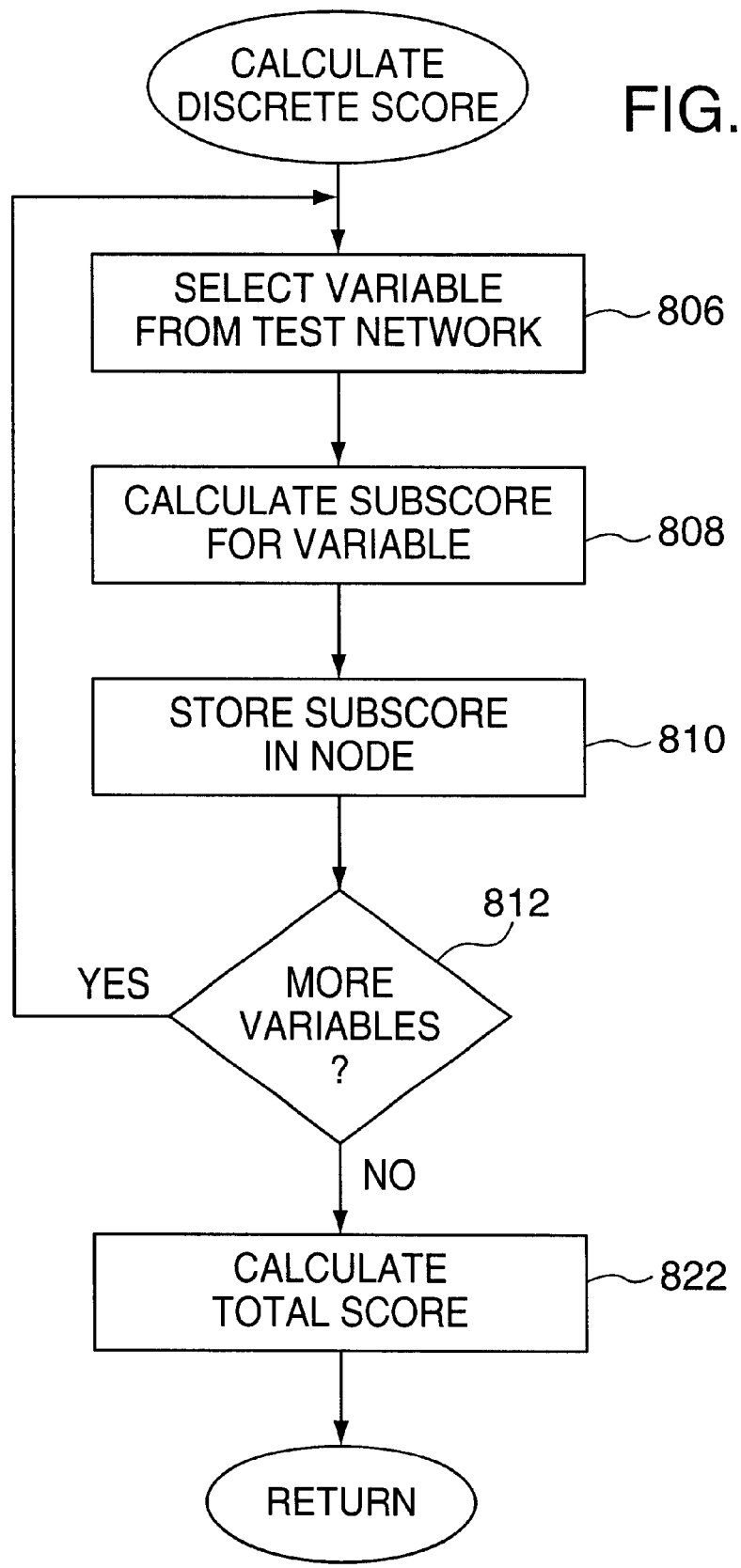
FIG. 20 depicts a flow chart of the steps performed by the calculate discrete score process of FIG. 19.

FIG. 20 depicts a flow chart of the steps performed by the calculate discrete score process. The first step of the calculate discrete score process is to examine the translated expected complete-model sufficient statistics ECMSS_c for the number of times ("hits") that each variable is encountered, for each state of each variable, and for each possible instance of the parents of each variable. The number of hits, therefore, has three indices i, j and k; "i=1 . . . n," where "n" is the number of variables in the test network; "j=1 . . . $q_i$,", where $q_i$ is the number of instances of the parents; and "k=1 . . . $r_i$", where "$r_i$" is the number of states of variable i. Next, the calculate discrete score process of the exemplary embodiment selects a variable from the test network 608 according to the list of nodes 610 to score, starting with the first variable in the list of nodes (step 806). After a variable is selected, the calculate discrete score process calculates a subscore for the selected variable (step 808) and stores the calculated subscore in the node of the test network that corresponds with the selected variable (step 810). The subscore for each variable $x_i$ is calculated using the following formula:

$$\log\left[\prod_{j=1}^{q_i}\frac{\Gamma(r_i e_i)}{\Gamma(N_{ij}+r_i e_i)}\prod_{k=1}^{r_i}\frac{\Gamma(N_{ijk}+e_i)}{\Gamma(e_i)}\right]$$

After the subscore for a variable is calculated and stored, the calculate discrete score process determines in step 812 if there are more variables to be processed and either continues to step 806 to process more variables, or continues to step. After storing the subscores, a total score for the test network is generated by adding all of the subscores together and adding the log prior probability of the HSBN structure given |C| (step 822).

Calculate Continuous Score Process

The calculate continuous score process calculates scores for test networks containing all continuous variables and is based on Bayes' theorem. The calculate continuous score process assumes that all cases in the empirical data database are drawn from a multivariate normal distribution. The calculate continuous score process takes advantage of the fact that a set of variables have a multivariate normal distribution if and only if each particular variable is an independent (univariate) normal distribution, when conditioned on the variables that precede the particular variable in some ordering:

$$p(x_i|x_1 \ldots x_{i-1}) = n\left(m_i + \sum_{j=1}^{i-1}b_{ji}(x_j-m_j), 1/v_i\right)$$

The term $p(x_i|x_1 \ldots x_{i-1})$ denotes the density of a particular variable given all the variables before the particular variable in some ordering. The term $$n\left(m_i + \sum_{j=1}^{i-1}b_{ji}(x_j-m_j), 1/v_i\right)$$

contains "n" referring to a normal distribution having a mean "$m_i$", a variance "$v_i$" and coefficients "$b_{ji}$". "m", "v" and "b" are parameters of the normal distribution. The coefficient "$b_{ji}$" refers to the strength of the connection between the mean of a variable "$X_i$" and the value of the variables "$X_j$". Thus, $b_{ji}$ is equal to zero if and only if there is no arc from "$X_j$" to "$X_i$" in the test network. One skilled in the art would recognize that the coefficient "$b_{ji}$" is sometimes called a partial regression coefficient between "$x_i$" and "$x_j$". The multivariate normal distribution and the univariate normal distribution are well known in the field of statistics.

In addition, the calculate continuous score process is based on three assumptions. First, the calculate continuous score process assumes that the prior distributions for the mean and precision matrix of the multivariate normal distribution with all dependencies between variables being possible (i.e., $B_{sc}^e$) is the normal-Wishart distribution. The normal-Wishart distribution is described in DeGroot, *Optimal Statistical Decisions*, at 56–59 (1970). The normal-Wishart distribution is conjugate for multivariate normal sampling. Second, the parameters $E((v_1 b_1), \ldots, (v_n b_n))$ are mutually independent. Third, if $x_i$ has the same parents in two different Bayesian networks, then the prior densities of "v" and "b" of $X_i$ for both Bayesian networks are the same.

Figure 21:
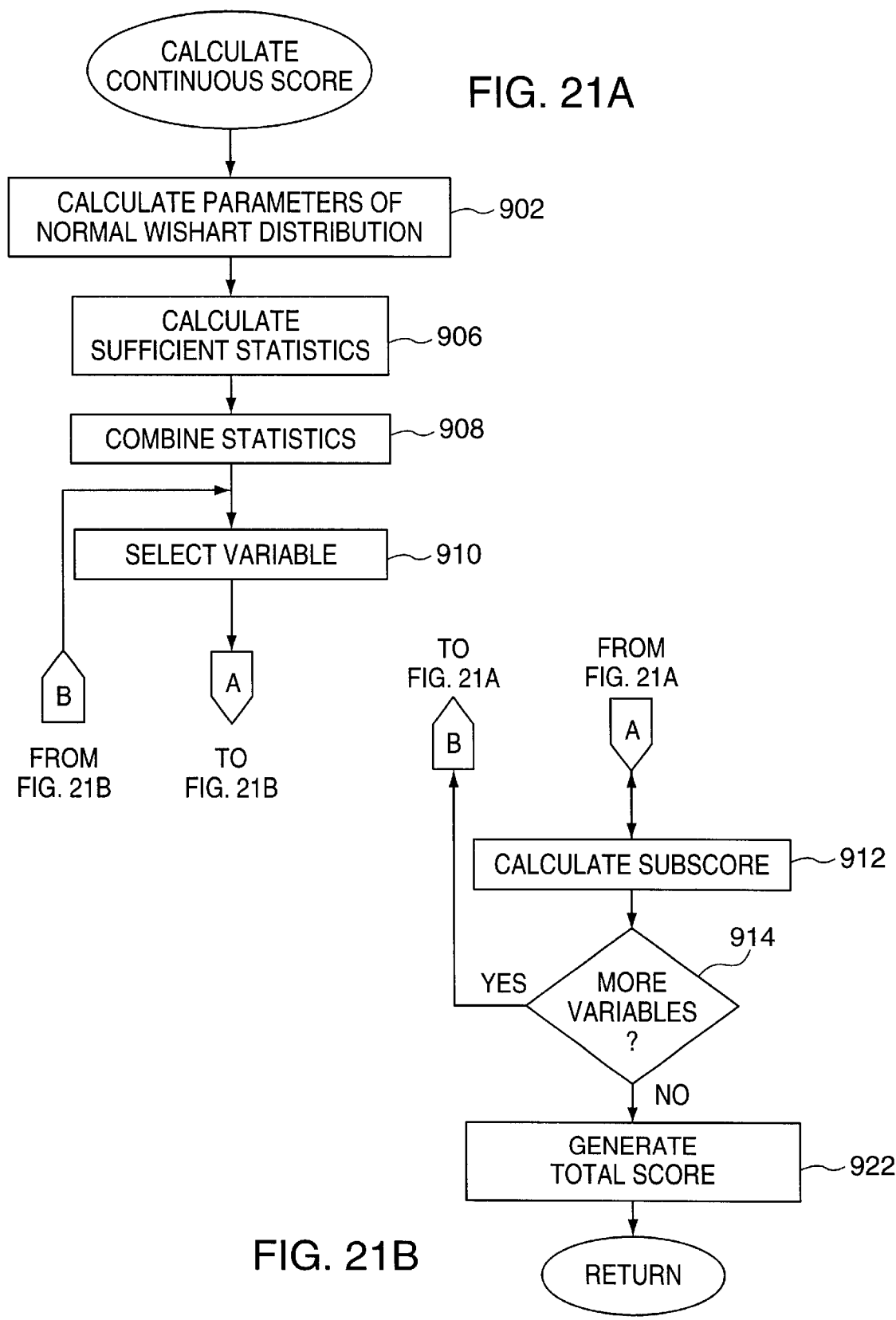

FIGS. 21A and 21B depict a flow chart of the steps performed by the calculate continuous score process of the exemplary embodiment. The calculate continuous score process of the exemplary embodiment first calculates the parameters associated with the prior densities of the normal-Wishart distribution as follows (step 902):

$T_o = I$ $\vec{\mu}_o = <\vec{x}>$ where "$T_0$" is the precision matrix of the normal-Wishart distribution (an n by n matrix), I is the identity matrix, "$\vec{\mu}_o$" is the prior mean of the normal-Wishart distribution (an n by 1 column matrix), and "$<\vec{x}>$" is the sample mean of the variables in the domain. The calculate continuous score process then examines the sufficient statistics. That is, the sample mean and the multivariate internal scatter matrix (step 906). For complex data, the sample mean is defined by:

$$\bar{x}_m = \frac{1}{m}\sum_{i=1}^{m}\vec{x}_i$$

where "$\bar{x}_m$" refers to the sample mean, "m" is the number of complete cases in the database, and "$\vec{x}_i$" refers to a case. The multivariate internal scatter is defined by:

$$S_m = \sum_{i=1}^{m}(\vec{x}_i - \bar{x}_m)(\vec{x}_i - \bar{x}_m)'$$

where "$S_m$" refers to the multivariate internal scatter matrix, where "$\vec{x}_i$" refers to a case, and where "$\bar{x}_m$" refers to the sample mean. The mark ' refers to the transpose in which the matrix is rearranged from being an "n by 1" to being a "1 by n" matrix, and multiplied together so as to render an "n by n" matrix.

The calculate continuous score process next combines the intermediate statistics obtained from steps 902 and 906 (step 908). In this step, $T_0^{n \times n}$ (indicating that $T_0$ is an n by n matrix) is combined with the multivariate internal scatter matrix and a term involving the sample mean and prior mean to create $T_m^{n \times n}$. In this step, the following is computed:

$$T_m^{n \times n} = T_o^{n \times n} + S_m^{n \times n} + \frac{Km}{K+m}(\vec{\mu}_o - \bar{x}_m)(\vec{\mu}_o - \bar{x}_m)'$$

where "K" is the effective sample size specified by the user, "m" is the number of completed cases in the expected complete-model sufficient statistics ECMSS_c, "$T_0$" is the precision matrix of the prior normal-Wishart distribution, "$\vec{\mu}_o$" is the prior mean of the normal-Wishart distribution, and "$\bar{x}_m$" is the sample mean.

Next, the calculate continuous score process of the exemplary embodiment selects one variable from the list of nodes to be scored (step 910). After selecting one variable, the calculate continuous score process calculates a subscore ("the complete data subscore") for that variable and stores the complete data subscore into the node (step 912). The calculate continuous score process calculates the subscore for one variable by performing the following:

$$\text{subscore}[i] = \log\left[p(B_s^e(i)\,|\,\xi)\frac{p(D^{x_i,\Pi_i}\,|\,B_s^e)}{p(D^{\Pi_i}\,|\,B_s^e)}\right]$$

The term "$p(B_s^e(i)|\xi)$" refers to the prior probability of the variable-parent pair $x_i$-$\Pi_i$. Both terms in the fraction are computed using $$p(D^R\,|\,B_{sc}^e) = (2\pi)^{-nm/2}\left(\frac{K}{K+m}\right)^{n/2}\frac{c(n,K+n)}{c(n,K+n+m)}|T_0|^{(K+n)/2}|T_m|^{-\frac{K+n+m}{2}}$$

The term "$p(D^R|B_{sc}^e)$" refers to the density of the data restricted to the set of variables R given the event indicated by the prior network $B_{sc}^e$, where "n" is the number of variables in R, "K" is the effective sample size specified by the user, "m" is the number of completed cases in the ECMSS_c, "$|T_0|$" is the determinant of $T_0$ marginalized to the variables in R, "$|T_m|$" is the determinant of $T_m$ marginalized to the variables in R, and c(n,K) is the Wishart normalization function defined as:

$$c(n,K) = \left\{2^{Kn/2}\pi^{n(n-1)/4}\prod_{i=1}^{n}\Gamma\left(\frac{K+1-i}{2}\right)\right\}^{-1}$$

The determinant of an n by n matrix (A) is the sum over all permutations p=($i_1$, ... $i_n$)) of the integers 1 through n of the product:

$$(-1)^{k_p}\prod_{j=1}^{n}A[j,i_j]$$

where $k_p$ is 0 if P is even and $k_p$ is 1 if P is odd.

After the calculate continuous score process of the exemplary embodiment calculates a subscore for one variable, the calculate continuous score process determines if there are more variables to be processed (step 914). If there are more variables in the list of nodes for processing, the calculate continuous score process continues to step 910. However, if there are no more variables for processing in the test network, the calculate continuous score returns. Finally, the calculate continuous score process calculates the total score by adding all the subscores together and adding the log prior probability of the hypothesis-specific network structure given |C| (step 922).

Calculate Mixed (Discrete and Continuous) Score Process

The calculate mixed score process calculates a score for a mixed network having both discrete and continuous variables, and is based on Bayes' theorem. In calculating a score for a mixed network, the exemplary embodiment enforces a restriction that the initial network be constructed under the assumption that all dependencies among variables are possible. This restriction is enforced by the knowledge engineer. The exemplary embodiment also enforces a restriction that the prior network and all mixed test networks correspond to a collection of conditional Gaussian distributions. This restriction is enforced by the knowledge engineer and the network adjuster, respectively. In the following discussion, the symbols Γ, Δ, $Γ_i$ and $Δ_i$ appearing above in this specification are employed here, but have a different meaning. For the domain of all variables in a mixed network to be a collection of conditional Gaussian distributions, the set of continuous variables "Γ" and the set of discrete variables "Δ" must be divisible into disjoint sets $Γ_1 \ldots Γ_γ$ such that for each set $Γ_i$ there exists a $Δ_i$ subset of Δ such that $Γ_i$ is connected with respect to continuous variables, $Γ_i$ and $Γ_j$ (i≠j) is not connected with respect to continuous variables, no continuous variable is the parent of a discrete variable, and $Δ_i$ is a minimal set such that $Γ_i$ and Δ are conditionally independent given $Δ_i$.

Figure 22:
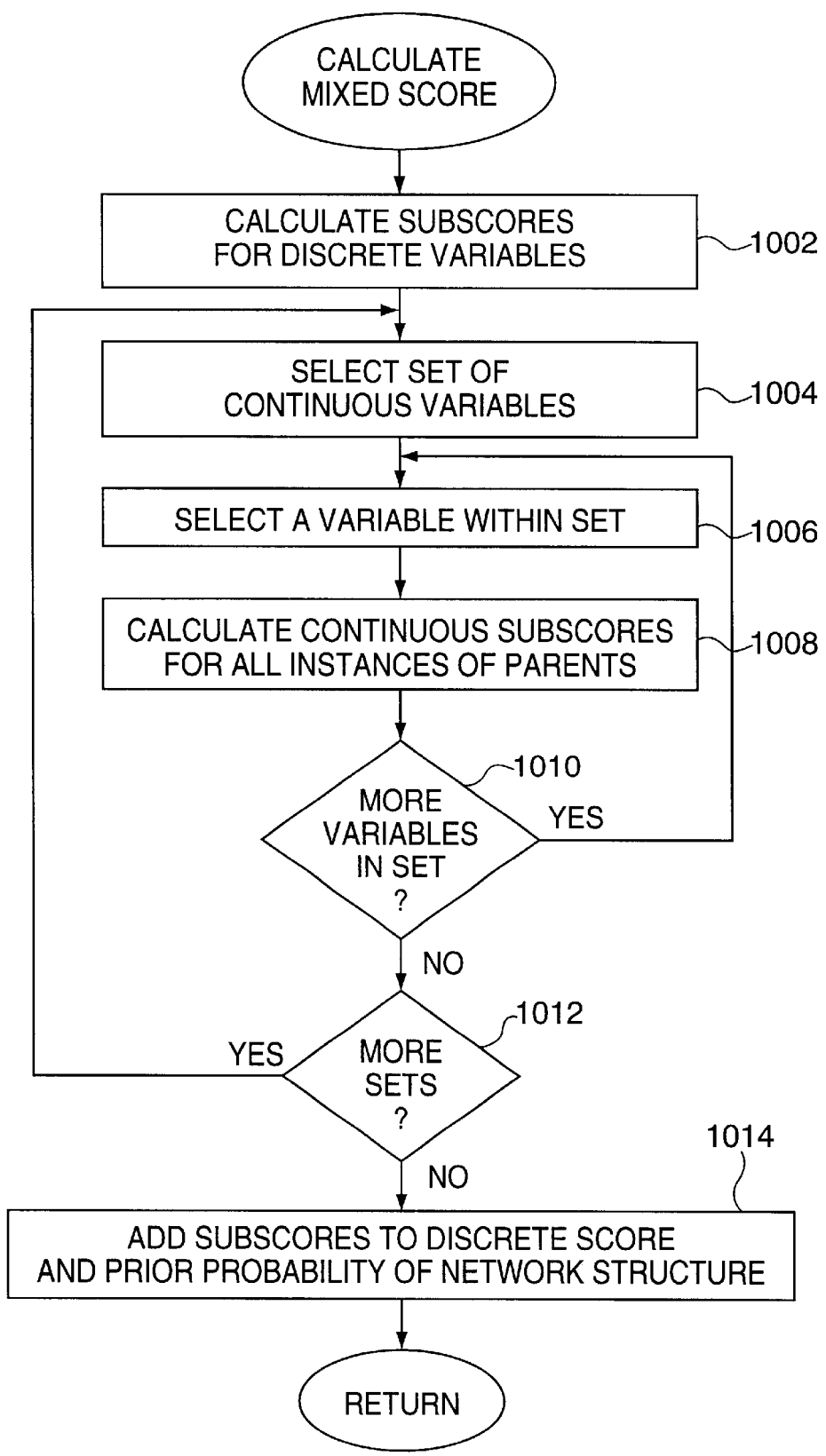
FIG. 22 depicts a flow chart of the steps performed by the calculate mixed score process of FIG. 19.

FIG. 22 depicts the flow chart of the steps performed by the calculate mixed score process of the exemplary embodiment. The effect of the calculate mixed score process of the exemplary embodiment is that, first, the discrete variables are scored. Then, for each subset $Δ_i$ and for each instance of subset $Δ_i$, the scores for the continuous variables in $Γ_i$ are calculated and added. Lastly, the log prior probability for the HSBN is added to the score.

The first step that the calculate mixed score process of the exemplary embodiment performs is to calculate the subscore for all discrete variables in the list of nodes to be scored (step 1002). The calculate mixed score process performs this by invoking the calculate discrete score process on the test network restricting the nodes scored to only the discrete nodes. The calculate mixed score process then selects a set of continuous variables "$\Gamma_i$" from the list of nodes to be scored (step 1004). Next, the calculate mixed score process selects a variable within "$\Gamma_i$" for processing (step 1006). After selecting a variable, the calculate mixed score process calculates a continuous subscore for the selected continuous variable for all instances of the parents of the variable (step 1008). In calculating the continuous subscore for a mixed network, since the mixed network is divided into sets of nodes, the definitions for K, $\mu_0$, and $T_0$, as described relative to the calculate continuous score process are redefined as a function of i and j (the instance of $\Delta_i$).

$K_{ij} = K/q_i$ $\vec{\mu}_{ij} = <\Gamma_i | \Delta_i = j>$ $T_{ij} = I$ where "$q_i$" is the number of parents of $\Gamma_i$, and "$\Delta_i$" are as defined above is redefined as the sample mean of variables "$\Gamma_i$" given the discrete parents of "$\Gamma_i$" that equal configuration j. Alternatively, each effective sample size $K_{ij}$ may be specified by the user.

The calculate mixed score process then determines if there are more variables in the selected set for processing (step 1010). If there are more variables to be processed, processing continues to step 1006. However, if there are no more variables to be processed, processing continues to step 1012 wherein the calculate mixed score process determines if there are more sets of continuous variables to be processed. If there are more sets of continuous variables to be processed, then processing continues to step 1004. However, if there are no more sets of continuous variables to be processed, then the calculate mixed score process continues to step 1014 wherein the calculate mixed score process adds the discrete subscores, the continuous subscores and the log prior on the HSBN structure together. Steps 1004 through 1014 can therefore be described using the following formula:

$$\text{score}(B_s^e) = \log p(B_s^e|C) + \log p\left(D^\Delta|B_s^e\right) + \sum_{k=1}^{\gamma}\sum_{j=1}^{q_k}\sum_{i=1}^{n} \log \frac{p(D^{x_i \Pi_i} | \Delta_k = j, B_s^e)}{p(D^{\Pi_i} | \Delta_k = j, B_s^e)}$$

where "log p($B_s^e$||C|)" refers to the log prior on structure $B_s^e$ given |C|, the term "log p($D^\Delta|B_s^e$)" refers to the score for the discrete variables in the test network, and $q_k$ is the number of configurations of $\Delta_i$. In addition, the term, $$\sum_{k=1}^{\gamma}\sum_{j=1}^{q_k}\sum_{i=1}^{n} \log \frac{p(D^{x_i \Pi_i} | \Delta_k = j, B_s^e)}{p(D^{\Pi_i} | \Delta_k = j, B_s^e)}$$

refers to the score for the continuous variables wherein the term "$D^{x_i \Pi_i}$" refers to the data restricted to variables $\{X_i\} \cup \Pi_i$.

Network adjuster

FIGS. 23A and 23B depict a flow chart of the steps performed by the network adjuster 606 of the exemplary embodiment of the present invention.

The network adjuster processes the test network stored on the last invocation of the network adjuster (or a newly created initial network) and selects a node within the test network for processing, starting with the first (step 1102). The network adjuster then performs all legal single changes on the selected node (step 1104). That is, the network adjuster in sequence: adds an arc to the selected node from each other node (not already directly connected) as long as the new arc does not introduce a directed cycle, deletes each arc pointing to the selected node, and reverses each arc pointing to the selected node as long as the modified arc does not introduce a directed cycle. In addition, if the test network is a mixed network, the network adjuster ensures that the test network remains conditional Gaussian. The network adjuster next requests the scoring mechanism to generate new subscores for each legal change for the affected nodes (step 1106). The affected nodes are the nodes at either end of an arc change. Since the data has been completed so that there is no missing data, the exemplary embodiment can perform changes on a node-by-node basis because the subscores of each variable obtained for the discrete variable networks, the continuous variable networks, and the mixed networks, are logically independent. In other words, the score is said to be factorable. Therefore, because the score is factorable, if the subscore for the affected nodes improve, it can be ensured that the entire score will improve. The subscores are generated using the calculate discrete score process, the calculate continuous score process, or the calculate mixed score process, depending on the type of the test network. The network adjuster then selects the change that produces the best subscore for the affected nodes (step 1108).

After the best change for the selected nodes has been identified, the network adjuster of the exemplary embodiment determines whether there are more variables in the test network for processing (step 1110). If there are more variables in the test network for processing, the network adjuster proceeds to step 1102 wherein the next variable in the test network is selected for processing. After all of the variables have been processed, the network adjuster identifies the single change of the best changes selected from step 1108 that most improves the total score of the test network (step 1111). If there is such a change, then the network adjuster stores the test network and the subscores for the affected nodes, and then returns to step 1102. If no change exists that improves the total score, then the network adjuster returns the current test network as the improved Bayesian network 508.

Preferred Calculating Discrete Score Method—Employing Decision Graohs in Each Variable The calculate discrete score process described above is not the presently preferred embodiment. The presently preferred embodiment is described in U.S. application Serial No. 08/902,759 filed Jul. 30, 1997 entitled "Belief Networks with Decision Graphs". This preferred method is now described in this specification for use in carrying out the present invention.

An exemplary embodiment of the preferred discrete score calculation utilizes a decision graph in each of the nodes of a Bayesian network to store the probabilities for that node. A decision graph is an undirected graph data structure where each vertex is connected to every other vertex via a path and where each leaf vertex may have more than one path leading into it, which forms a cycle. An examplary decision graph 1400 is depicted in FIG. 24. This decision graph 1400 is for a node z of a Bayesian network where node z has parents x and y. As can be seen from decision graph 1400, it contains one root vertex and only three leaf vertices, because one of the leaf vertices contains a probability for two sets of values: where x equals 0 and y equals 1, and where x equals 1 and y equals 0.

A decision graph is a much more flexible and efficient data structure for storing probabilities than either a tree or a table, because a decision graph can reflect any equivalence relationship between the probabilities and because leaf vertices having equivalent probabilities need not be duplicated. Additionally, by being able to reflect an equivalency relationship, multiple paths (or combinations of the parent values) can refer to the same probability, which yields a more accurate probability. For example, if there are 8 possible combinations of the parent vertices' values, if one probability is stored for each combination, and if the Bayesian network was created using a database of 16 cases, the ratio of cases to probabilities is 2 to 1. A case is a collection of values for the nodes of the Bayesian network (and, consequently, the vertices of the decision graph) that represents real-world decisions made in a field of decision making. In other words, each probability was created using two data points on average. However, if the number of probabilities stored is reduced such that more than one combination refers to a probability, the ratio of cases to probabilities improves so that the probability becomes more accurate given the data. That is, some of the probabilities are based on an increased number of data points, which produces more accurate probabilities.

Overview of Decision Graphs

An exemplary embodiment of the present invention receives an equivalent sample size, which is the equivalent number of times the expert has provided decision-support in the field of expertise (e.g., the number of times that an automobile mechanic has diagnosed a particular automobile problem). Additionally, the exemplary embodiment receives the ECMSS_c summarizing many real-world cases. After receiving this information, the exemplary embodiment creates initial decision graphs for the nodes of the hypothesis-specific Bayesian network and then adjusts the decision graphs to better reflect the data. During the learning process, the decision graphs are scored to determine goodness at reflecting the data, and a number of candidate decision graphs are generated for each node by making adjustments to the decision graphs contained in each node. These candidate decision graphs are then scored, and the candidate decision graph with the best score (i.e., the score that improves the most) is stored for each node. After storing the decision graph with the best score into each node, the Bayesian network is scored for how well all decision graphs reflect the data, and the Bayesian network is then updated to improve its score. The adjustments to the Bayesian network include adding arcs between the nodes to reflect additional relationships that were identified during the learning process. The learning process continues until the Bayesian network with the best possible score is produced.

Figure 25A:
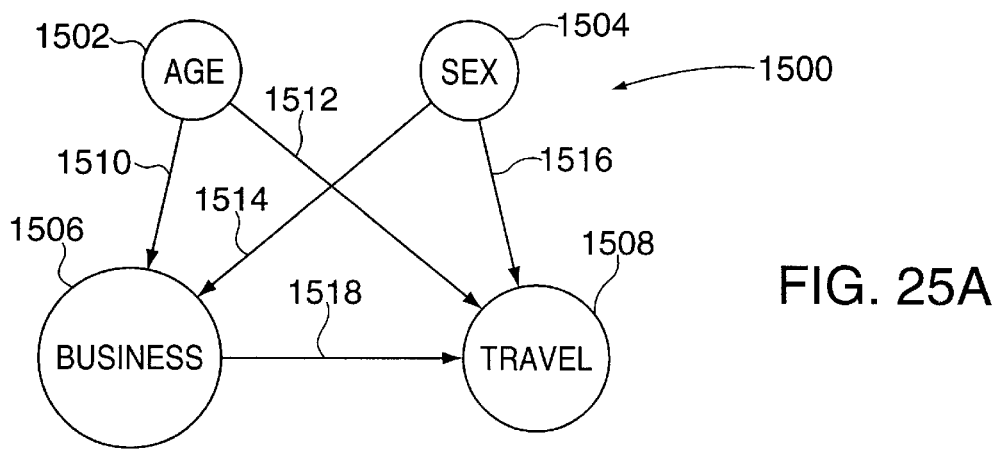
FIG. 25A depicts a Bayesian network of an exemplary embodiment of the present invention.

Although the hypothesis-specific Bayesian network of an exemplary embodiment can be used in numerous decision-support systems, it is described below with reference to a particular decision-support system for use in predicting whether a user would like to visit a web site on the Internet based on various characteristics of the user. Predicting whether a user would like a particular web site is referred to as web site analysis. A Bayesian network suitable for use in performing such web site analysis in accordance with one example is depicted in FIG. 25A. FIG. 25A shows a Bayesian network 1500 containing various nodes 1502–1508 and arcs connecting the nodes 1510–1518. The age node 1502 represents the age of the user and has a number of states or values including: 0 for ages 0–18, 1 for ages 19–30, 2 for ages 31–40, and 3 for ages greater than 40. The sex node 1504 contains a value indicating the sex, either male or female, of the user. The business node 1506 contains a value (i.e., 0 for no and 1 for yes) indicating whether a particular user visited business-related web sites, and the travel node 1508 contains a value (i.e., 0 for no and 1 for yes) indicating whether a particular user visited travel-related web sites. As can be seen from arcs 1510–1516, the values of both the age node 1502 and the sex node 1504 influence whether the user would like to visit business-related web sites as reflected by node 1506 as well as whether the user would like to visit travel-related web sites as reflected by node 1508. Additionally, the value of the business node 1506 influences the value of travel node 1508. An exemplary embodiment uses the Bayesian network 1500 to perform probabilistic inference where it receives observations for a number of the nodes and then determines whether the user would like to visit the business web site 1506 or the travel web site 1508 based on the received observations. One skilled in the art will appreciate that the Bayesian network 1500 is merely exemplary and that the Bayesian network used by the exemplary embodiment may have many more nodes.

Figure 25B:
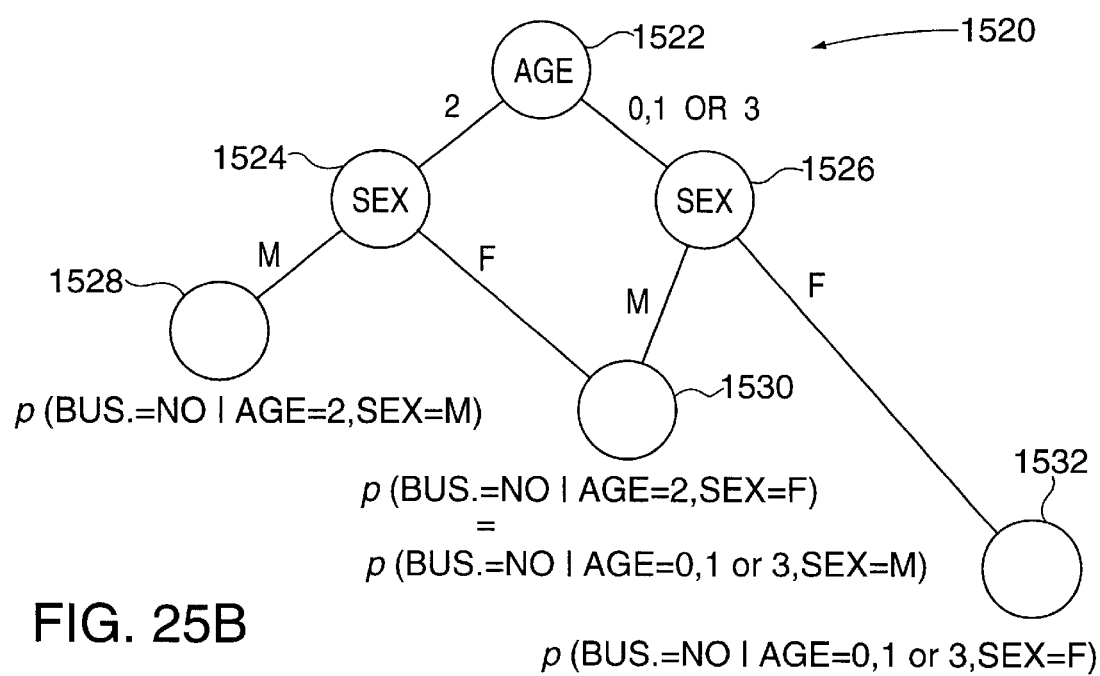
FIG. 25B depicts a decision graph suitable for use in one of the nodes of the Bayesian network of FIG. 25A.

FIG. 25B depicts a decision graph 1520 suitable for use in the business node 1506 of the Bayesian network 1500 of FIG. 25A. In the decision graph 1520, age vertex 1522 serves as the root vertex of the data structure, sex vertices 1524 and 1526 serve as the intermediate vertices of the data structure, and vertices 1528–1532 serve as the leaf vertices of the data structure, which contain the probabilities for the business vertex 1506 of the Bayesian network 1500. It should be noted that vertex 1530 reflects an equivalence relationship where the probability of a female of age bracket 2 likely visiting business-related web sites and the probability of males of age brackets 0, 1, or 3 likely visiting business-related web sites are equivalent. The process of creating a decision graph for a node in the Bayesian network of an exemplary embodiment is described in detail below.

Figure 25C:
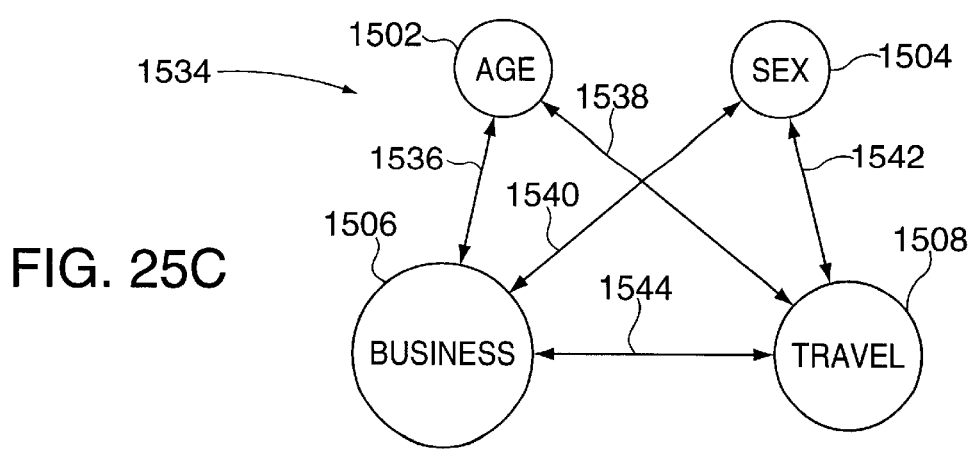
FIG. 25C depicts a Bayesian network of an alternative embodiment of the present invention, which contains cycles.

An alternative embodiment of the present invention allows for the possible introduction of cycles into the Bayesian network. The introduction of cycles into the Bayesian network destroys the acyclic property of the Bayesian network so that it is more appropriately referred to as a cyclic directed graph (or a cyclic Bayesian network). FIG. 25C depicts a cyclic directed graph 1534, which is similar to Bayesian network 1500, except that cycles have been introduced. Introducing cycles into a Bayesian network is beneficial, because the resulting structure becomes more flexible so that it can more accurately reflect relationships in the data. That is, by enforcing the acyclic nature of a Bayesian network, relationships such as a dual dependency relationship cannot be expressed. For example, with respect to the cyclic directed graph 1534 of FIG. 25C, the business node 1506 influences the value of the travel node 1508, and the value of the travel node 1508 influences the value of the business node 1506. Such flexibility provides a more efficient Bayesian network that more accurately reflects the data. Although all arcs 1536–1544 are shown as being bidirectional, one skilled in the art will appreciate that some arcs may be unidirectional.

Implementation of Decision Graphs

Referring again now to the computer system of FIG. 6, the system is adapted to further include a web analyzer 1614 that utilizes the MBN 508 to perform probabilistic inference and determines whether a given user would like to visit a particular category of web sites. The expert knowledge 506 provided by the expert includes an equivalent sample size. The permanent storage 306 also holds the ECMSS_c summarizing cases reflecting real-world instances of whether a number of users visited business-related or travel-related web sites.

Figure 26A:
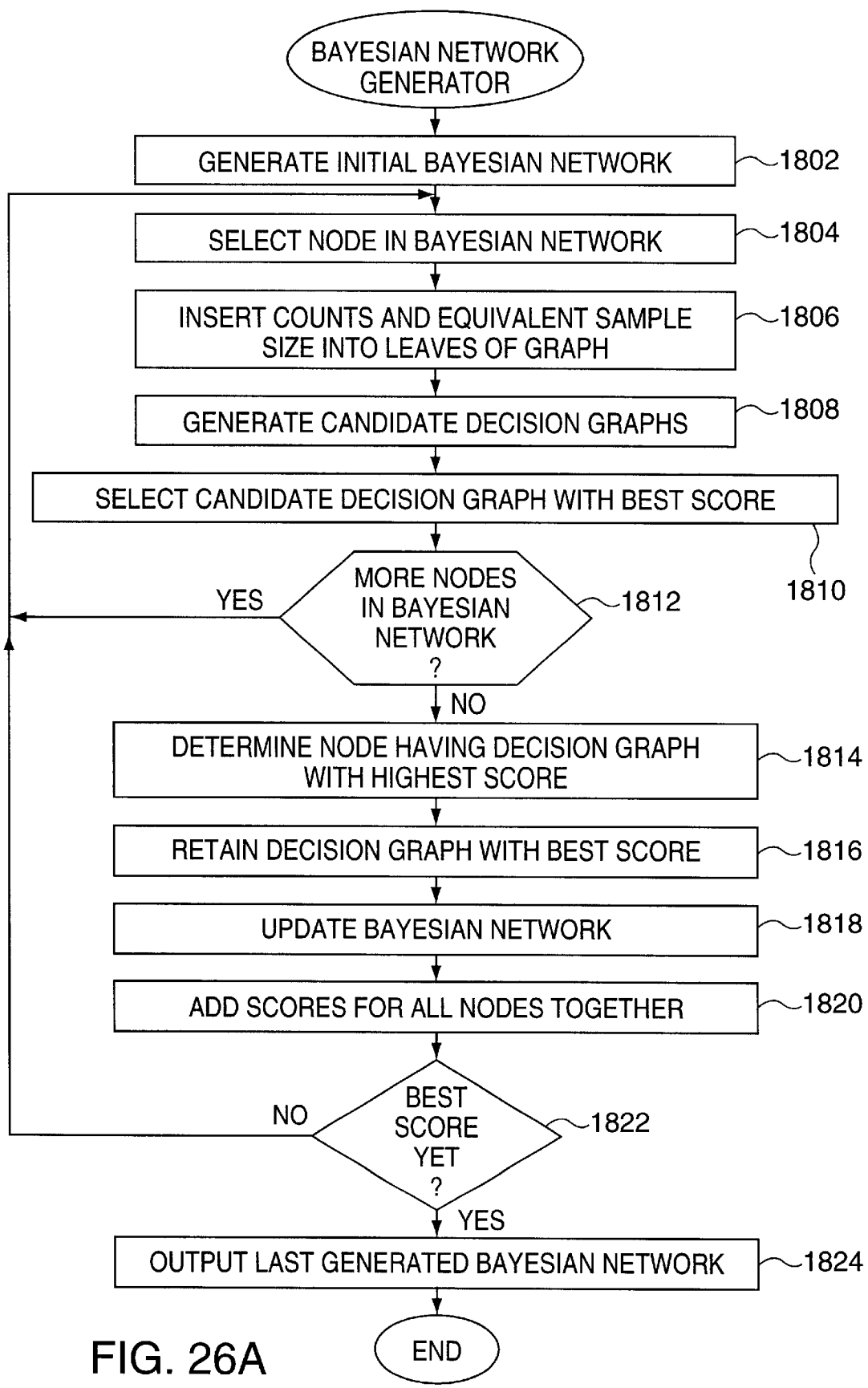
FIG. 26A depicts a flowchart of the steps performed by one implementation of the Bayesian network generator depicted in FIG. 6.

FIG. 26A depicts a flowchart of the steps performed by the MBN generator 502 (hereinafter referred to as a Bayesian network generator). At the completion of the Bayesian network generator's processing, a hypothesis-specific Bayesian network similar to Bayesian network 1500 of FIG. 25A is generated and the nodes of the Bayesian network have a decision graph similar to the decision graph 1520.

The first step (step 1802) performed by the Bayesian network generator is to initialize the decision graphs corresponding to each node in the belief network. This is done by creating decision graphs that are equivalent to full tables for the initial hypothesis-specific Bayesian network. The Bayesian network generator selects a node in the initial hypothesis-specific Bayesian network (step 1804). After selecting a node in the Bayesian network, the Bayesian network generator inserts the counts and the equivalent sample size into the leaves of the decision graph of the node (step 1806). The count for a leaf is the number of times each value of the leaf is observed in the ECMSS_c (stored in the permanent storage 306) for each value of its parent vertices. To better explain the counts stored in the leaf, consider decision graph 1904 of FIG. 27A, which is an example decision graph for the business node 1506. Leaf 1908 of decision graph 1904 contains two counts: one count indicates the number of times in the database where sex=male and business=yes, and the other count indicates the number of times that sex=male and business=no. Leaf 1912 also contains two counts: one count for the number of times in the database where sex=female, age=2, and business=yes, and the other count is for the number of times sex=female, age=2, and business=no. Similarly, leaf 1914 contains two counts: one count for the number of times sex=female, age=0, 1, or 3, and business=yes, and the other count is for sex=female, age=0, 1, or 3, and business=no. It should be appreciated that if a leaf could be arrived at through more than one path, such as occurs when an equivalency relationship is reflected by the decision graph, the leaf will have additional counts. Next, the Bayesian network generator makes various adjustments to the decision graph and generates a number of candidate decision graphs (step 1808). This step is further discussed below with respect to FIG. 27B.

After generating the candidate decision graphs, the Bayesian network generator selects the candidate decision graph with the best score (step 1810). In this step, the Bayesian network generator generates a score for each decision graph generated in step 1808. This score indicates the goodness of the graph at reflecting the data contained in the database. This step is performed by performing the following calculation $$\log p(B_s^e \| C) + \log \left[ \prod_{a=1}^{n} \prod_{b \in G_a} \frac{\Gamma\left(\frac{Kt_b}{q_a}\right)}{\Gamma\left(N_{ab} + \frac{Kt_b}{q_a}\right)} \prod_{c=1}^{r_a} \frac{\Gamma\left(N_{abc} + \frac{Kt_b}{r_a q_a}\right)}{\Gamma\left(\frac{Kt_b}{r_a q_a}\right)} \right]$$

where: "n" is the total number of nodes in the Bayesian network, $G_a$ is the set of leaves for the decision graph in node A of the Bayesian network, $r_a$ is the number of states of node A, and $q_a$ is the number of configurations of the parents of node A, and $t_b$ is the number of configurations of the parents of node a corresponding to b. The term "$N_{abc}$" is the expected number of cases where node "a" has a value "c" and the parents of leaf "b" in the decision graph of node "a" are in a state that leads to leaf "b." The term "$N_{ab}$" is the sum over "c" of "$N_{abc}$." When performing this step, most of the leaves of the decision graph will have the counts already stored from the processing performed in step 1806. However, for those newly generated leaves, created during the processing of step 1808 (discussed below), the counts have not been stored. For these leaves, the Bayesian network generator obtains the counts as described above. After scoring each candidate graph, the Bayesian network generator selects the candidate graph with the best score and stores this graph into the node.

Most candidate graphs (other than the first one generated) reflect a single change to a preexisting candidate decision graph where one or more vertices are added. Therefore, when a preexisting decision graph has already been scored, the exemplary embodiment can optimize the scoring step. The exemplary embodiment optimizes the scoring step by obtaining a partial score by only scoring the added vertices, by adding this partial score by the score of the preexisting decision graph, and by substracting out the portion of the score for parts of the preexisting decision graph that no longer exist (i.e., any vertices or edges that were removed). Those practiced in the art will recognize that a factorable structure prior is required to perform this step.

Next, the Bayesian network generator determines if there are more nodes in the Bayesian network for processing (step 1812). If there are more nodes in the Bayesian network for processing, processing continues to step 1804. However, if there are no more nodes in the Bayesian network for processing, the Bayesian network generator identifies which node has the graph with the best score (step 1814). In this step, the Bayesian network generator compares the score of the graph selected in step 1810 for each node to determine which of the nodes ("the selected node") has the graph whose relative score has improved the most ("the selected decision graph"). The Bayesian network generator then makes the change reflected by the selected decision graph by retaining the selected decision graph (step 1816). In this step, the selected decision graph replaces the current decision graph in the selected node.

After replacing the graph, the Bayesian network generator updates the Bayesian network (step 1818). In this step, the Bayesian network generator determines if the change made per the selected decision graph reflects that a relationship between the nodes of the Bayesian network exists, which is not currently reflected by the Bayesian network. To do this, the Bayesian network generator determines if the change reflected by the selected decision graph was either a complete split or a binary split on a node that is not currently a parent of the selected node as reflected in the Bayesian network. Both a complete split and a binary split are discussed below. This test is performed to determine whether the Bayesian network structure needs to be updated. In this situation, a node was added into the selected decision graph for the selected node in the Bayesian network, which indicates that the added node influences the probabilities for the selected node. Since the probabilities of the selected node are influenced by a node that is not currently a parent to the selected node in the Bayesian network, an arc is added from the node to the selected node in the Bayesian network to indicate such a relationship. This addition of an arc may introduce a cycle in the alternative embodiment, but in the exemplary embodiment, since there are restrictions placed on the conditions under which a split occurs, no cycle is introduced.

After updating the Bayesian network, the Bayesian network generator adds the scores for all nodes (i.e., the decision graphs in the nodes) together (step 1820). The Bayesian network generator then compares this score for the Bayesian network against the most recent Bayesian network generated by the Bayesian network generator to determine if this is the best score yet (step 1822). The Bayesian network generator retains the last Bayesian network that is produced. If the score for the most recent Bayesian network is the best score yet, processing continues to step 1804 to generate another Bayesian network. However, if the score is not the best yet, then the Bayesian network generator outputs the last generated Bayesian network, which is the Bayesian network with the highest score (step 1824).

Figure 26B:
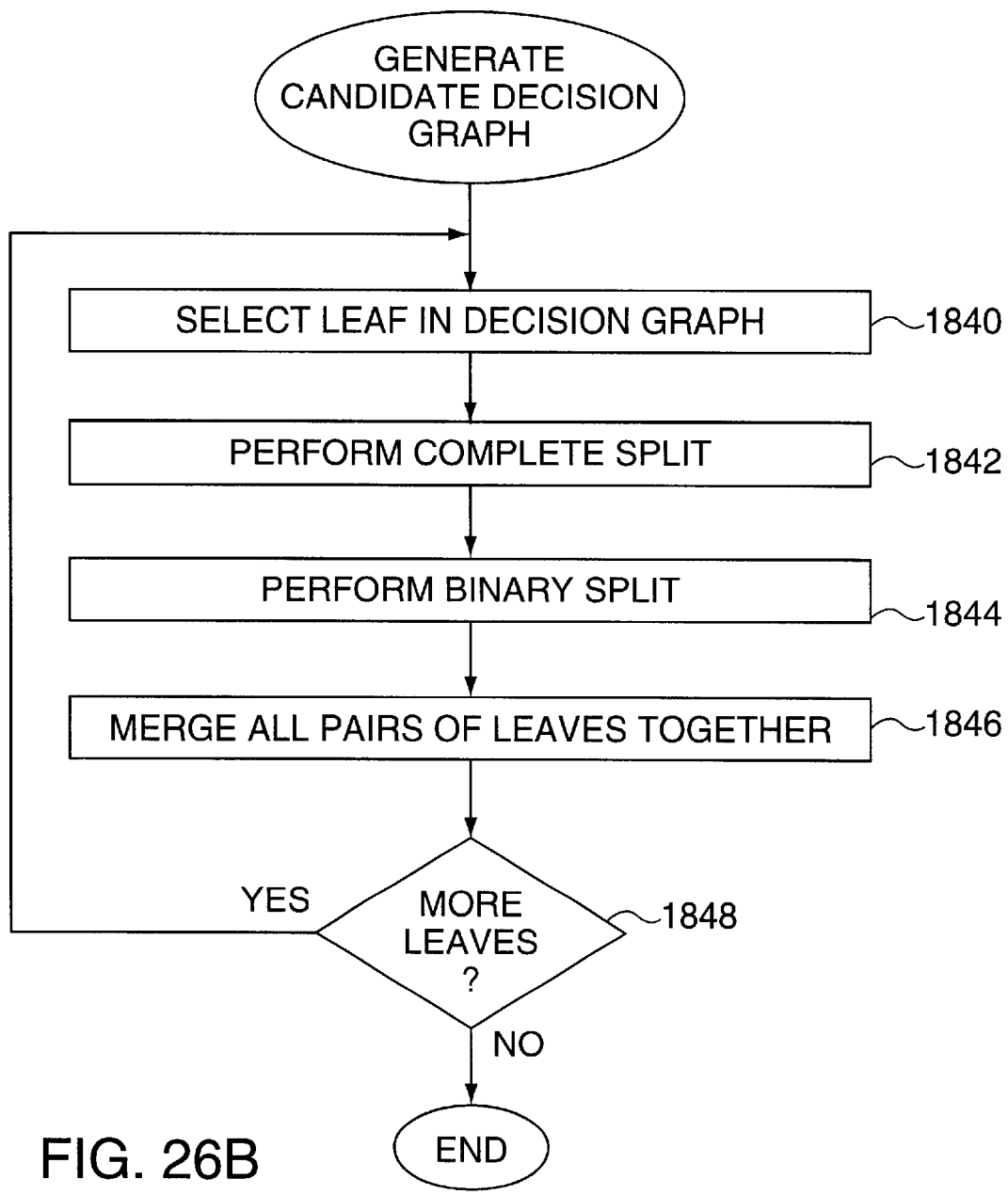
FIG. 26B depicts a flowchart of the steps performed by the Bayesian network generator when generating candidate decision graphs.
Figure 27A:
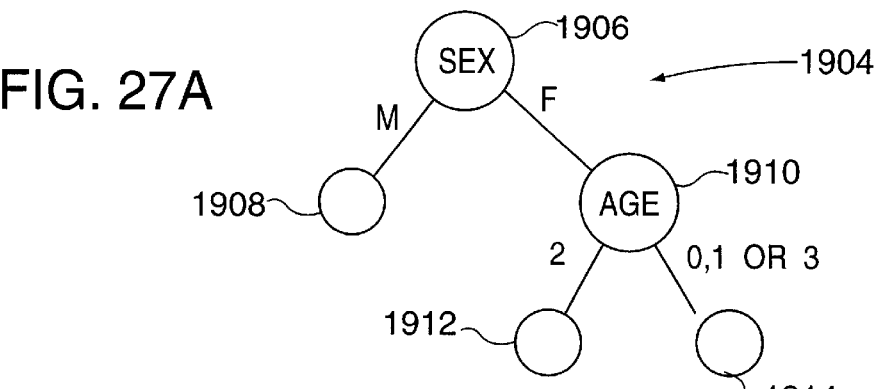
FIG. 27A depicts an examplary decision graph.
Figure 27B:
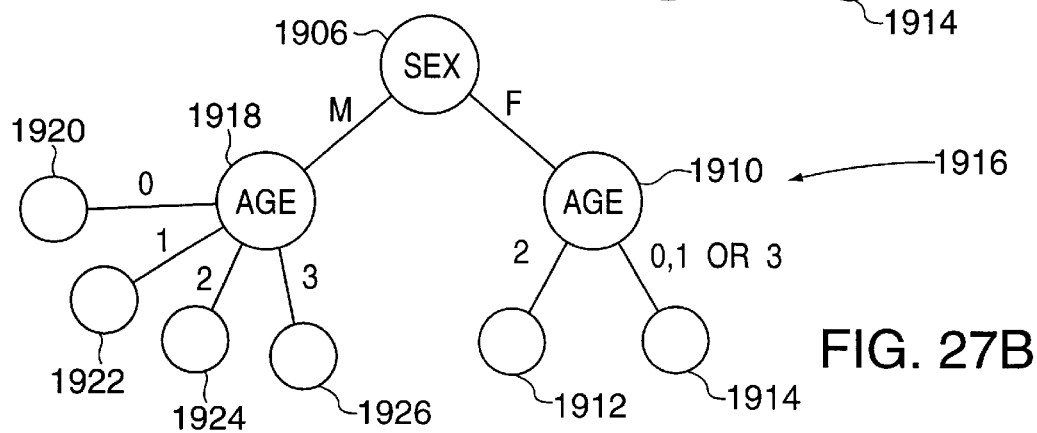
FIG. 27B depicts the examplary decision graph of FIG. 28A after a complete split has been performed on one of the leaf nodes.

FIG. 26B depicts a flowchart of the steps performed by the Bayesian network generator in step 1808 of FIG. 26A to generate candidate decision graphs. The processing of this flowchart is performed on the decision graph of a node ("the identified node") of the Bayesian network identified per step 1804 of FIG. 26A. The first step performed by the Bayesian network generator is to select a leaf in the decision graph of the identified node (step 1840). After selecting a leaf, the Bayesian network generator performs a complete split to generate a number of new decision graphs (step 1842). In this step, the Bayesian network generator performs a complete split on all nodes of the Bayesian network that are not descendants of the identified node ("non-descendant nodes"). For example, with respect to the Bayesian network 1500 of FIG. 25A, if the identified node is the business node 1506, the non-descendant nodes include the age node 1502 and the sex node 1504, but not the travel node 1508, because the travel node is a descendent of the business node. This limitation is enforced so as to prevent the introduction of cycles into the Bayesian network. However, if an alternative embodiment of the present invention is used where cycles are allowed to be introduced into the Bayesian network, then complete splits are performed on all nodes in the Bayesian network other than the parent of the leaf node. When performing a complete split, the Bayesian network generator selects one of the non-descendent nodes described above and replaces the leaf node in the decision graph with a vertex that corresponds to the selected non-descendant node. Then, new leaves are created which depend from the newly created vertex; one leaf vertex is created for each value of the newly added vertex. For example, if the leaf vertex 1908 of the decision graph 1904 of FIG. 27A had a complete split performed on the age node, the resulting decision graph appears in FIG. 27B where the leaf 1908 of FIG. 27A is replaced with age vertex 1918 of FIG. 27B and leaves 1920–1926 are created, one for each value of the age vertex (i.e., each state of the age node of the Bayesian network). Each complete split on a particular non-descendent node generates a new decision graph which is stored. To conserve space, an exemplary embodiment stores an identification of the change and not the entire decision graph.

Figure 27C:
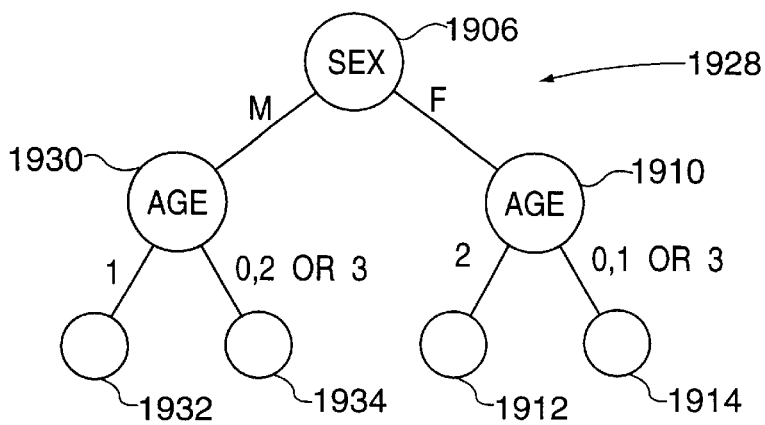
FIG. 27C depicts the examplary decision graph of FIG. 28A after a binary split has been performed on one of the leaf nodes.

After performing a complete split, the Bayesian network generator performs a binary split if the number of states is greater than two (step 1844). In this step, a binary split is performed on the leaf for all nodes that are not descendants of the identified node as reflected in the Bayesian network and for all values for these non-descendant nodes. As stated above, this restriction is enforced to prevent the addition of cycles into the Bayesian network. However, an alternative embodiment does not enforce this restriction. In a binary split operation, a leaf is replaced with a vertex that corresponds to one of the non-descendant nodes, and two leaves are generated from the newly created vertex node: one of the leaves contains a single value and the other leaf contains all other values. For example, in the decision graph 1904 of FIG. 27A, if leaf 1908 had a binary split performed on the age variable, the leaf 108 of FIG. 27A would be replaced with age vertex 1930 as shown in FIG. 27C and two leaves 1932 and 1934 would be generated for that vertex. The first leaf 932 would contain one value (e.g., 1) and the second leaf 1934 would be for all other values of the age vertex 1930 (e.g., 0, 2 and 3). As stated above, the binary splits on the leaf will be performed for all non-descendent nodes and for each value of each non-descendent node. Thus, when a node has n values, a binary split is performed on this node n times. For example, since the age node has four values, four splits would occur: (1) one leaf would have a value of 0, and the other leaf would have a value of 1, 2, or 3; (2) one leaf would have a value of 1, and the other leaf would have a value of 0, 2, or 3; (3) one leaf would have a value of 2, and the other leaf would have a value of 0, 1, or 3; (4) one leaf would have a value of 3, and the other leaf would have a value of 0, 1, or 2. The Bayesian network generator stores identifications of the changes reflected by these binary splits.

Figure 27D:
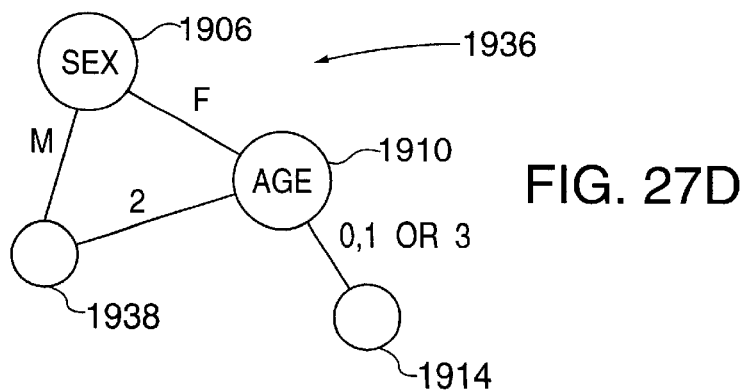
FIG. 27D depicts the examplary decision graph of FIG. 28A after a merge has been performed on two of the leaf nodes of the decision graph of FIG. 28A.

After performing a binary split, the Bayesian network generator merges all pairs of leaf nodes together (step 1846). In this step, the Bayesian network generator generates a number of new decision graphs by merging the leaf node selected in step 1840 with each other leaf node to form a single vertex. For example, with respect to the decision graph 1904 of FIG. 27A, leaf 1908 and leaf 1912 can be merged into a single leaf 1938 as depicted in FIG. 27D. After merging all pairs of leaf nodes, the Bayesian network generator determines if the decision graph has more leaves for processing. If so, processing continues to step 1840. Otherwise, processing ends. Although the exemplary embodiment is described as performing a complete split, a binary split, and a merge, one skilled in the art will appreciate that other operations can be performed.

Figure 28:
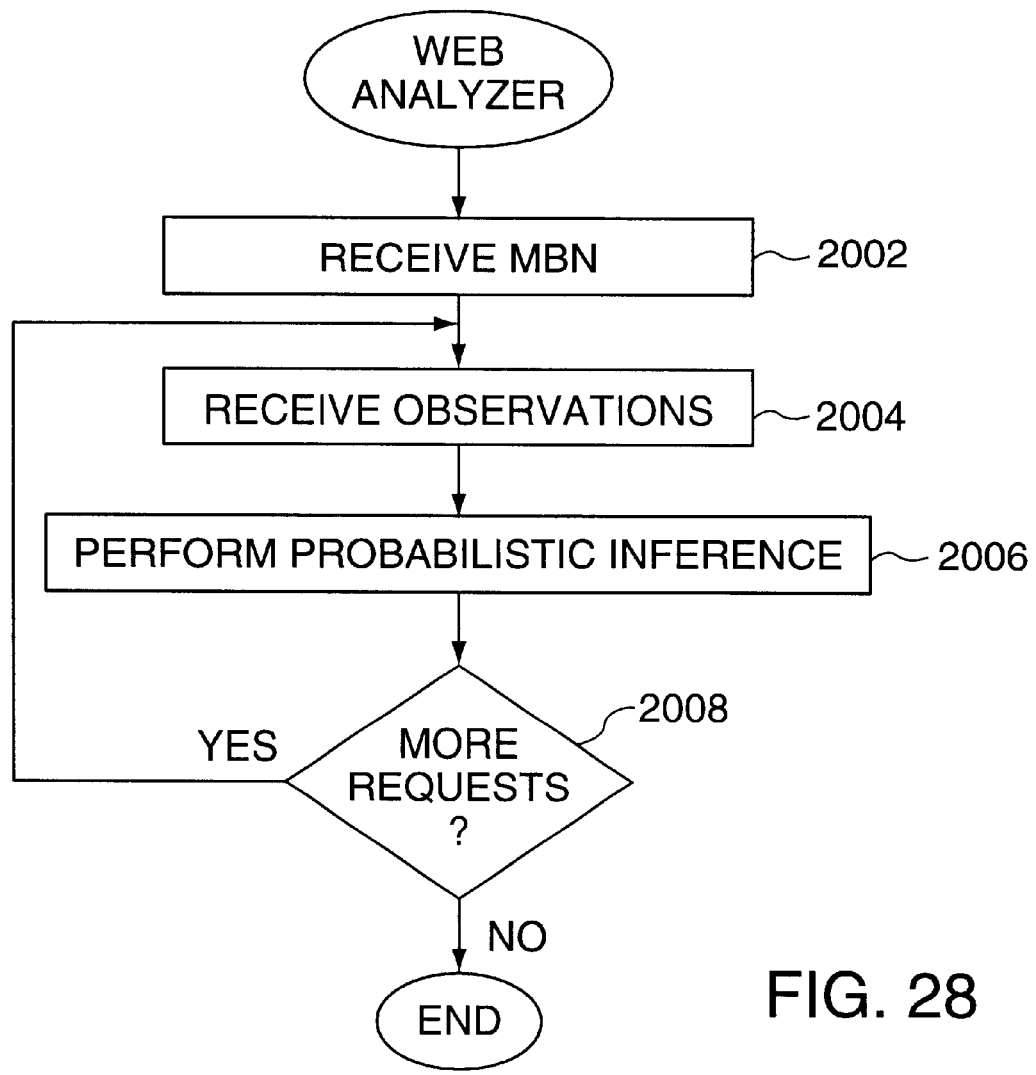
FIG. 28 depicts a flowchart of the steps performed by the web analyzer of an exemplary embodiment of the present invention.

FIG. 28 depicts a flowchart of the steps performed by the web analyzer 1614 (FIG. 6) of an exemplary embodiment of the present invention. The web analyzer first receives the MBN output by the Bayesian network generator (step 2002). After receiving the MBN network, the web analyzer receives a request from a user containing values (step 2004). In this step, the Bayesian network generator receives observations or values for a number of the nodes of the MBN. For example, the user may input their age and sex. The web analyzer then performs probabilistic inference and ranks the web site categories, business and travel, by the likelihood that the user would like to visit them (step 2006). In this step, any standard Bayesian network inference algorithm, such as the one described in Jensen, Lauritzen, and Olesen, "Bayesian Updating in Recursive Graphical Models by Local Computations", *Technical Report R*-89-15, Institute of Electronic Systems, Aalborg University, Denmark, may be used by an exemplary embodiment of the present invention. Before using such an inference algorithm, the probabilities of each Bayesian network node is expressed as a table. Such an inference algorithm and its usage is described in greater detail in U.S. patent application Ser. No. 08/602,238, entitled "Collaborative Filtering Utilizing a Belief Network," which has previously been incorporated by reference. If the Bayesian network of an alternative embodiment is used, where the Bayesian network contains cycles, the inference algorithm used is to merely access the decision graph with the values for the nodes received in step 2004 to determine the probability. In this situation, all parent nodes of a node for which inference is requested should have a value provided. After performing probabilistic inference and ranking the nodes reflecting categories of web sites, the web analyzer determines if there are more requests from the user (step 2008). If there are more requests, processing continues to step 2004. However, if there are no more requests, processing ends.

Using a Mixture of Bayesian Networks to Perform Collaborative Filtering

Collaborative filtering has been described in the above-reference application entitled "Collaborative Filtering Utilizing A Belief Network". The mixture of Bayesian networks of the present invention can be employed to carry out the same type of collaborative filtering in a more powerful way. In this case, the collaborative filtering described in the above-referenced application is a special limited case of a collaborative filter using the present invention, a mixture of Bayesian networks. In the special limited case of the prior above-referenced application, there are no arcs in the HSBNs, there are no hidden variables in the HSBNs and there is no structure search step (block 38 of FIG. 12). Thus, the present invention provides a more general and more powerful network for collaborative filtering. Such collaborative filtering is carried out by an appropriate assignment of variables of the mixture of Bayesian networks already described herein. The following is a detailed description of how to assign those variables in order to carry out collaborative filtering using the embodiments of the present invention.

Figure 29:
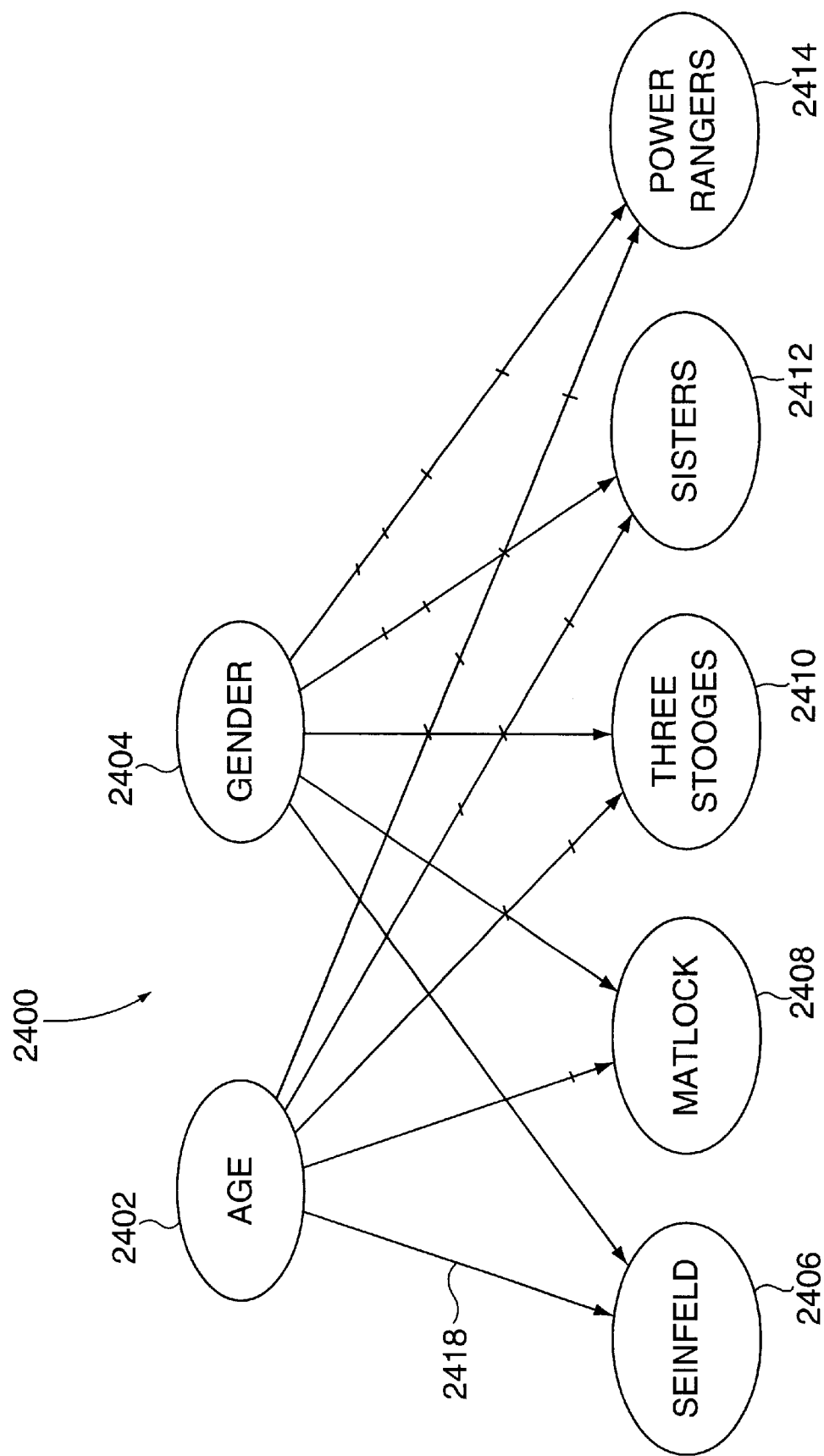
FIG. 29 depicts a hypothesis-specific Bayesian network in an example relative to collaborative filtering.

FIG. 29 depicts an examplary typical HSBN 2400 within an MBN utilized to determine preferences of a user for a television show. In the exemplary embodiment, Bayesian networks are implemented as an acyclic directed graph data structure with the variables in the Bayesian network corresponding to nodes in the data structure. The Bayesian network 2400 contains a number of variables (or nodes) 2402, 2404, 2406, 2408, 2410, 2412, 2414 and 2416. Two of these variables, 2402 and 2404, reflect causal attributes and are sometimes referred to as causal variables. A "causal attribute" is an attribute that has a causal effect on caused attributes. The caused attributes in the Bayesian network 2400 are reflected by variables 2406, 2408, 2410, 2412 and 2414. These variables are known as caused attributes (or caused variables) because their value is causally influenced by the causal variables. Caused attributes can be of two types: preference or non-preference. Preference caused attributes contain the preferences to be predicted. Non-preference caused attributes are causally influenced by the causal attributes, but are not preferences because the system is not used to predict their value. Non-preference caused attributes are further discussed below. For example, variable 2414 is a preference caused attribute indicating whether a particular user likes the "Power Rangers" television show and variable 2402 is a causal attribute whose value has a causal effect on variable 2414. That is, since "Power Rangers" is primarily enjoyed by children, the younger the age variable, the more likely it is that the user will enjoy the "Power Rangers" show.

As part of the prior knowledge, an administrator also supplies a prior probability that indicates the administrator's level of confidence that the Bayesian network adequately predicts the preferences of the user and a range of a number of states for any hidden variables in the Bayesian network 2400. For example, the administrator may indicate that the hidden variable 2416 contains between five and ten states based on their own knowledge. Each of these states corresponds to a cluster of users in the database that have similar preferences. The exemplary embodiment during its processing will determine which number of these states most accurately reflects the data in the database 316. In other words, the exemplary embodiment will determine a number within the range that is the best grouping of clusters in the database as described above in this specification.

While the present invention has been described with reference to a exemplary embodiment thereof, those skilled in the art will know of various changes in form that may be made without departing from the spirit and scope of the claimed invention as defined in the appended claims. Such changes may include parallelization of some of the computations described herein or the use of other probability distributions.

What is claimed is:

1. In a decision support system that receives a set of observed data as an input on a signal-bearing medium, an apparatus for use in applying said set of observed data for improving the structure and parameters of a mixture of Bayesian networks comprising plural hypothesis-specific Bayesian networks (HSBNS) having nodes corresponding to hidden and observed variables, each of said nodes storing a set of parameters and structure representing dependence relationships among said nodes, comprising:

a processor;

a memory having executable instructions stored therein, wherein said processor, in response to said executable instructions:

chooses a number of said HSBNs;

chooses a number of states of said discrete variables, and initializes said HSBNs;

for each one of said HSBNs conducts a parameter search for a set of changes in said parameters which improves the goodness of said one HSBN in predicting said observed data, and modifies the parameters of said one HSBN accordingly;

for each one of said HSBNs, computes a structure score of said one HSBN reflecting the goodness of said one HSBN in predicting said observed data, conducts a structure search for a change in said structure which improves said structure search score, and modifies the structure of said one HSBN accordingly.

2. The apparatus of claim 1 wherein said processor computes a structure score of said one HSBN, in that the processor:

computes from said observed data expected complete model sufficient statistics (ECMSS);

computes from said ECMSS sufficient statistics for said one HSBN;

computes said structure score from said sufficient statistics.

3. The apparatus of claim 2 wherein said processor computes said ECMSS, in that the processor;

computes the probability of each combination of the states of the discrete hidden and observed variables;

forms a vector for each observed case in said set of observed data, each entry in said vector corresponding to a particular one of the combinations of the states of said discrete variables; and sums the vectors over plural cases of said observed data.

4. The apparatus of claim 3 wherein said processor forms a vector such that each entry in said vector is formed to have plural sub entries comprising:

(a) the probability of the one combination of the states of the discrete variables, (b) sub-entry vectors representing the states of the continuous variables.

5. The apparatus of claim 4 wherein the processor computes the probability of the one combination of the states of the discrete variables by inference in said mixture of Bayesian networks.

6. The apparatus of claim 4 wherein the processor forms each sub-entry such that said sub entry vector has a vector multiplier corresponding to the probability of the one combination of the states of the discrete variables.

7. The apparatus of claim 6 wherein the processor computes sufficient statistics from said ECMSS in that the processor computes:
   (a) mean,
   (b) scatter,
   (c) sample size.

8. The apparatus of claim 1 wherein the processor conducts a parameter search and modifies said parameters repeatedly and consecutively until a parameter search convergence criteria is met.

9. The apparatus of claim 1, in that the processor repeatedly conducts a parameter search, computes the structure score and conducts a structure search until a structure search convergence criteria is met.

10. The apparatus of claim 8 in that the processor repeatedly conducts a parameter search, computes the structure score and conducts a structure search until a structure search convergence criteria is met.

11. The apparatus of claim 9 wherein the processor determines whether the parameter search has converged to a local optimum by said parameter search convergence criteria.

12. The apparatus of claim 9 wherein said processor determines whether the parameter search has been repeated a certain number of times by said parameter search convergence criteria.

13. The apparatus of claim 12 wherein said certain number of times is a set number.

14. The apparatus of claim 12 wherein said certain number of times is a function of the number of times the structure search has been repeated.

15. The apparatus of claim 12 wherein said parameter search convergence criteria limits the repetition of said parameter search to a limited number of repetitions and wherein said parameter search is repeated after convergence of said structure search.

16. The apparatus of claim 10 wherein said structure search convergence criteria comprises a determination of whether the structure score has worsened since a prior repetition of said structure search step.

17. The apparatus of claim 10 wherein said structure search criteria comprises a determination of whether a current performance of the structure search has changed any of said structure in the one HSBN.

18. The apparatus of claim 1 wherein the processor conducts a structure search, in that the processor:
   attempts different modifications to said structure at each node of said one HSBN;
   computes the structure score of the one HSBN for each one of said different modifications; and
   saves those modifications providing improvements to said structure score.

19. The apparatus of claim 1 further comprising instructions, in response to which the processor computes a combined score of said mixture of Bayesian networks from the structure scores of the individual HSBNs.

20. The apparatus of claim 19 further comprising instructions in response to which the processor associates said mixture of Bayesian networks with said combined score.

21. The apparatus of claim 20 further comprising instructions in response to which the processor chooses a different number of states of said discrete hidden and observed variables, repeats said parameter and structure search steps, to generate a different mixture of Bayesian networks and scores thereof for different numbers of states of said discrete variables.

22. The apparatus of claim 21 further comprising instructions in response to which the processor chooses one of the mixtures of Bayesian networks having the highest score.

23. The apparatus of claim 21 further comprising instructions in response to which the processor weights inference outputs of the different mixtures of Bayesian networks in accordance with their individual scores.

24. The apparatus of claim 1 wherein the processor conducts said parameter search in that said parameter search is repeated whenever a performance of said structure search results in a change in the structure of said HSBN.

25. The apparatus of claim 24 wherein the processor conducts said parameter search in that said parameter search is repeated a limited number of times while the structure search is always carried out to convergence.

26. The apparatus of claim 24 wherein the processor conducts said parameter search in that said parameter search is repeated to convergence and thereafter the structure search is repeated to convergence.

27. The apparatus of claim 24 wherein the processor conducts said parameter search in that said parameter search is repeated by a number of times which is a function of the number of times the structure search has been repeated.

28. The apparatus of claim 24 wherein the processor conducts said parameter search in that said parameter search is repeated a fixed number of times and said structure search is repeated a fixed number of times.

29. The apparatus of claim 24 wherein said processor conducts said parameter search in that said parameter search is repeated to convergence while the structure search is repeated a limited number of times.

30. The apparatus of claim 24 wherein said processor conducts said parameter search in that said parameter search is repeated a number of times which is a function of the number of structure searches performed thus far, while the structure search is repeated a fixed number of times.

31. The apparatus of claim 1 further comprising instructions in response to which the processor repeats the steps of performing said parameter search and said structure search and interleaves repetitions of said parameter search and said structure search.

32. The apparatus of claim 1 wherein said processor initializes said HSBNs, in that for each HSBN the processor:
   defines a structural link from each discrete hidden variable node to each observed variable node and from each continuous hidden variable node to each continuous observed variable node; and
   initializes the parameters in each node.

33. The apparatus of claim 32 wherein the processor initializes the parameters in that said processor employs the same initial parameters from node to node.

34. The apparatus of claim 32 wherein said processor initializes said parameters, in that the processor:
   removes hidden nodes and adjacent arcs from the HSBN;
   determines the maximum a postiori (MAP) configuration data;
   creates a conjugate distribution for said MAP parameters;
   for each observed node in said HSBN and for each MAP configuration of the observed node's parents, initializing the parameters of the local distribution family of said observed node from said conjugate distribution;

for each hidden discrete node in said HSBN and for each MAP configuration of said hidden discrete node's parents, if any, initialize the parameters of the local distribution family of said hidden discrete node to be a fixed distribution.

35. The apparatus of claim 34 wherein said HSBN contains no hidden continuous variables.

36. The apparatus of claim 32 wherein the processor initializes said parameters in that the processor initializes said parameters randomly.

37. The apparatus of claim 36 wherein said HSBN contains at least one hidden continuous variable.

38. The apparatus of claim 36 wherein the processor initializes said parameters randomly in that the processor:

(a) sets the parameters of said HSBN to be equal; and (b) draws the parameters from a Dirichlet distribution.

39. The apparatus of claim 1 wherein the processor performs a parameter step in that the processor searches for a change in the parameters in each node which improves the performance of said one HSBN in predicting said observed data.

40. The apparatus of claim 1 wherein one of said hidden variables is a common external discrete hidden variable not represented by any node in said mixture of Bayesian networks, and wherein the number of HSBNs in said mixture of Bayesian networks is equal to the number of states of said common external discrete hidden variable.

41. In a decision support system that receives a set of observed data as an input on a signal-bearing medium, an apparatus for finding the likeliest number of states of hidden discrete variables in a mixture of Bayesian networks comprising plural hypothesis-specific Bayesian networks (HSBNs) having nodes corresponding to hidden and observed variables, each of said nodes storing a structure and a set of parameters representing causal relationships among said nodes, said apparatus comprising:

a processor;

a memory having executable instructions stored therein; and wherein said processor, in response to said executable instructions:

chooses successive numbers of states of said discrete hidden and observed variables, and for each one of said successive numbers of states:

initializes said HSBNs;

conducts, for each one of said HSBNs, a parameter search for a set of changes in said parameters which improves the goodness of said one HSBN in predicting said observed data, and modifies the parameters of said one HSBN accordingly;

computes, for each one of said HSBNs, a structure score of said one HSBN reflecting the goodness of said one HSBN in predicting said observed data, conducts a structure search for a change in said structure which improves said structure search score, and modifies the structure of said one HSBN accordingly;

computes a combined score of the mixture of Bayesian networks corresponding to the current number of states of said discrete variables; and chooses the mixture of Bayesian networks having the best score.

42. The apparatus of claim 41 wherein one of said hidden variable is a common external discrete hidden variable not represented by any node in said mixture of Bayesian networks, and wherein the number of HSBNs in said mixture of Bayesian networks is equal to the number of states of said common external discrete hidden variable, whereby each mixture of Bayesian networks corresponds to an assumption of a certain number of states of said common external discrete hidden variable.

43. The apparatus of claim 41 wherein the processor computes a structure score of said one HSBN in that the processor:

computes from said observed data expected complete model sufficient statistics (ECMSS);

computes from said ECMSS sufficient statistics from said one HSBN;

computes said structure score from said sufficient statistics.

44. The apparatus of claim 41 wherein the processor computes said ECMSS in that the processor:

computes the probability of each combination of the states of the discrete hidden and observed variables;

forms a vector for each observed case in said set of observed data, each entry in said vector corresponding to a particular one of the combinations of the states of said discrete variables; and sums the vectors over plural cases of said observed data.

45. The apparatus of claim 44 wherein the processor forms a vector such that each entry in said vector is formed to have plural sub entries comprising:

(a) the probability of the one combination of the states of the discrete variables;

(b) sub-entry vectors representing the states of the continuous variables.

46. The apparatus of claim 45 wherein the probability of the one combination of the states of the discrete variables is computed by the inference in said mixture of Bayesian networks.

47. The apparatus of claim 45 wherein each sub-entry is formed such that said sub-entry vector has a vector multiplier corresponding to the probability of the one combination of the states of the discrete variables.

48. The apparatus of claim 43 wherein the processor computes sufficient statistics from said ECMSS in that the processor computes:

(d) mean, (e) scatter, (f) sample size.

49. The apparatus of claim 41 wherein the processor conducts a parameter search and modifies said parameters repeatedly and consecutively until a parameter search convergence criteria is met.

50. The apparatus of claim 41, in that the processor repeatedly conducts a parameter search, computes the structure score and conducts a structure search until a structure search convergence criteria is met.

51. The apparatus of claim 45 in that the processor repeatedly conducts a parameter search, computes the structure score and conducts a structure search until a structure search convergence criteria is met.

52. The apparatus of claim 50 wherein the processor determines whether the parameter search has converged to a local optimum by said parameter search convergence criteria.

53. The apparatus of claim 50 wherein said processor determines whether the parameter search has been repeated a certain number of times by said parameter search convergence criteria.

54. The apparatus of claim 53 wherein said certain number of times is a set number.

55. The apparatus of claim 53 wherein said certain number of times is a function of the number of times the structure search has been repeated.

56. The apparatus of claim 53 wherein said parameter search convergence criteria limits the repetition of said parameter search to a limited number of repetitions and wherein said parameter search is repeated after convergence of said structure search.

57. The apparatus of claim 51 wherein said structure search convergence criteria comprises a determination of whether the structure score has worsened since a prior repetition of said structure search step.

58. The apparatus of claim 51 wherein said structure search criteria comprises a determination of whether a current performance of the structure search has changed any of said structure in the one HSBN.

59. The apparatus of claim 41 wherein the processor conducts a structure search, in that the processor
   attempts different modifications to said structure at each node of said one HSBN;
   computes the structure score of the one HSBN for each one of said different modifications; and
   saves those modifications providing improvements to said structure score.

60. The apparatus of claim 41 further comprising instructions, in response to which the processor computes a combined score of said mixture of Bayesian networks from the structure scores of the individual HSBNs.

61. The apparatus of claim 60 further comprising instructions in response to which the processor associates said mixture of Bayesian networks with said combined score.

62. The apparatus of claim 60 further comprising instructions in response to which the processor chooses a different number of states of said discrete hidden and observed variables, repeat said parameter and structure search steps, to generate a different mixture of Bayesian networks and scores thereof for different numbers of states of said discrete variables.

63. The apparatus of claim 62 further comprising instructions in response to which the processor chooses one of the mixtures of Bayesian networks having the highest score.

64. The apparatus of claim 62 further comprising instructions in response to which the processor weights inference outputs of the different mixtures of Bayesian networks in accordance with their individual scores.

65. The apparatus of claim 41 wherein the processor conducts said parameter search in that said parameter search is repeated whenever a performance of said structure search results in a change in the structure of said HSBN.

66. The apparatus of claim 65 wherein the processor conducts said parameter search in that said parameter search is repeated a limited number of times while the structure search is always carried out to convergence.

67. The apparatus of claim 65 wherein the processor conducts said parameter search in that said parameter search is repeated to convergence and thereafter the structure search is repeated to convergence.

68. The apparatus of claim 65 wherein the processor conducts said parameter search in that said parameter search is repeated by a number of times which is a function of the number of times the structure search has been repeated.

69. The apparatus of claim 65 wherein the processor conducts said parameter search in that said parameter search is repeated a fixed number of times and said structure search is repeated a fixed number of times.

70. The apparatus of claim 65 wherein said processor conducts said parameter search in that said parameter search is repeated to convergence while the structure search is repeated a limited number of times.

71. The apparatus of claim 65 wherein said processor conducts said parameter search in that said parameter search is repeated a number of times which is a function of the number of structure searches performed thus far, while the structure search is repeated a fixed number of times.

72. The apparatus of claim 41 further comprising instructions in response to which the processor repeats the steps of performing said parameter search and said structure search and interleaves repetitions of said parameter search and said structure search.

73. The apparatus of claim 41 wherein said processor performs a parameter search in that the processor searches for a change in the parameters in each node which improves the performance of said one HSBN in predicting said observed data.

74. In a decision support system that receives a set of observed data as an input on a signal-bearing medium, an apparatus for converting said set of observed data into complete statistics for training a mixture of Bayesian networks comprising plural hypothesis-specific Bayesian networks (HSBNs) having nodes corresponding to hidden and observed variables, each of said nodes storing a structure and a set of parameters representing causal relationships among said nodes, said apparatus comprising:
   a processor;
   a memory having executable instructions stored therein; and
   wherein said processor, in response to instructions stored in memory:
      chooses a number of states of said discrete hidden and observed variables, and initializing said HSBNs;
      conducts a parameter search for each one of said HSBNs for a set of changes in said parameters which improves the goodness of said one HSBN in predicting said observed data, and modifying the parameters of said one HSBN accordingly;
      computes a structure score for each one of said HSBNs reflecting the goodness of said one HSBN in predicting said observed data;
      conducts a structure search for a change in said structure which improves said structure search score, and modifies the structure of said one HSBN accordingly;
   wherein the processor computes a structure score of said one HSBN in that the processor
      computes from said observed data expected complete model sufficient statistics (ECMSS),
      computes from said ECMSS sufficient statistics for said one HSBN,
      computes said structure score from said sufficient statistics;
   wherein said processor computes said ECMSS, in that the processor computes the probability of each combination of the states of the discrete hidden and observed variables;
      forms a vector for each observed case in said set of observed data, each entry in said vector corresponding to a particular one of the combinations of the states of said discrete variables; and
      sums the vectors over plural cases of said observed data whereby to render a complete set of information.

75. The apparatus of claim 74 wherein the processor forms a vector such that each entry in said vector is formed to have plural sub entries comprising:

(a) the probability of the one combination of the states of the discrete variables;

(b) sub-entry vectors representing the states of the continuous variables.

76. The apparatus of claim 75 wherein the probability of the one combination of the states of the discrete variables is computed by the inference in said mixture of Bayesian networks.

77. The apparatus of claim 76 wherein each sub-entry is formed such that said sub-entry vector has a vector multiplier corresponding to the probability of the one combination of the states of the discrete variables.

78. The apparatus of claim 77 wherein the processor computes sufficient statistics from said ECMSS in that the processor computes (c) mean, (d) scatter, (e) sample size.

79. In a decision support system that receives a set of observed data as an input on a signal-bearing medium, a method for applying the set of observed data for improving the structure and parameters of a mixture of Bayesian networks comprising plural hypothesis-specific Bayesian networks (HSBNs) having nodes corresponding to hidden and observed variables, each of said nodes storing a set of parameters and structure representing dependence relationships among said nodes, said method comprising:

storing the mixture of Bayesian networks in a memory;

receiving the set of observed data as an input on the signal-bearing medium;

choosing a number of said HSBNs;

choosing a number of states of said discrete variables, and initializing said HSBNs;

for each one of said HSBNs conducting a parameter search for a set of changes in said parameters which improves the goodness of said one HSBN in predicting said observed data, and modifying the parameters of said one HSBN accordingly;

for each one of said HSBNs, computing a structure score of said one HSBN reflecting the goodness of said one HSBN in predicting said observed data, conducting a structure search for a change in said structure which improves said structure search score, and modifying the structure of said one HSBN accordingly.

80. A computer-readable medium storing computer-executable instructions for carrying out the steps of claim 79.

81. In a decision support system that receives a set of observed data as an input on a signal-bearing medium, a method for finding the likeliest number of states of hidden discrete variables in a mixture of Bayesian networks comprising plural hypothesis-specific Bayesian networks (HSBNs) having nodes corresponding to hidden and observed variables, each of said nodes storing a structure and a set of parameters representing causal relationships among said nodes, said method comprising:

storing the mixture of Bayesian networks in a memory;

receiving the set of observed data as an input on the signal-bearing medium;

choosing successive numbers of states of said discrete hidden and observed variables, and for each one of said successive numbers of states:

initializing said HSBNs;

conducting, for each one of said HSBNs, a parameter search for a set of changes in said parameters which improves the goodness of said one HSBN in predicting said observed data, and modifying the parameters of said one HSBN accordingly;

computing, for each one of said HSBNs, a structure score of said one HSBN reflecting the goodness of said one HSBN in predicting said observed data, conducting a structure for a change in said structure which improves said structure search score, and modifying the structure of said one HSBN accordingly;

computing a combined score of the mixture of Bayesian networks corresponding to the current number of states of said discrete variables; and choosing the mixture of Bayesian networks having the best score.

82. A computer-readable medium storing computer-executable instructions for carrying out the steps of claim 81.

* * * * *